United States Patent
Yoshida

(10) Patent No.: US 7,362,832 B2
(45) Date of Patent: Apr. 22, 2008

(54) RECEIVING APPARATUS IN OFDM TRANSMISSION SYSTEM

(75) Inventor: Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 10/687,203

(22) Filed: Oct. 16, 2003

(65) Prior Publication Data

US 2004/0091057 A1 May 13, 2004

(30) Foreign Application Priority Data

Nov. 8, 2002 (JP) ............................ 2002-324952
Feb. 21, 2003 (JP) ............................ 2003-044519

(51) Int. Cl.
*H03D 1/06* (2006.01)
(52) U.S. Cl. ..................................... 375/348
(58) Field of Classification Search ................ 375/134, 375/137, 142, 143, 144, 148, 150, 152, 346, 375/348, 343, 350, 260; 704/216, 237, 263; 708/5, 422, 813; 455/63.1, 114.2, 278.1, 455/296
See application file for complete search history.

(56) References Cited

U.S. PATENT DOCUMENTS

| | | | | |
|---|---|---|---|---|
| 6,693,984 B1 * | 2/2004 | Andre | ................ | 375/350 |
| 6,993,083 B1 * | 1/2006 | Shirakata et al. | ............ | 375/260 |
| 7,020,116 B1 * | 3/2006 | Nakada | ................ | 370/338 |
| 7,027,519 B2 * | 4/2006 | Bao et al. | ................ | 375/260 |
| 7,133,474 B2 * | 11/2006 | Ramasubramanian et al. | ... | 375/343 |
| 2004/0001563 A1 * | 1/2004 | Scarpa | ................ | 375/326 |

FOREIGN PATENT DOCUMENTS

| | | |
|---|---|---|
| EP | 0 802 649 | 10/1997 |
| EP | 1 065 855 | 1/2001 |
| WO | 00/36801 | 6/2000 |
| WO | 01/58105 | 8/2001 |

OTHER PUBLICATIONS

Suyama et al. A Maximum Likelihood OFDM Receiver with Smoothed FFT-Window for Large Multipath Delay Difference over the Guard Interval, IEEE 2002, p. 1247-1251.*
Suzuki et al. A New OFDM Demodulation Method to Reduce Influence of ISI Due to Longer Delay than Guard Interval, IEEE, 2002, p. 239-244.*

(Continued)

*Primary Examiner*—Sam K. Ahn
(74) *Attorney, Agent, or Firm*—Myers Wolin, LLC

(57) ABSTRACT

A receiving apparatus in an OFDM transmission system includes a channel estimation unit (101) for measuring a delay profile of a delayed wave having a delay greater than a guard interval of data; a guard-interval-exceed delayed wave detector (103) for detecting, from the delay profile as an intersymbol interference (ISI) portion, a delay-time portion greater than the guard interval of the data; a ISI replica generator (104) for generating, as the ISI replica, a time-waveform portion of a known symbol conforming to the ISI portion, or a time-waveform portion of the preceding symbol; subtractor (102) for subtracting the ISI replica from a receive signal; and an FFT arithmetic unit (106) for demodulating data by applying FFT processing to the result of subtraction.

23 Claims, 44 Drawing Sheets

OTHER PUBLICATIONS

Dukhyun, et al., "Residual ISI Cancellation for OFDM with Applications to HDTV Broadcasting" IEEE Journal on Selected Areas in Communications vol. 16, No. 8, Oct. 1998, pp. 1590-1599, XP002159671, ISSN:0733-8716.

Yamamura, et al., "High Mobility OFDM Transmission System by a New Channel Estimation and ISI Cancellation Scheme Using Characteristics of Pilot Symbol Inserted OFDM Signal" Vehicular Technology Conference, Sep. 1999 XP010352958, ISBN:0-7803-5435-4, pp. 319-323.

Hazy, et al., "Synchronization of OFDM Systems Over Frequency Selective Fading Channels" May 1997 Vehicular Technology Conference, XP010229167, ISBN: 0-7803-3659-3 pp. 2094-2098.

Suyama, et al., "An OFDM Receiver with Smoothed FFT-Window and RLS-MLSE for Fast Multipath Fading Environments with Large Delay Spread" Sep. 2002 Proceedings IEEE ISSTA 2002-IEEE International Symposium on Spread Spectrum Techniques and Applications vol. 2, pp. 353-357, XP010615490.

* cited by examiner

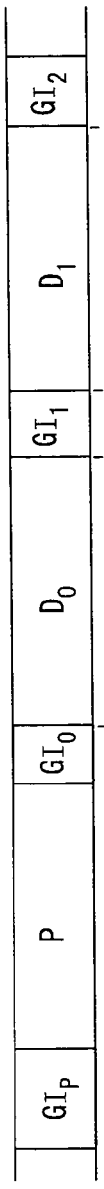
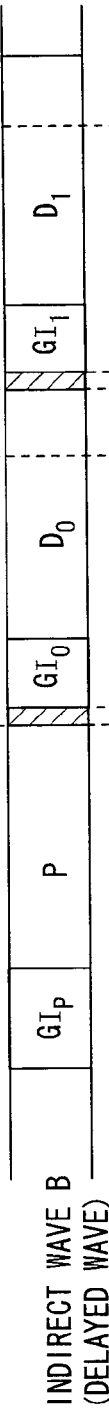
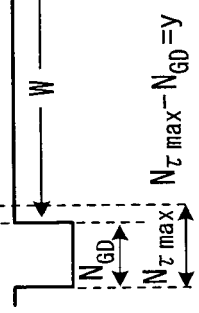
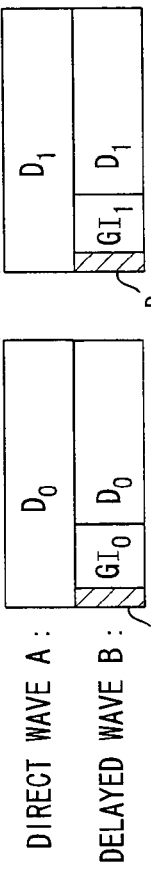
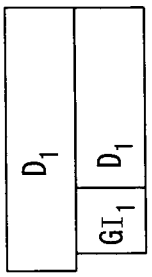
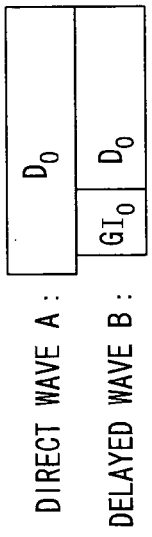
FIG. 4A DIRECT WAVE A
FIG. 4B INDIRECT WAVE B (DELAYED WAVE)
FIG. 4C
FIG. 4D DIRECT WAVE A : DELAYED WAVE B :
FIG. 4E DIRECT WAVE A : DELAYED WAVE B :

EACH SUBCARRIER COMPONENT IS DISTORTED (ICI OCCURS)

(D/U=0dB, Eb/No=20dB)

RECEIVING APPARATUS IN OFDM TRANSMISSION SYSTEM

BACKGROUND OF THE INVENTION

This invention relates to a receiving apparatus in an Orthogonal Frequency Division Multiplexing (OFDM) transmission system for receiving a transmitted signal that is the result of adding a guard interval onto a signal obtained by IFFT (Inverse Fast Fourier Transform) processing and then transmitting the signal. More particularly, the invention relates to a receiving apparatus in an OFDM transmission system in which, even if a delayed wave in excess of the guard interval is generated, excellent reception can be performed by reducing interference between symbols and interference between carriers.

Frequency-selective fading ascribable to a multipath environment occurs in wideband wireless communications. An effective method of dealing with this is multicarrier modulation, which divides the transmission bandwidth into narrow bands (subcarriers) that do not undergo frequency-selective fading, and transmits the subcarriers in parallel. At present, specifications regarding digital TV and audio broadcasts (in Japan and Europe) and wireless LAN (IEEE 802.11a) are being standardized based upon OFDM transmission, which is one type of multicarrier modulation. An OFDM-based modulation scheme has been proposed for next-generation mobile communication systems as well.

FIG. 48A is a diagram useful in describing multicarrier transmission. A serial/parallel converter 1 converts serial data to parallel data and inputs the parallel data to quadrature modulators 3a to 3d via low-pass filters 2a to 2d, respectively. In FIG. 48A, the serial data is converted to parallel data comprising four symbols S1 to S4. Each symbol includes an in-phase component and a quadrature component. The quadrature modulators 3a to 3d subject each symbol to quadrature modulation by subcarriers having frequencies f1 to f4 illustrated in FIG. 48B, a combiner 4 combines the quadrature-modulated signals and a transmitter (not shown) up-converts the combined signal to a radio-frequency signal and then transmits the radio-frequency signal. With the multicarrier transmission scheme, the frequencies are arranged, as shown in FIG. 48B, in such a manner that the spectrums will not overlap in order to satisfy the orthogonality of the subcarriers.

In FIG. 48A, the serial/parallel converter 1 converts serial data to parallel data of four symbols. In actuality, however, the serial/parallel converter 1 converts the serial data to N (e.g., 512 or 1024) items of parallel data and performs multicarrier transmission with N-number of subcarriers.

With the OFDM transmission scheme, frequency spacing is arranged so as to null the correlation between a modulation band signal transmitted by an nth subcarrier of multicarrier transmission and a modulation band signal transmitted by an (n+1)th subcarrier. FIG. 49A is block diagram of a transmitting apparatus based upon the OFDM scheme. The apparatus includes a serial/parallel converter 5 for converting serial data to parallel data comprising M-number of symbols (I+jQ, which is a complex number). An IFFT (Inverse Fast Fourier Transform) 6, which is for the purpose of transmitting the M-number of symbols as subcarriers having a frequency spacing shown in FIG. 49B, applies an inverse fast Fourier transform to the frequency data to effect a conversion to time data. A guard-interval insertion unit 7 inserts a guard interval GI and inputs the real and imaginary parts to a quadrature modulator 9 through low-pass filters 8a, 8b. The quadrature modulator 9 subjects the input data to quadrature modulation, and a transmitter (not shown) up-converts the modulated signal to a radio-frequency signal. In accordance with OFDM transmission, a frequency placement of the kind shown in FIG. 49B becomes possible, thereby enabling an improvement in the efficiency with which frequency is utilized.

FIG. 50 is a diagram useful in describing a serial-to-parallel conversion. A pilot P is time-division multiplexed ahead of each frame of transmit data. It should be noted that the pilot P can be dispersed within a frame in the manner shown in FIG. 51. If it is assumed that a common pilot per frame is composed of 4×M symbols and that the transmit data is composed of 28×M symbols, then the serial/parallel converter 5 will output M symbols of the pilot the first four times as parallel data and then will output M symbols of transmit data 28 times as parallel data. As a result, over the duration of one frame, a pilot can be transmitted four times upon being time-division multiplexed into all subcarriers. By performing a correlation operation between this pilot and an already known pilot on the receiving side, a channel can be estimated on a per-subcarrier basis and channel compensation can be carried out.

FIG. 52 is a diagram for describing the insertion of a guard interval. If an IFFT output signal conforming to M-number of subcarrier samples (=one OFDM symbol) is adopted as one unit, insertion of the guard interval signifies copying the tail-end portion of the signal to the leading end thereof. By inserting a guard interval GI, it is possible to eliminate the effects of intersymbol interference (ISI) caused by multipath.

FIGS. 53A and 53B are diagrams useful in describing interference between codes due to a delayed wave, in which reference characters A and B represent direct and delayed (reflected) waves, respectively. If delay time τ of the delayed wave B is less than a guard-interval length $N_{GD}$, as shown in FIG. 53A, then a data symbol $D_0$ of the direct wave A will not overlap another data symbol of the delayed wave B in a window timing W and, hence, intersymbol interference will not occur.

If the delay time τ of the delayed wave B is greater than the guard-interval length $N_{GD}$, however, as shown in FIG. 53B, then the data symbol $D_0$ of the direct wave A will overlap another data symbol $D_1$ of the delayed wave B in the window timing W and ISI interference is produced as a result. Accordingly, the guard-interval length $N_{GD}$ is decided, taking into consideration a maximum delay time $τ_{max}$ of the delayed wave, in such a manner that ISI will not occur.

FIG. 54 is a block diagram illustrating a receiving apparatus in an OFDM transmission system. A radio receiver 11 applies frequency conversion processing to a received OFDM carrier signal, and a quadrature demodulator 12 subjects the receive signal to quadrature demodulation processing. A guard-interval removal unit 13 removes the guard interval GI from the receive signal after receive-signal synchronization is achieved. The resulting receive signal is input to a FFT (Fast Fourier Transform) unit 14. The latter executes FFT processing and converts the signal in the time domain to M-number of subcarrier signal (subcarrier sample) values $S_1$ to $S_M$ at an FFT window timing.

A channel estimation unit 15 performs channel estimate subcarrier by subcarrier using pilot symbols time-division multiplexed on the transmitting side, and a channel compensation unit 16 multiplies the FFT outputs $S_1$ to $S_M$ by respective ones of channel estimation values $h_1$ to $h_M$ of each of the subcarriers. More specifically, using pilot signals, the channel estimation unit 15 estimates phase influence exp(jφ)

and amplitude influence A ascribable to fading of each subcarrier, and the channel compensation unit 16 compensates for fading by multiplying the subcarrier signal components of transmit symbols by $\exp(-j\phi)$ and $1/A$. A parallel/serial converter 17 converts parallel data, which is output from the channel compensation unit 16, to serial data, and a data demodulator 18 demodulates the transmit data.

Thus, with OFDM, a guard interval GI is added onto one item of OFDM symbol data (referred to simply as "symbol data" below) and ISI will not occur even if a multipath delayed wave within the length of a GI symbol exists. This is advantageous in that demodulation can be performed without using equalization (i.e., such a system is immune to multipath fading).

On the other hand, adding on a GI symbol (a redundant symbol) causes a decline in transmission efficiency. In order to suppress this decline in transmission efficiency, the length of the OFDM symbol must be made large. This increases the number M of subcarriers in a fixed transmission bandwidth. This gives rise to certain problems encountered in multicarrier transmission, namely an increase in the ratio of peak-to-average power (degradation of performances ascribable to non-linear distortion in an amplifier) and a decline in fading tracking performance due to enlarged symbol length, and the number of subcarriers is designed in a tradeoff among these factors.

However, the delay time of a delayed wave along an actual transmission path varies greatly, and the delay spread is large, especially outdoors, e.g., 0.2 to 2.0 μs in urban areas and 10 to 20 μs in mountainous areas. The conceivable GI length usually cannot provide compensation for 100% of all service areas.

One solution to this problem is "An OFDM Receiving System for Multipath Environments of a Delay Profile Exceeding a Guard Interval" by Suyama, et al., Institution of Electronics, Information and Communication Engineers, Technical Report RCS 2001-175 (2001-11), pp. 45-50 (referred to as the "prior art" below).

With signal transmission for mobile radio according to OFDM, the transmission performance degrades markedly in multipath delayed propagation that exceeds the guard interval. The reason for this is ISI between OFDM symbols and intercarrier interference (ICI) within the same symbol. In order to suppress both ISI and ICI and improve the transmission performance, the prior art cited above consists of ① decision feedback equalization for removing the effects of ISI, ② maximum likelihood sequence estimation (MLSE) for removing the effects of ICI from the results of this processing and estimating a transmit-signal sequence, ③ Fourier transform processing using a window function that is capable of reducing the number of states in maximum likelihood sequence estimation, and ④ channel estimation processing by recursive least squares.

FIG. 55 is a block diagram of an OFDM receiver according to the prior art.

With this receiver, first an FFT window unit 50 subjects a receive signal to a Fourier transform within a rectangular window in a pilot interval for channel estimation and applies its output to a channel estimation unit 51. The latter performs channel estimation using a pilot. The FFT window unit 50 changes the window function of the data interval using the pilot. More specifically, (1) when the difference between multipath delay times falls within the guard interval, the usual rectangular window function is used, but (2) if a delay-time difference that exceeds the guard interval is observed, then a smooth window function such as a Hanning window is used in the data interval.

Next, the FFT window unit 50 performs a Fourier transform in the data interval using a window function. A subtractor 55 subtracts an ISI replica, which has been generated by an ISI replica generator 52, from the receive signal that has undergone the Fourier transform. This processing is executed en masse over all subcarriers. This processing section is referred to collectively as a decision feedback equalizer.

The above-mentioned receive signal from which the ISI has been eliminated is input to an MLSE (maximum likelihood sequence estimation) unit 53, which extracts a transmit-signal sequence of each carrier. This equalizer generates transmit-symbol candidates along the frequency axis of symbols at a certain time, and an ICI replica generator 54 generates a replica of the receive signal from the generated plurality of candidates. A sequence for which the square of the absolute value of the error between the receive signal and the ICI replica will be minimized is output as a transmit-signal sequence. The receiver of FIG. 55 also includes a parallel/serial converter 56, a serial/parallel converter 57, an arithmetic unit 59 and a squaring unit 60.

The prior art deals with the same topic as the present invention and presents the result of a simulation applied to a wireless LAN system. The goal of the prior art is to reduce ISI (intersymbol interference) and ICI (intercarrier interference) ascribable to a delayed wave that has exceeded a guard interval and its characterizing feature is to execute all processing in the frequency domain (namely with the circuitry that follows the FFT on the receiving side). Further, the receive FFT is subjected to time-domain filtering in order to suppress ICI, which spreads into the entirety of the band. Furthermore, MLSE is used for ICI removal and a Viterbi equalizer having $M^2$ states (where M represents the number of states in M-ary modulation) will be required for each and every carrier. For example, in case of QPSK (M=4), there will be 16 states, and if the number N of carriers is 1024, then 1024 Viterbi equalizers will be needed.

Further, since the demodulated signal undergoes a hard decision by MLSE, soft-decision gain obtained if the signal is the conventional demodulated signal is not acquired at all when concurrent use is made of forward error correction (FEC). That is, the BER performance degrades. Furthermore, since MLSE is an exhaustive-search algorithm, the M-number of states in M-ary modulation that must be prepared is equivalent to the multiplier of the carriers observed (since there are two carriers in the case of the prior art, the number of states is the square). Accordingly, when concurrent use is made of an adaptive modulation scheme, which is adopted in the majority of present-day wireless systems (third-generation mobile communications and wireless LANs, etc.), the number of states that must be made available is equivalent to the maximum value of the number of M-ary modulation states, and MLSE itself must recognize the actual number of M-ary modulation states and must change over this number dynamically. Further, control is complicated with a multicarrier adaptive modulation system in which the modulation scheme is changed over subcarrier by subcarrier. Thus, problems still remain with the conventional method, namely the fact that computation cost for attaining the objective is high (especially in a case where concurrent use is made of adaptive modulation), and the fact that encoding gain declines when concurrent use is made of FEC.

SUMMARY OF THE INVENTION

Accordingly, an object of the present invention is to reduce ISI (intersymbol interference) and ICI (intercarrier interference) ascribable to a delayed wave that has exceeded a guard interval.

Another object of the present invention is to execute processing to suppress ISI/ICI in the time domain, namely in the circuitry ahead of the FFT on the receiving side, thereby making it possible to exercise control with a fixed amount of calculation independently of the number of M-ary modulation states of the subcarriers and to acquire encoding gain.

First Receiving Apparatus in OFDM Transmission System According to the Present Invention A first receiving apparatus in an OFDM transmission system according to the present invention is applicable to a case where a signal has been transmitted upon making the length of a guard interval added onto an already known symbol (e.g., a pilot symbol) larger than the length of a guard interval added onto a data symbol.

More specifically, a first receiving apparatus according to the present invention comprises ① a receiver for receiving a signal that has been transmitted upon making the length of a guard interval added onto an already known symbol larger than the length of a guard interval added onto a data symbol, and ② a delay-profile measurement unit for measuring a delay profile of a delayed wave having a delay greater than the guard interval of the data symbol by calculating correlation between the received signal and an already known signal.

The first receiving apparatus further comprises ③ an ISI-portion detector for detecting, from the delay profile, a delay-time portion greater than the guard interval of the data as an ISI portion; ④ an ISI-replica generator for generating, as an ISI replica, a time-waveform portion of the already known symbol, which conforms to the ISI portion, or a time-waveform portion of the preceding symbol; ⑤ a subtractor for subtracting the ISI replica from the receive signal; ⑥ and a data demodulator for demodulating data by applying FFT processing to the result of subtraction.

In accordance with the first receiving apparatus, ISI ascribable to a delayed wave that has exceeded the guard interval of data can be reduced and, even if the delay time of the delayed wave exceeds the guard interval of the data, an increase in the BER can be suppressed. Further, since processing is executed to suppress ISI in the time domain, it possible to exercise control with a fixed amount of calculation independently of the number of M-ary modulation states of subcarriers, thereby enabling a reduction in the scale of the hardware.

The first receiving apparatus further comprises ⑦ means for applying FFT processing to the output of the subtractor and applying IFFT processing to result of demodulation after channel compensation, thereby generating a demodulated-signal restoration replica; and ⑧ means for inserting the demodulated-signal restoration replica into the portion of the subtractor output from which the ISI replica was removed by subtraction. The data demodulator demodulates the data by applying FFT processing to the result of insertion.

In accordance with the first receiving apparatus, both ISI and ICI can be suppressed in the time domain and, even if the delay time of the delayed wave exceeds the guard interval of the data, an increase in the BER can be suppressed. Further, since processing is executed to suppress both ISI and ICI in the time domain, it is possible to exercise control with a fixed amount of calculation independently of the number of M-ary modulation states of the carriers, thereby enabling a reduction in the scale of the hardware. Further, in the means for generating the demodulated-signal restoration replica, a symbol is decided by a hard decision with regard to the result of channel compensation, or a soft decision is rendered by a prescribed quantization bit length, and IFFF processing is applied to the result of the decision to generate the demodulated-signal restoration replica. As a result, a further improvement is made in the performance.

Second Receiving Apparatus in OFDM Transmission System According to the Present Invention A second receiving apparatus in an OFDM transmission system according to the present invention is applicable to a case where the length of a guard interval added onto an already known symbol (e.g., a pilot symbol) and the length of a guard interval added onto a data symbol are equal.

More specifically, a second receiving apparatus according to the present invention comprises ① an arithmetic unit for calculating correlation between the received signal and an already known signal; ② means for detecting whether a delayed wave greater than the length of the guard interval has occurred using a correlation value greater than a threshold value; ③ means for making "0" a correlation value that is equal to or than the threshold value equal and outputting a delay profile if a delayed wave greater than the length of the guard interval has been generated; ④ an ISI-portion detector for detecting, from the delay profile, a delay-time portion greater than the length of the guard interval as an ISI portion; ⑤ an ISI-replica generator for generating, as an ISI replica, a time-waveform portion of the already known symbol, which conforms to the ISI portion, or a time-waveform portion of the previous symbol; ⑥ a subtractor for subtracting the ISI replica from the received signal; and ⑦ a data demodulator for demodulating data by applying FFT processing of the subtractor output.

The second receiving apparatus further comprises ⑧ means for applying FFT processing to the output of the subtractor and applying IFFT processing to result of demodulation after channel compensation, thereby generating a demodulated-signal restoration replica; and ⑨ means for inserting the demodulated-signal restoration replica into the portion of the subtractor output from which the ISI replica was subtracted. The data demodulator demodulates the data by applying FFT processing to the signal resulting from the insertion.

In accordance with the second receiving apparatus, effects similar to those of the first receiving apparatus can be obtained even if the guard-interval lengths of the already known symbol (pilot symbol) and data symbol are the same.

Third Receiving Apparatus in OFDM Transmission System According to the Present Invention A third receiving apparatus in an OFDM transmission system according to the present invention is applicable to a case where the length of a guard interval added onto an already known symbol (e.g., a pilot symbol) and the length of a guard interval added onto a data symbol are equal.

More specifically, a second receiving apparatus according to the present invention comprises ① means for outputting a delay profile by calculating correlation between a received signal and an already known signal; ② a waveform shaper for detecting, from the delay profile, a delay-time portion greater than the length of the guard interval as an ISI portion, and shaping the waveform of a portion of the received signal that conforms to the ISI portion; ③ means for applying FFT processing and channel compensation to the output signal of the waveform shaper and applying IFFT processing to the signal after application of channel compensation to thereby generate a demodulated-signal restoration replica; ④ means for adding the demodulated-signal restoration replica to the received signal; and ⑤ a data demodulator for demodulating data by applying FFT processing to the result of addition.

In accordance with the third receiving apparatus, effects similar to those of the first receiving apparatus can be obtained even if the guard-interval lengths of the already known symbol (pilot symbol) and data symbol are the same. In addition, since it is unnecessary to create an ISI replica, the configuration of the hardware can be simplified.

Other features and advantages of the present invention will be apparent from the following description taken in conjunction with the accompanying drawings.

BRIEF DESCRIPTION OF THE DRAWINGS

FIGS. 4A to 4E are diagrams useful in describing a method of generating an ISI replica;

DESCRIPTION OF THE PREFERRED EMBODIMENTS

(A) Transmission Frame Format

Figure 1:
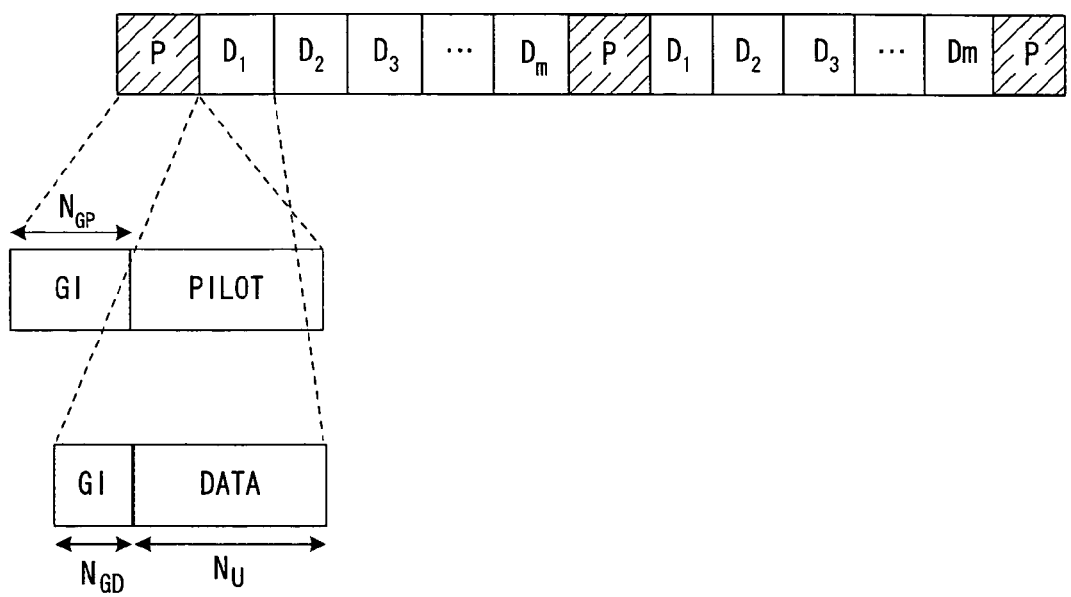
FIG. 1 is a diagram useful in describing a pilot symbol, a data symbol and a transmission frame format according to the present invention.

FIG. 1 is a diagram useful in describing the structure of a pilot symbol (P) and data symbol ($D_i$, where $1 \leq i \leq m$) and transmission frame format according to the present invention.

Figure 2:
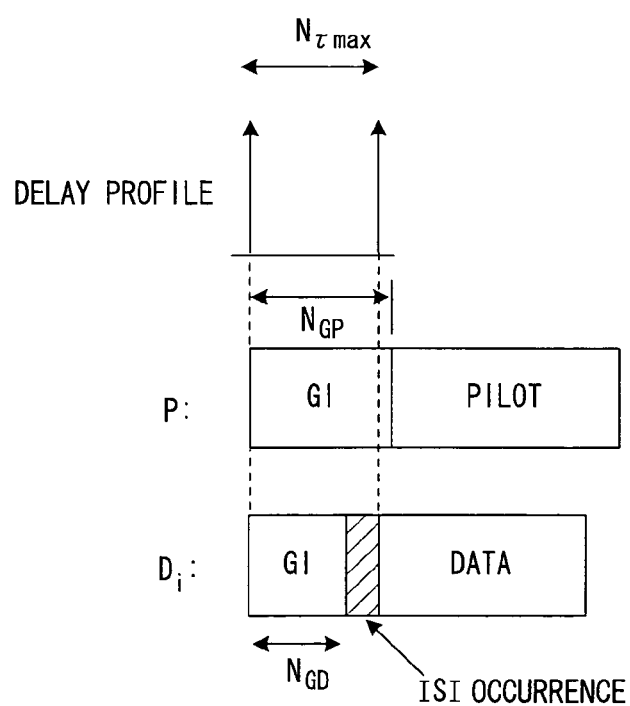
FIG. 2 is a diagram illustrating the relationship between guard-interval lengths $N_{GP}$, $N_{GD}$ of pilot and data symbols, respectively, and delay time $N\tau_{max}$ of a delayed wave.

The pilot symbol P, which is inserted periodically among the data symbols $D_i$, has a guard-interval length different from that of the data symbol. Specifically, the guard-interval length of the pilot symbol P is $N_{GP}$, the guard-interval length of the data symbol is $N_{GD}$, and $N_{GP} > N_{GD}$ holds. Furthermore, the effective symbol lengths ($N_U$) are identical as they are decided by the number of FFT points, i.e., the number of subcarriers. As shown in FIG. 2, the guard-interval length $N_{GP}$ in the pilot symbol P is made greater than the conceivable maximum delay profile (maximum delay time of the delayed wave) $N\tau_{max}$. As a result, even if a delay profile greater than the guard-interval length $N_{GD}$ of the data symbol $D_i$ is generated and ISI is produced in the data symbol, ISI will not occur in the pilot symbol. Accordingly, it is possible to perform accurate channel estimation and measurement of the delay profile by using the pilot symbol. Further, the guard-interval length of the data symbol $D_i$ defined here is assumed to be $N_{GD} \geq 0$; if $N_{GD}=0$ holds, this means that there is no guard interval.

Figure 55:
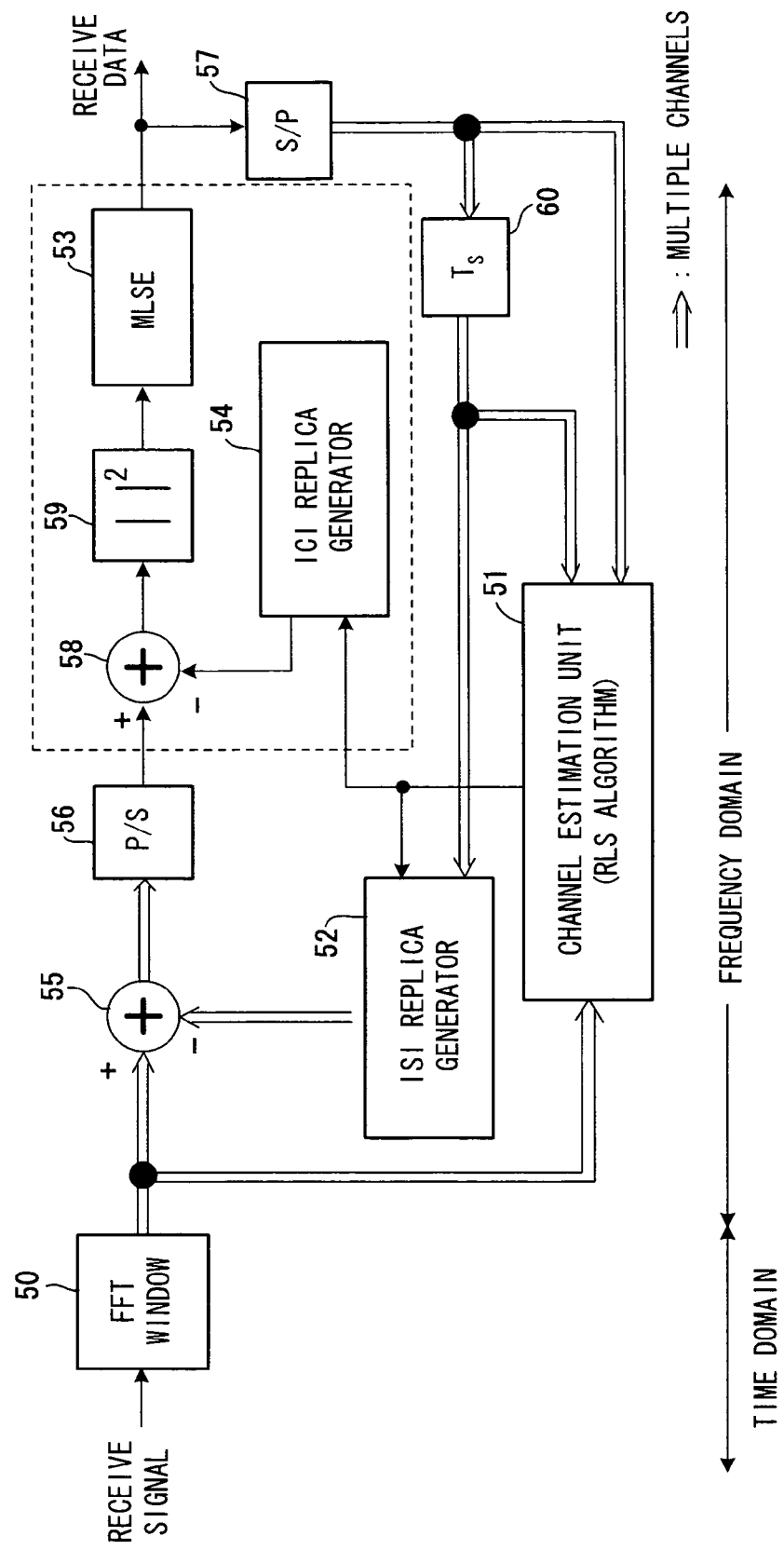
FIG. 55 is a block diagram showing the prior art.

The prior art shown in FIG. 55 performs channel estimation using only the front (preamble signal) of transmit data adopted in a wireless LAN system (IEEE 802.11a) and thenceforth uses an RLS (Recursive Least Squares) algorithm. By contrast, the present invention inserts a variable GI length $N_{GP}$ among the pilot symbols P periodically, thereby implementing ISI-free channel estimation without using a convergence algorithm of the kind used in the prior art. However, with regard to a ($N_{GP}-N_{GD}$) samples in the pilot symbol, transmission efficiency declines with respect to a fixed-GI-length system where $N_{GP}=N_{GD}$ holds. Accordingly, it is also possible to make $N_{GD}$ small in such a manner that the overall transmission efficiency will be the same as that of the prior art.

(B) First Embodiment

Figure 3:
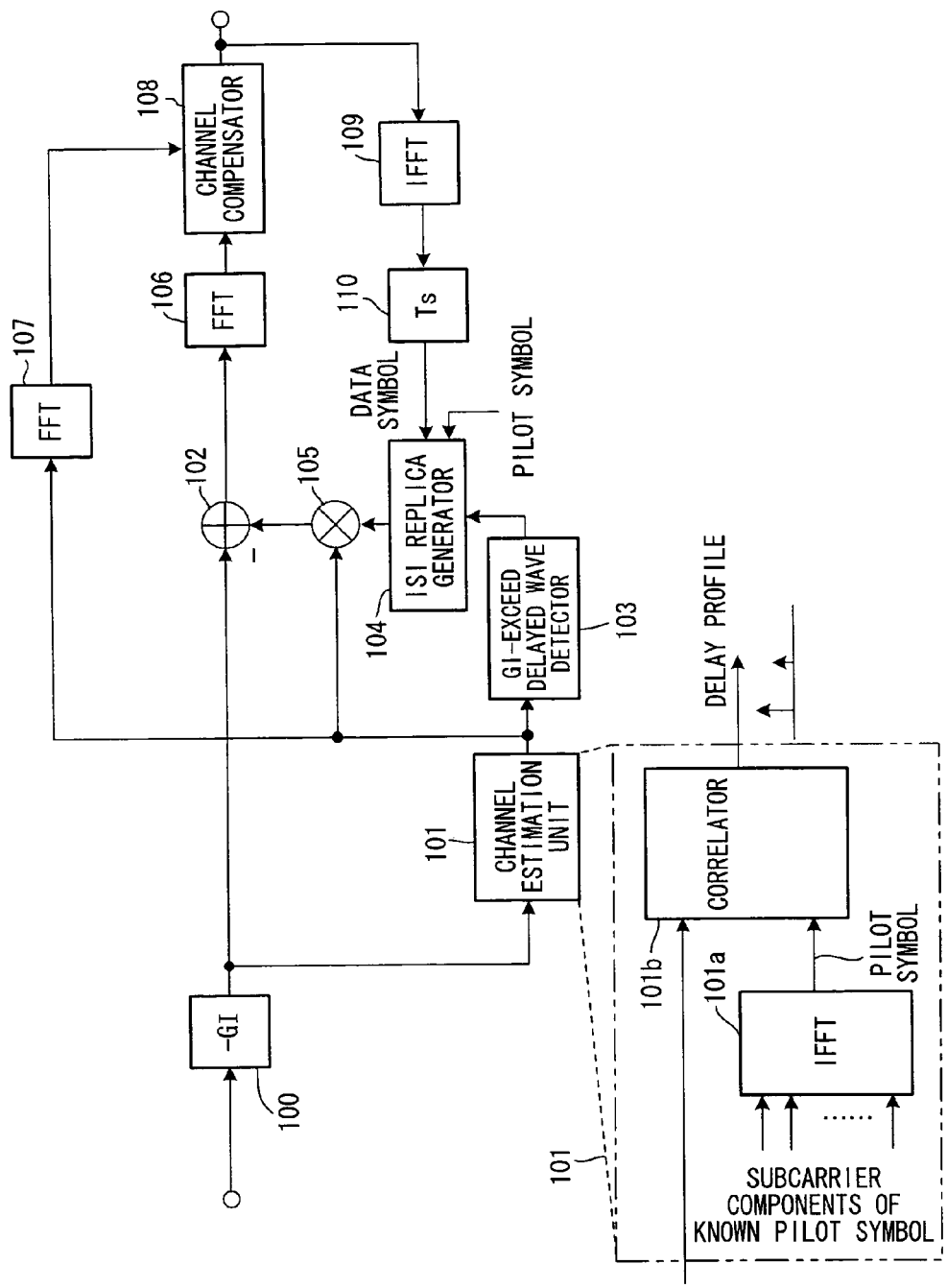
FIG. 3 is a block diagram illustrating a receiving apparatus in an OFDM transmission system according to a first embodiment of the present invention.

FIG. 3 is a block diagram illustrating a receiving apparatus in an OFDM transmission system according to a first embodiment of the present invention. In this embodiment and in the embodiments that follow it, signal processing in a time domain is executed before FFT processing, processing in a frequency domain is executed after FFT processing, and processing in the time domain is executed after IFFT processing. The first embodiment illustrates a case where channel estimation/measurement of delay profile using a receive signal (i.e., time waveform) prior to FFT processing on the receiving side is carried out.

Figure 54:
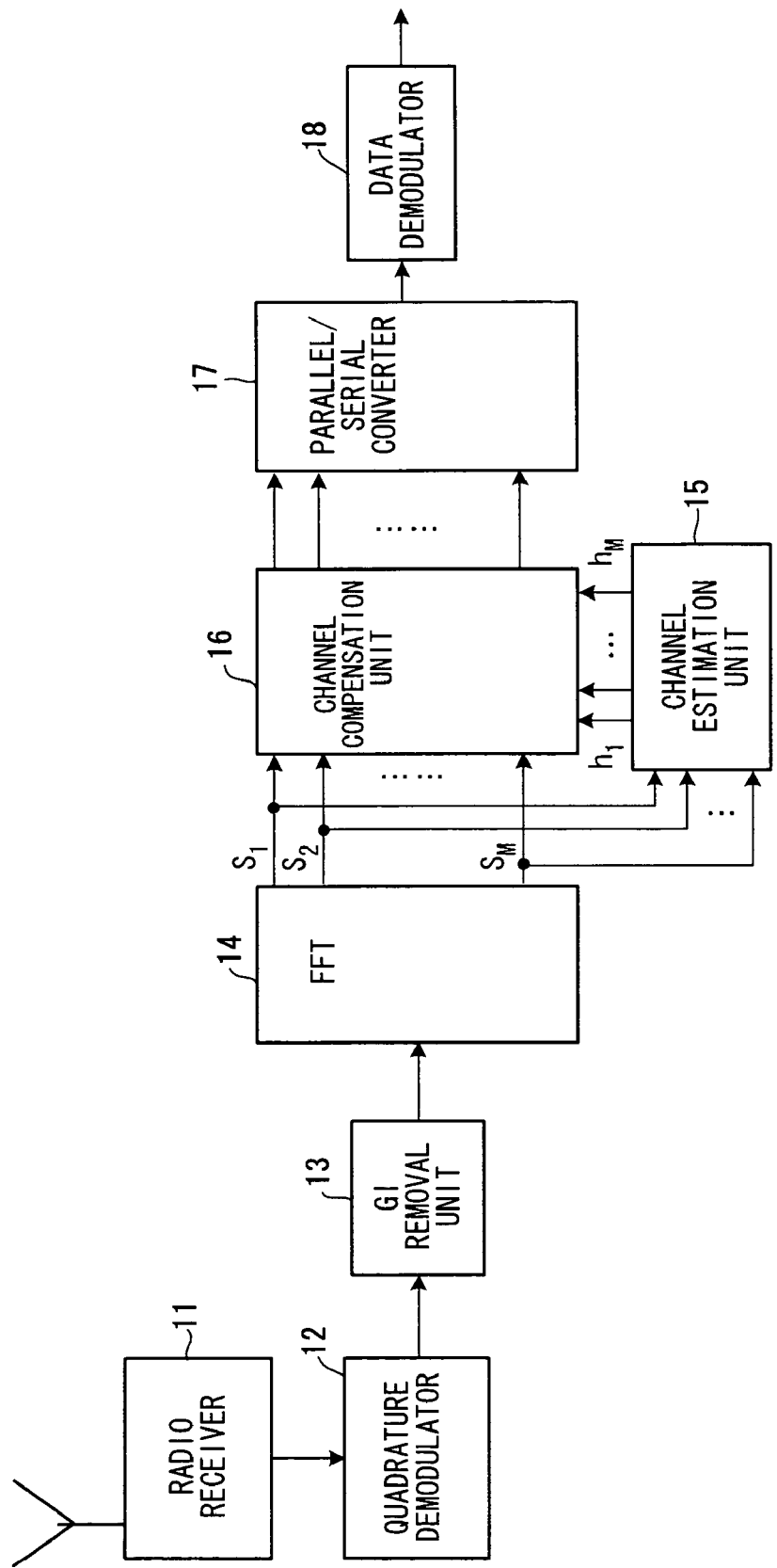
FIG. 54 is a block diagram showing a receiving apparatus in an OFDM transmission system.

A receiving unit (see the radio receiver 11 and quadrature demodulator 12 in FIG. 54) inputs the receive signal to a guard-interval removal unit 100. It should be noted that the guard-interval length $N_{GP}$ added onto the pilot symbol P is greater than the guard-interval length $N_{GD}$ added onto the data symbol $D_i$ ($N_{GP} > N_{GD}$)

The guard-interval removal unit 100 removes the guard interval GI from the receive signal and then inputs the receive signal to a channel estimation unit 101 and a subtractor 102. Since the pilot symbol is an already known signal, an IFFT unit 110a in the channel estimation unit 101 applies IFFT to the subcarrier components of the known pilot symbol to thereby generate a time waveform (replica), and a correlator 101b measures a delay profile by calculating cross correlation between the replica and the received pilot signal portion. In actuality, the correlator 101b extracts N samples of the receive signal, calculates a correlation value upon shifting the replica one sample at a time and thus calculates N samples of values. As a result, a delay profile having peaks at the receive timings of direct and delayed waves is measured.

The delay profile measured by the channel estimation unit 101 is input to a GI-exceed delayed wave detector 103, which performs monitoring to determine whether a delayed wave that has exceeded the guard-interval length $N_{GD}$ of the data symbol Di has been observed. If the delay time $N\tau_{max}$ of the delayed wave becomes greater than $N_{GD}$ ($N_{GD} < N\tau_{max}$), as shown in FIG. 2, then an ISI replica generator 104 generates an ISI replica corresponding to the portion that exceeds $N_{GD}$ (the shaded portion in FIG. 2), namely an ISI replica corresponding to ($N\tau_{max}-N_{GD}$) samples, using the pilot symbol or previous data symbol.

FIGS. 4A to 4E are diagrams useful in describing a method of generating an ISI replica. A delayed wave B lags behind a direct wave A by $N_{GD}$ or more, and the delay time $N\tau_{max}$ satisfies the relation $N_{GD} < N\tau_{max}$. The data symbol $D_0$ of the direct wave A partially overlaps the pilot symbol P of the delayed wave B and sustains ISI from the pilot symbol P of the delayed wave B. It is necessary, therefore, to remove this portion of the pilot symbol from the receive signal. The time (number of samples) subjected to interference is $y=(N\tau_{max}-N_{GD})$ Accordingly, the ISI replica generator 104 cuts the y portion out of the known pilot-signal waveform and generates it as the ISI replica (see the hatched portion in FIG. 4D). A first channel compensator 105 multiplies the ISI replica by the channel estimation value to thereby apply channel compensation and inputs the result to the subtractor 102. The latter subtracts the ISI replica from the receive signal and inputs the difference to an FFT arithmetic unit 106, which is a stage that follows the direct wave A and delayed wave B (data symbol D1) shown on the left side of FIG. 4E.

The FFT arithmetic unit 106 applies FFD processing to the entered receive signal to thereby generate data elements on a per-subcarrier basis. An FFT arithmetic unit 107 applies FFT processing to the channel estimation signal to thereby generate a channel compensation value for each subcarrier. A channel compensator 108 multiplies the result of FFT processing by the channel compensation value subcarrier-by-subcarrier, thereby demodulating the data elements of the number of subcarriers that constitute the data symbol $D_0$, and outputs the demodulated data.

An IFFT arithmetic unit 109 applies IFFT processing to the demodulated data of the number of subcarriers constituting the data symbol $D_0$ output from the channel compensator 108 and outputs the time-waveform signal of the data symbol $D_0$. A delay circuit 110 delays this time-waveform signal by a time equivalent to one symbol time Ts and inputs the delayed signal to the ISI replica generator 104.

In a manner similar to that described above, a data symbol D1 (see FIG. 4) of the direct wave A partially overlaps the previous data symbol $D_0$ of the delayed wave B and sustains ISI from the data symbol $D_0$ of the delayed wave B. It is necessary, therefore, to remove this portion of the data symbol $D_0$ from the receive signal. The time (number of samples) subjected to interference is y. Accordingly, the ISI replica generator 104 cuts the y portion out of the time-waveform signal of the previous data symbol $D_0$ to generate it as the ISI replica (see the hatched portion in FIG. 4D).

The first channel compensator 105 multiplies the ISI replica by the channel estimation value to thereby apply channel compensation and inputs the result to the subtractor 102. The latter subtracts the ISI replica from the receive signal and inputs the difference to the FFT arithmetic unit 106, which is a stage that follows the direct wave A and delayed wave B (data symbol $D_1$) shown on the right side of FIG. 4E. Processing is subsequently executed in a manner similar to that of the data symbol $D_0$.

Thenceforth, and in similar fashion, ISI replicas are generated and removed from the receive signal and FFT processing is applied, after which channel compensation is applied and each of the data symbols is demodulated and output.

Figure 5:
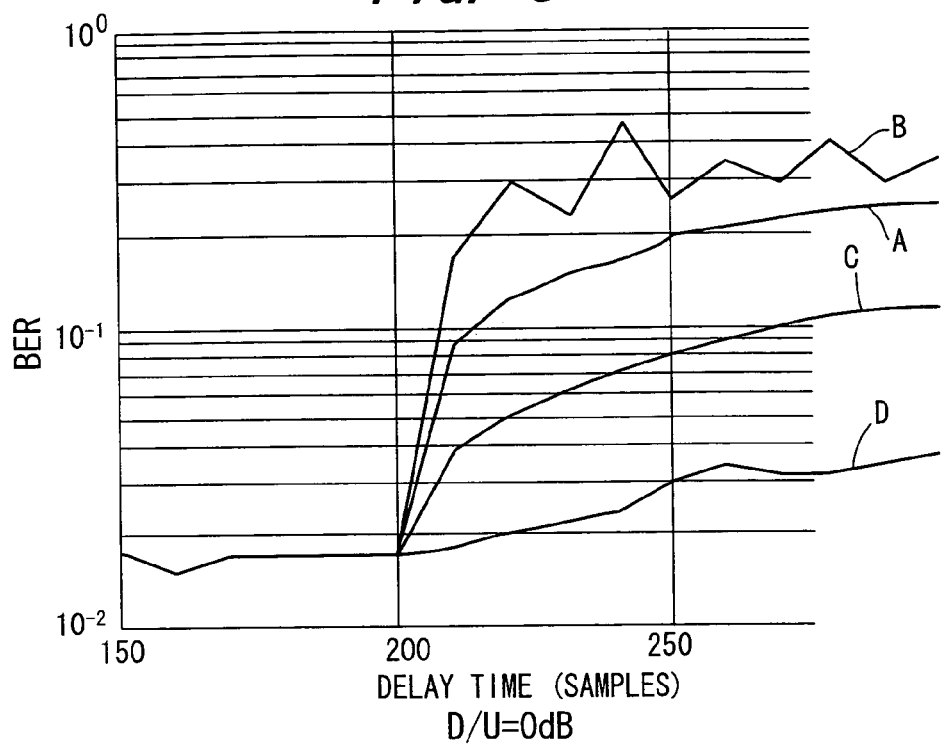
FIG. 5 is a first delayed-wave position (delay time) vs. BER performance.
Figure 6:
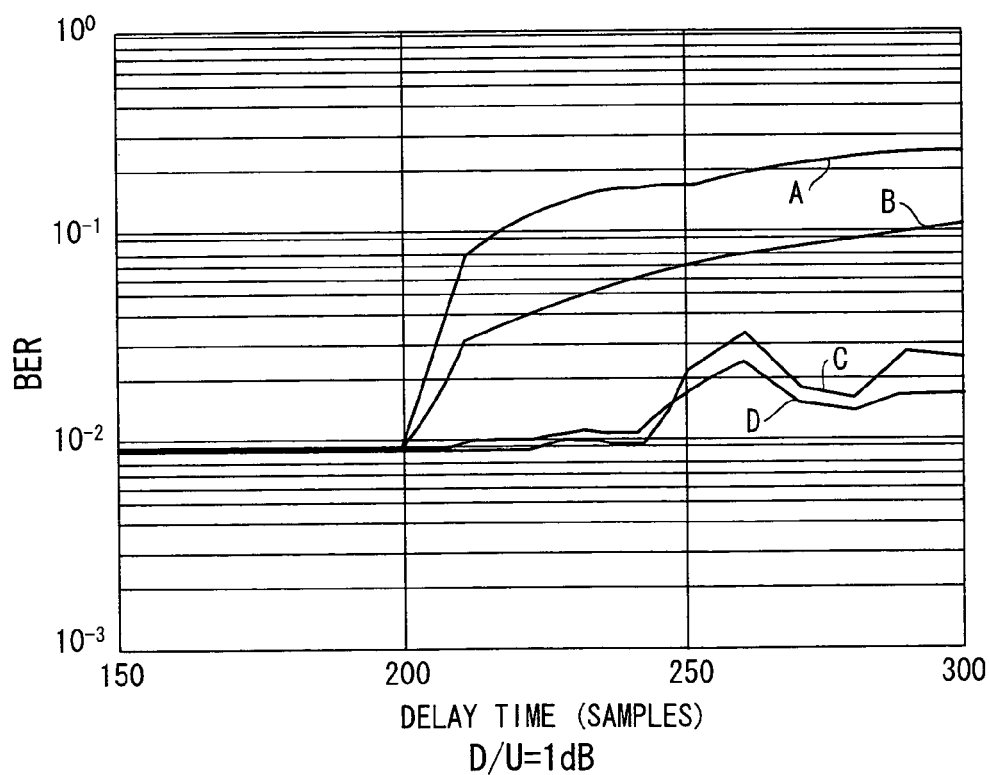
FIG. 6 is a second delayed-wave position (delay time) vs. BER performance.
Figure 7:
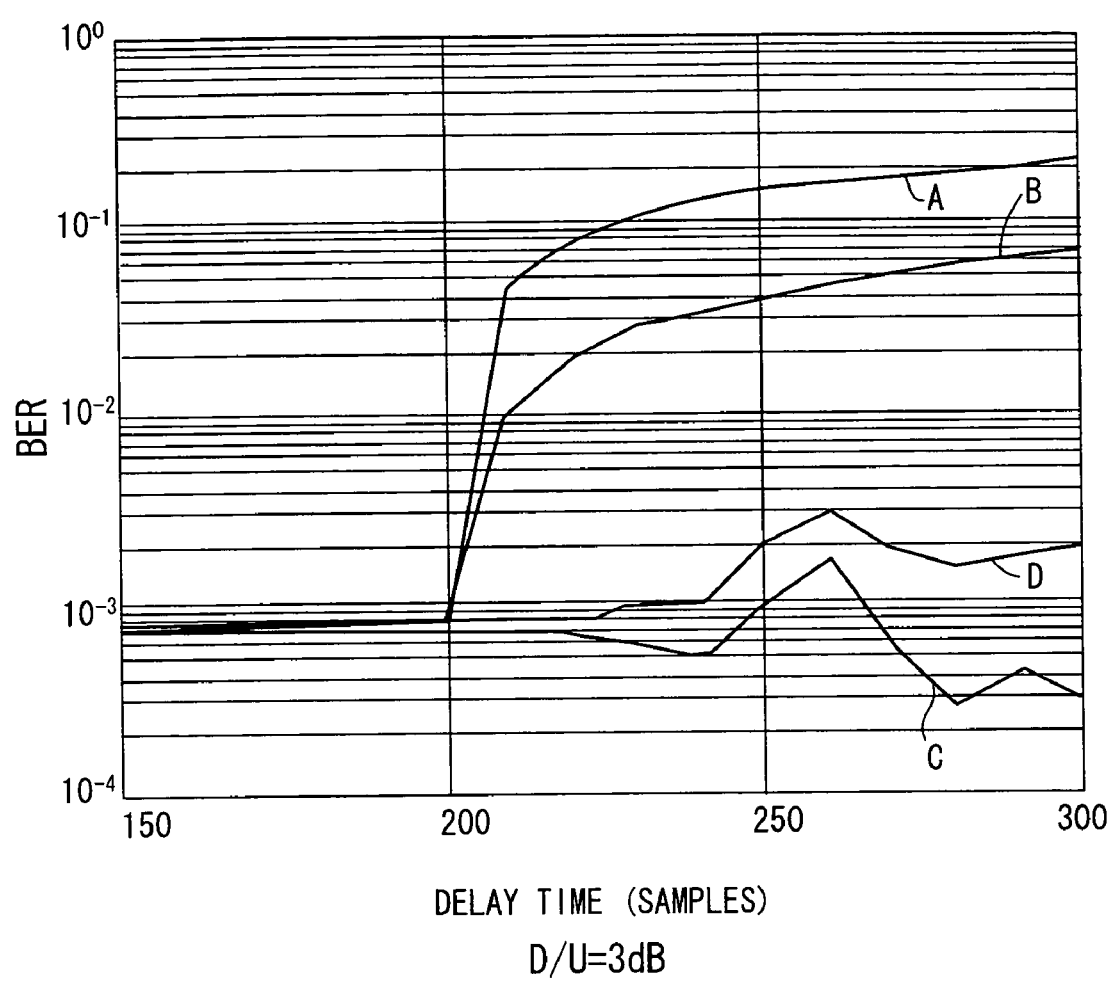
FIG. 7 is a third delayed-wave position (delay time) vs. BER performance.

FIGS. 5 to 7 are delayed-wave position (delay time) vs. BER performances (results of simulations) in embodiments inclusive of the one described below. Simulation parameters are shown in Table 1 below.

TABLE 1

| SIMULATION PARAMETERS | |
|---|---|
| NUMBER OF CARRIERS | N = 1024 |
| OFDM VALID SYMBOLS (SAMPLES) | $N_U$ = 1024 |
| PILOT-SYMBOL SPACING (SYMBOLS) | 14 |
| PILOT-SYMBOL LENGTH | FIXED: $N_{GP}$ = 200 (=NGD) |
|  | VARIABLE: $N_{GP}$ = 400 ($N_{GC}$ × 2) |
| Eb/No | 20 dB |
| MODULATION SCHEME | 16 QAM |
| DEMODULATION SCHEME | BASED UPON CLAIMS OF THE INVENTION |
| TRANSMISSION-PATH MODEL | 2-PATH MODEL (TIME INVARIANT) |
|  | D/U = 0, 1, 3 dB |
|  | FIXED PHASE: FIXED AT 33 degree |
|  | DELAYED-WAVE POSITION: 150 TO 300 SAMPLES |

Here a "FIXED" pilot-symbol length means a length that is the same as the length of the data symbol ($N_{GP}=N_{GD}$), and a "VARIABLE" pilot-symbol length means that $N_{FP}=2N_{GD}$ holds. This illustrates a delayed-wave position (sample) versus bit error rate (BER) performance with respect to delayed waves that are up to 1.5 times the GI length of the data sample. A case in which delayed-wave positions are 150 to 200 samples is a BER performance at a delayed wave within the GI. By contrast, the extent to which degradation of the BER performance at the time of a delayed wave that exceeds the GI is suppressed is an effect of the present invention. FIGS. 5 to 7 illustrate performances of the first embodiment at each D/U (0 dB, 1 dB, 3 dB). A performance in a case where the reception scheme of the present invention is not implemented is indicated at A, and the performance of the first embodiment is indicated at B. It will be understood that with the exception of D/U=0 dB, the BER performance is improved over that of the OFDM communication system according to the prior art. Here D/U is a value that is the result of dividing direct-wave (desired-wave) power D by delayed-wave (undesired-wave) power U.

Figure 8:
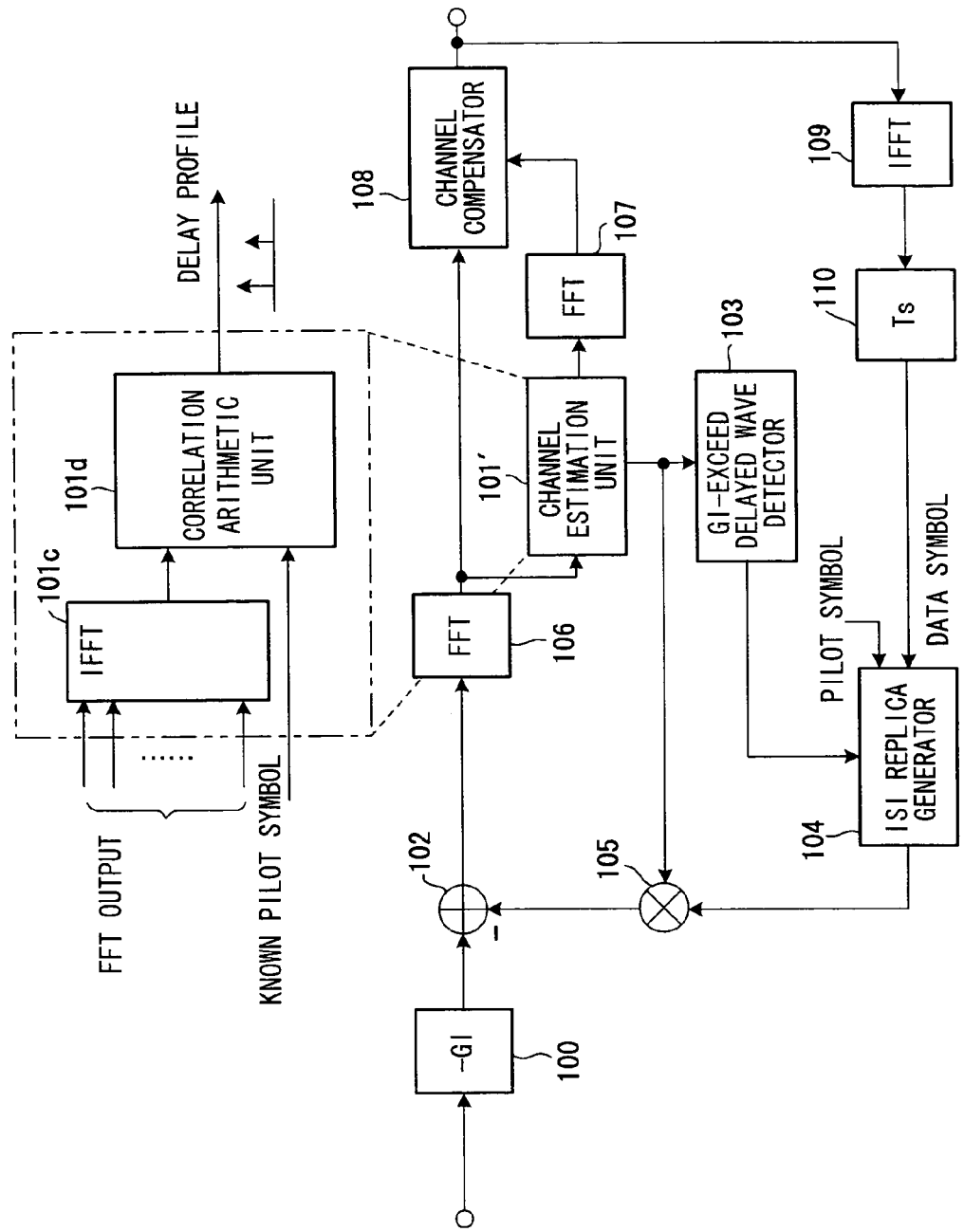
FIG. 8 is a modification of the first embodiment.

FIG. 8 is a modification of the first embodiment and illustrates a case where channel estimation is carried out after FFT. Components identical with those of the first embodiment (FIG. 2) that performs channel estimation before FFT are designated by like reference characters.

An IFFT unit 101c in a channel estimation unit 101' applies IFFT processing to the result of processing by the FFT 106, thereby generating a receive signal of a time waveform. A correlation arithmetic unit 101d measures a delay profile by calculating the correlation between the time waveform of the receive signal and the time waveform (replica) of the known pilot symbol. More specifically, the correlation arithmetic unit 101d extracts N samples of the receive signal, calculates a correlation value upon shifting the replica one sample at a time and thus calculates N samples of values. As a result, a delay profile having peaks at the receive timings of direct and delayed waves is measured. Operation similar to that of the first embodiment is carried out thereafter.

The description rendered above illustrates a case where there are two paths (direct and delayed waves) and the ISI path is one path. However, the present invention is not limited to the number of paths on which ISI is generated, and it will suffice to calculate replicas the number of which is equivalent to the number of paths on which ISI is produced. Further, the number of paths to undergo elimination may be limited by the size (power) thereof or by the magnitude of the delay time. The number of paths to undergo elimination is decided by a tradeoff between performances and degree of complexity. Further, the modification of FIG. 8 can also be applied to the embodiments described later.

(C) Second Embodiment

Figure 9:
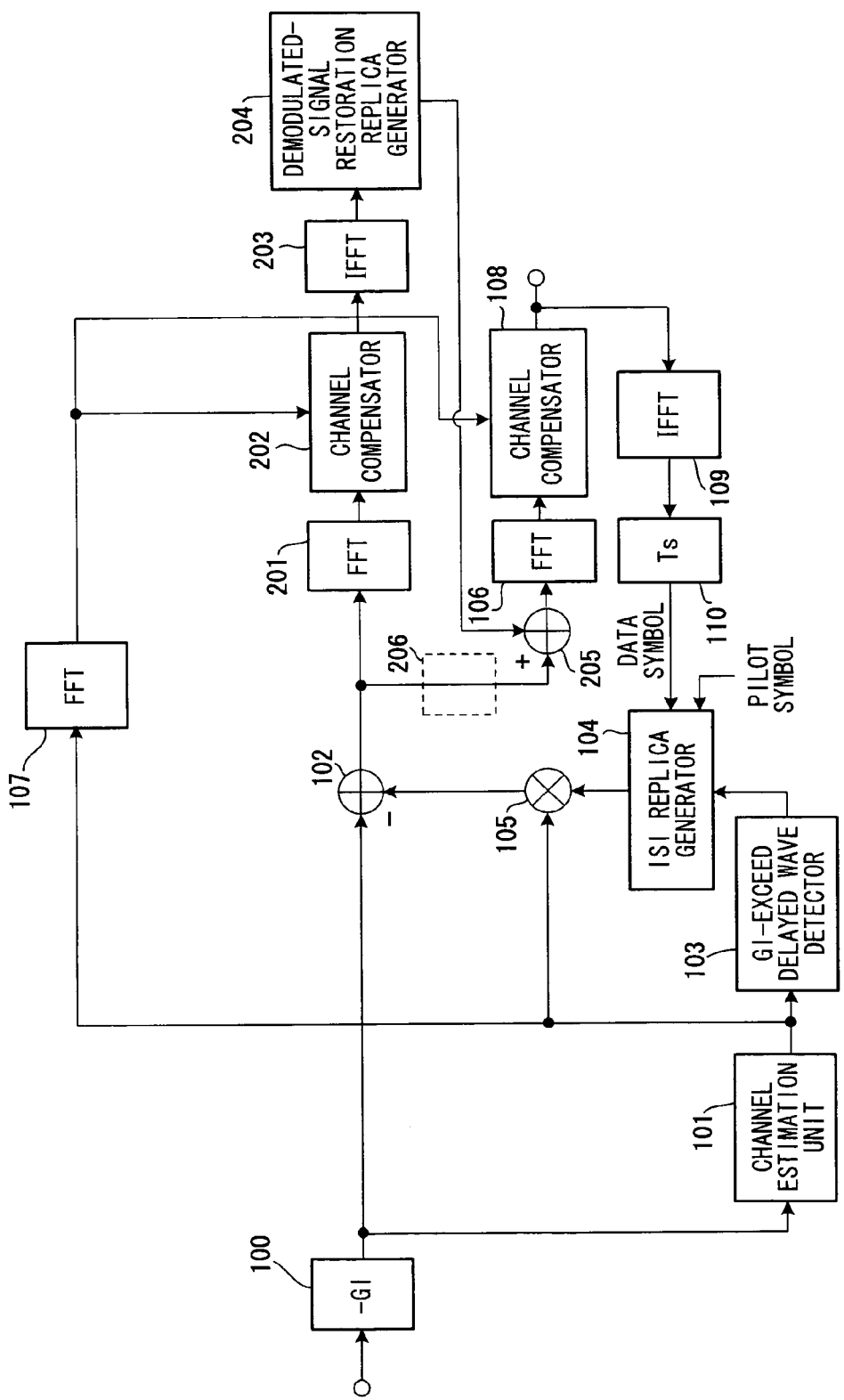
FIG. 9 is a block diagram illustrating a receiving apparatus according to a second embodiment of the present invention.

FIG. 9 is a block diagram illustrating a receiving apparatus according to a second embodiment. Whereas the first embodiment suppresses only ISI, the second embodiment simultaneously suppresses ICI in addition to ISI.

Figure 10A:
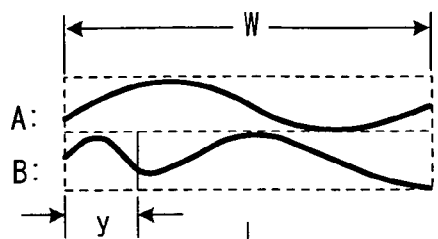
FIGS. 10A to 10F are diagrams useful in describing the principle of ICI suppression.
Figure 10B:
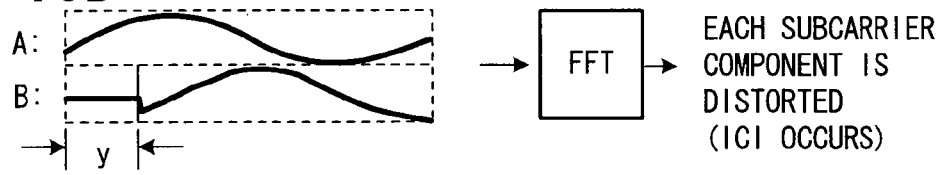
Figure 10C:
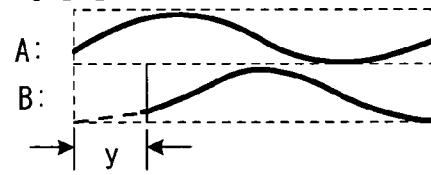

FIGS. 10A to 10F are diagrams useful in describing the principle of ICI suppression. In the first embodiment, the receive signal shown in FIG. 10B is subjected to FFT processing upon eliminating the the ISI segment y of the delayed wave B shown in FIG. 10A in order to remove ISI.

However, the delayed wave B is discontinuous at the portion corresponding to the ISI segment y and, moreover, is not a periodic waveform. As a consequence, each subcarrier component obtained by FFT processing includes distortion ascribable to ICI. In order to eliminate such ICI, it will suffice to insert a waveform that will make the delayed wave B smooth over the span of the ISI segment y and periodic as well, as indicated by the dashed line in FIG. 10C.

Figure 10D:
Figure 10E:
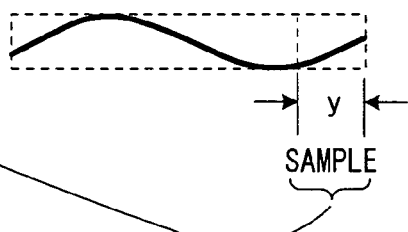

Accordingly, the receive signal of FIG. 10B is subjected to FFT processing, as shown in FIG. 10D, after which IFFT processing is applied, thereby providing a continuous signal waveform, as shown in FIG. 10E.

Figure 10F:
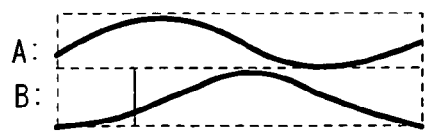

If the tail-end segment y of the continuous signal waveform of FIG. 10E is cut out and inserted into the segment y at the front end of the receive signal of FIG. 10B, the delayed wave B will become a continuous periodic waveform, as shown in FIG. 10F.

If FFT processing is applied to the signal of FIG. 10F, ICI is suppressed. It should be noted that, ideally, it is necessary for the delayed wave B shown in FIG. 10F to be made a continuous periodic waveform by the waveform of FIG. 10E. However, since the waveform of FIG. 10B is subjected to FTT and IFFT processing, the waveform of FIG. 10E departs slightly from the ideal shape.

Components in the second embodiment of FIG. 9 that are identical with those of the first embodiment of FIG. 3 are designated by like reference characters. An FFT processor 201 applies FFD processing to the receive signal (see FIG. 10B) of data symbol $D_i$, which has entered from the subtractor 102, thereby generating data elements on a per-subcarrier basis. A channel compensator 202 multiplies the result of FFT processing by a channel compensation value subcarrier by subcarrier. An IFFT processor 203 applies IFFT processing to demodulated data of the number of subcarriers constituting the data symbol $D_i$ output from the channel compensator 202 and outputs the time-waveform signal (see FIG. 10E) of data symbol $D_i$.

A demodulated-signal restoration replica generator 204 cuts out the signal portion of the y segment at the tail end of the time-waveform signal that enters from the IFFT processor 203, thereby generating a demodulated-signal restoration replica (ICI replica), and inputs the replica to a combiner 205. The latter combines the demodulated-signal restoration replica with the receive signal (see FIG. 10B) that is output from the subtractor 102, thereby producing a continuous signal waveform, and inputs this waveform to the FFT arithmetic unit 106. It should be noted that in a case where a time Td is required to generate the demodulated-signal restoration replica, a delay circuit 206 indicated by the dashed line is provided, delays the signal output from the subtractor 102 and inputs the delayed signal to the combiner 205.

The FFT arithmetic unit 106 applies FFD processing to the combined signal output from the combiner 205 to thereby generate data elements on a per-subcarrier basis, and the channel compensator 108 multiplies the result of FFT processing by the channel compensation value subcarrier-by-subcarrier and outputs the result of channel compensation as a demodulated signal. As a result, ICI can be inhibited together with ISI.

In accordance with the second embodiment, as indicated by the performance C in FIGS. 5 to 7, it will be understood that at D/U=3 dB, a BER performance is obtained that surpasses a performance in which the delay falls within the guard interval $N_{GD}$. Further, at D/U=0 dB, a performance improving effect according to the present invention manifests itself, and almost no degradation in the performance is observed in an exacting environment where D/U=1 dB holds. Thus it will be understood that the performance is improved greatly over that of the OFDM communication system according to the prior art.

(D) Third Embodiment

The second embodiment suppresses ISI and ICI simultaneously. That is, as shown in FIG. 10D, the receive signal of FIG. 10B is subjected to FFT processing, after which a continuous-signal waveform is obtained, as shown in FIG. 10E, if IFFT processing is applied. The tail-end segment y of the continuous-waveform signal of FIG. 10E is cut out and inserted into the segment y at the front end of the receive delayed signal of FIG. 10B, thereby making the delayed wave B a continuous periodic waveform, as shown in FIG. 10F, then the signal of FIG. 10F is subjected to FFT processing to suppress ICI.

In the second embodiment, as set forth above, only the segment y at the front end of the delayed wave B is replaced with the replica signal; the ISI portion of the desired wave (direct wave) A is not replaced with a replica signal. The segment y at the front end of the desired wave (direct wave) A undergoes fading and picks up noise, as a result of which quality declines. On the other hand, the demodulated-signal restoration replica is produced as shown in FIG. 10E, and the segment y at the front of this replica has a quality superior to that of the received desired wave A. Accordingly, the third embodiment supplements the second embodiment by cutting out the segment y at the front end of the continuous signal waveform of FIG. 10E and uses it as a replica to replace the segment y at the front end of the received desired signal A of FIG. 10B. As a result, demodulation quality can be improved further.

Figure 11:
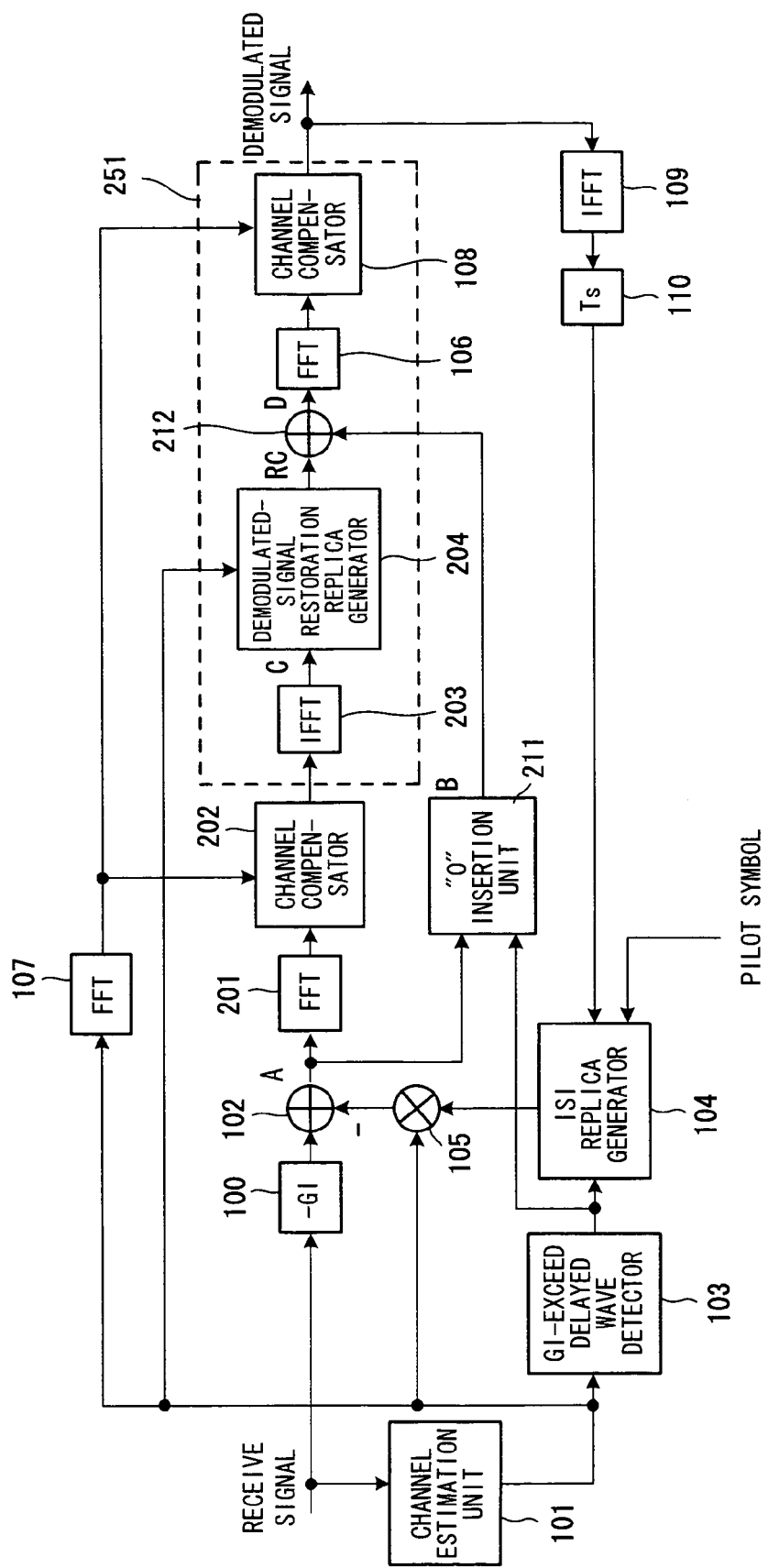
FIG. 11 is a block diagram illustrating a receiving apparatus according to a third embodiment of the present invention.
Figure 12:
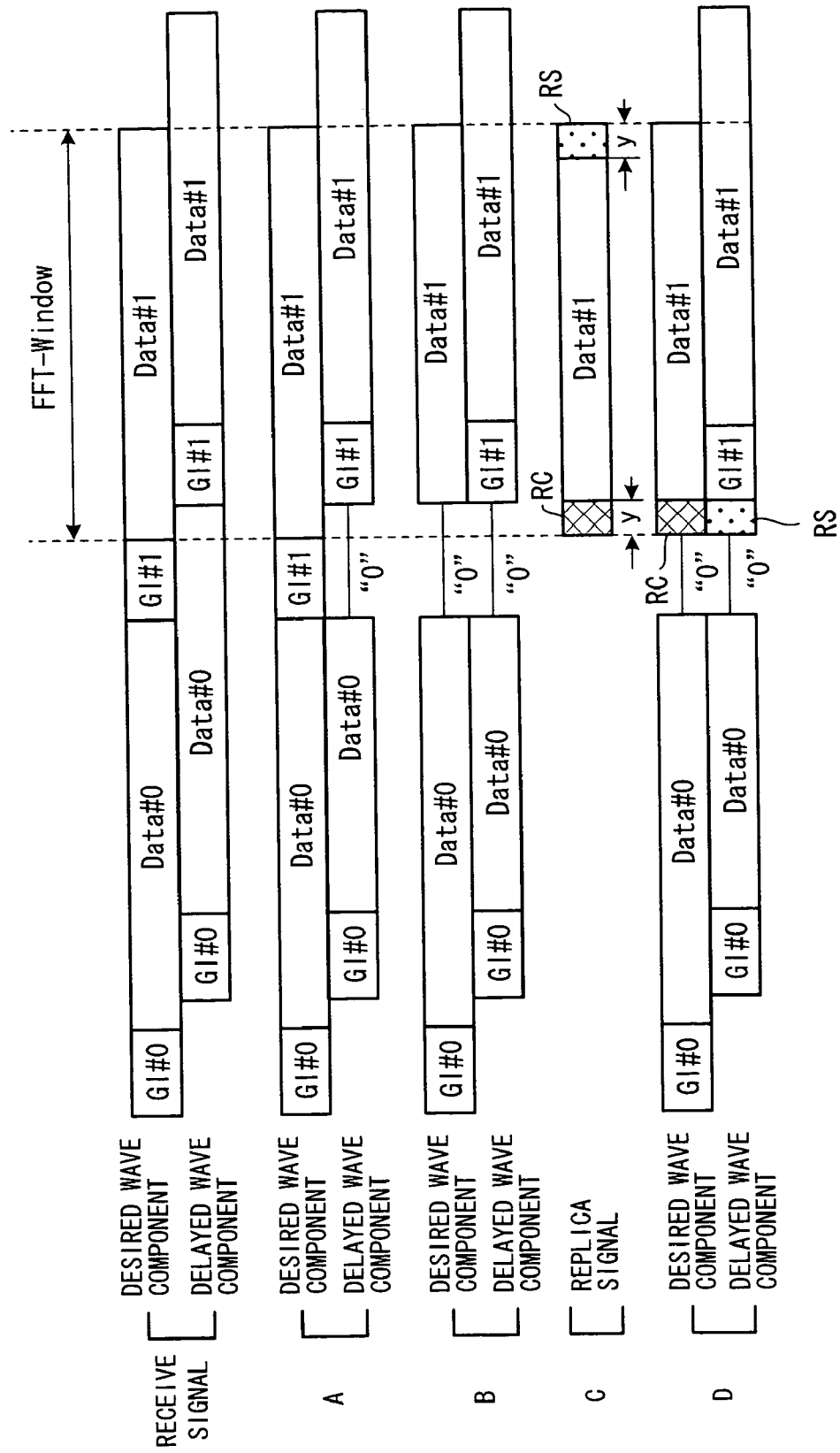
FIG. 12 is a diagram useful in describing signal phase of a desired wave and of delayed wave of portions A to D.

FIG. 11 is a block diagram illustrating a receiving apparatus according to a third embodiment of the present invention, and FIG. 12 is a diagram useful in describing signal phase of desired waves and of delayed waves of portions A to D.

In FIG. 11, a "0" insertion unit 211 inserts "0" into the ISI portion of a desired-wave component of the signal (see signal A in FIG. 12) that is output from the subtractor 102. The FFT 201, channel compensator 202 and IFFT unit 203 subject the output signal of the subtractor 102 to FFT processing and channel compensation and apply IFFT processing to the result of demodulation following channel compensation. The demodulated-signal restoration replica generator 204 outputs a y segment RC at the front end and y segment RS at the tail end of the signal (see signal C in FIG. 12), which has undergone IFFT processing, as demodulated-signal restoration replicas (restoration replicas). An adder 212 adds the restoration replicas RC and RS to the y segments at the front ends of the desired wave and delayed-wave signal (see signal B in FIG. 12), respectively, which are output from the "0" insertion unit 211, and outputs the result. The FFT arithmetic unit 106 and channel compensator 108 apply FFT processing and channel compensation to the result of addition (see signal D in FIG. 12) and outputs the demodulated signal. In parallel with the foregoing, generation of the ISI replica and processing for removing the ISI replica from the receive signal, described in the first embodiment, are carried out.

In a case where a plurality of delayed waves that exceed the GI exist, the number of ISI samples of "0" insertion is decided under conditions of (a) maximum power path, (b) minimum delay path or (c) a path for which (a)×(b) is maximum.

Figure 13:
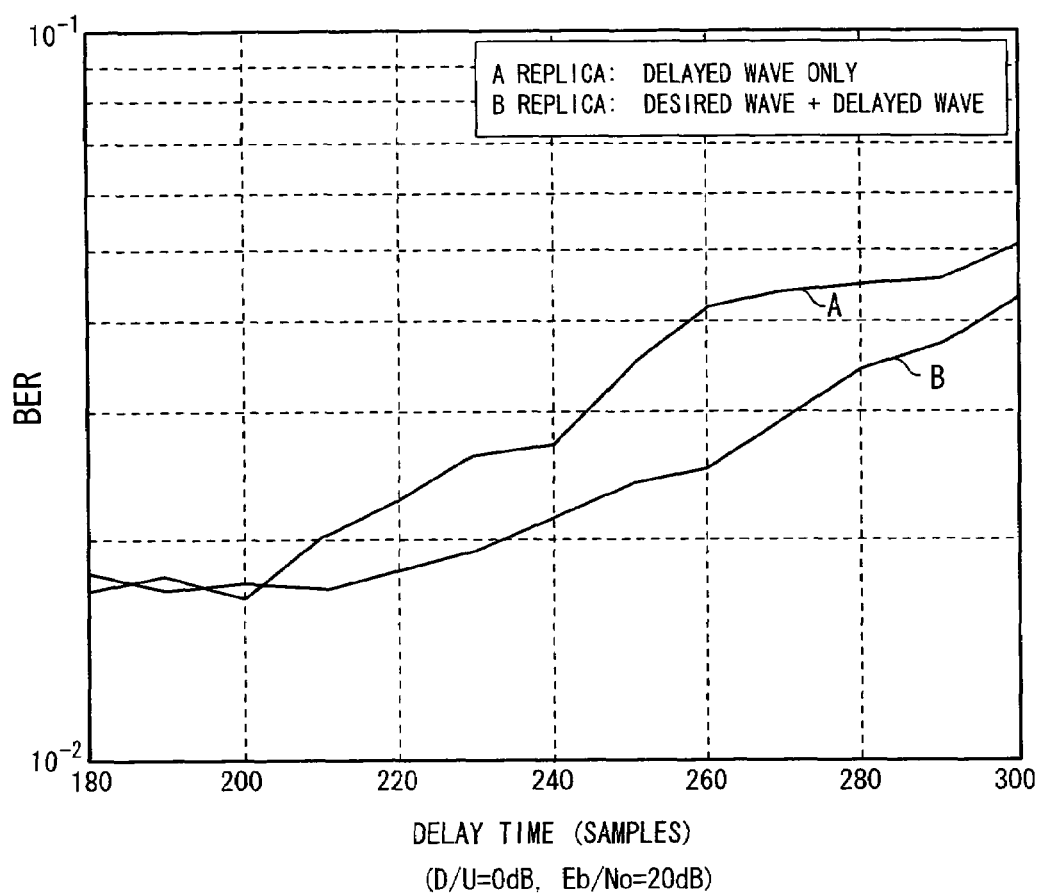
FIG. 13 is a diagram useful in describing the effects of the third embodiment.

FIG. 13 is a diagram useful in describing the effects of the third embodiment. In a delay-time-BER—performance in case of D/U=0 dB, Eb/N0=20 dB, A represents the performance of the second embodiment and B the performance of the third embodiment. In accordance with the third embodiment, it will be understood that the improving effect is obtained even under the stringent condition D/U=0 dB. Furthermore, it has been confirmed that a particularly great improvement is obtained under lax conditions (D/U=1 dB, 3 dB, etc.).

Figure 14:
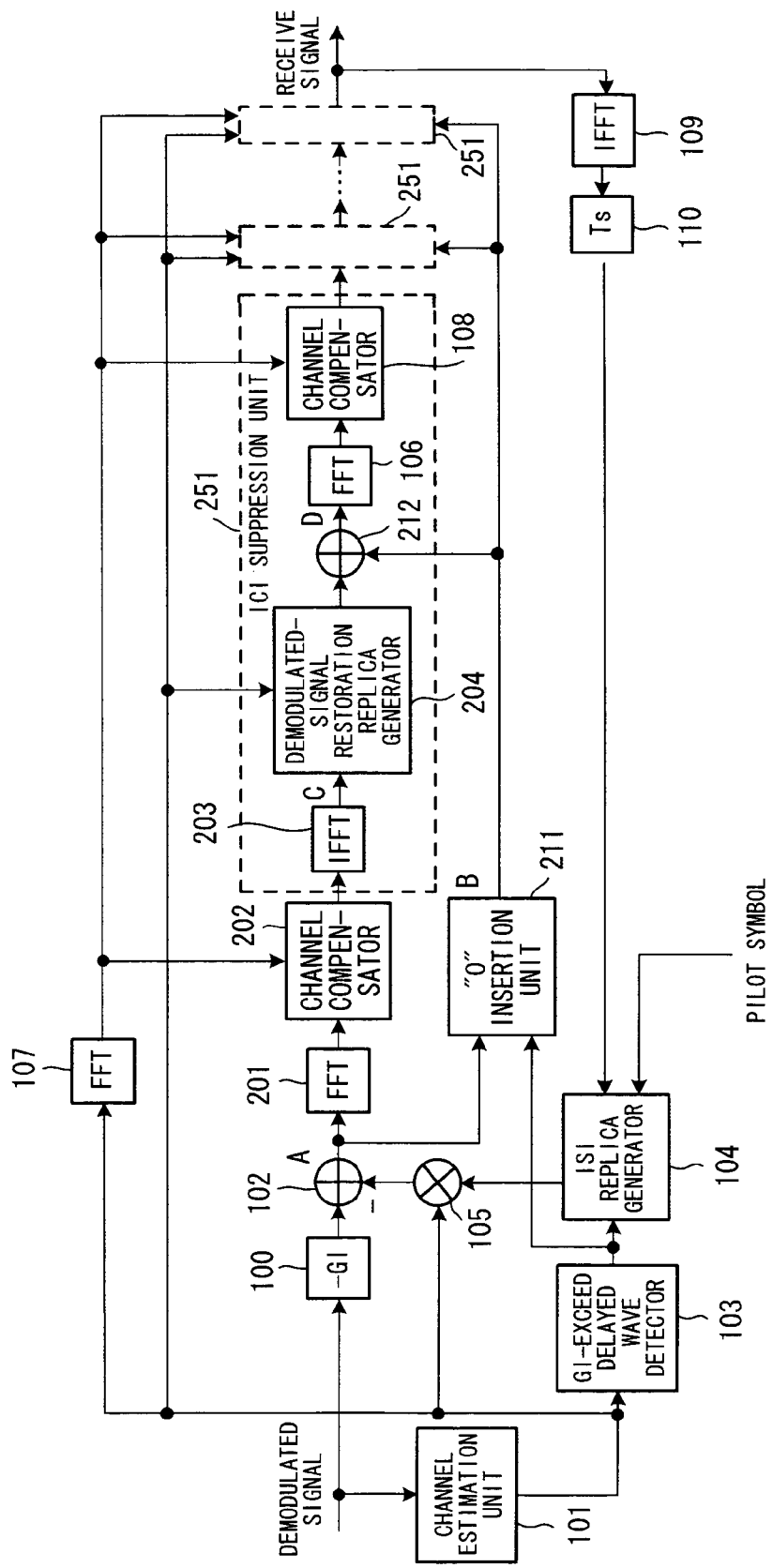
FIG. 14 is a modification of the third embodiment and shows an example of an arrangement in which ICI suppression units are cascade-connected in a number of stages.

FIG. 14 is a modification of the third embodiment. This modification has an arrangement in which a number of ICI suppression unit 251 are cascade-connected. The ICI suppression unit 251 comprises the IFFT unit 203 for applying IFFT processing to the input signal; the replica generator 204 for generating a restoration replica from the output signal of the IFFT unit 203; the adder 212 for adding the restoration replica to the output signal of the "0" insertion unit 211; the FFT arithmetic unit 106 for applying FFT processing to the result of addition; and the channel compensator 108. If the number of iterations is two, two of the ICI suppression units 251 are cascade-connected. In general, if the number of iterations is k, k-number of the ICI suppression units 251 are cascade-connected.

Figure 15:
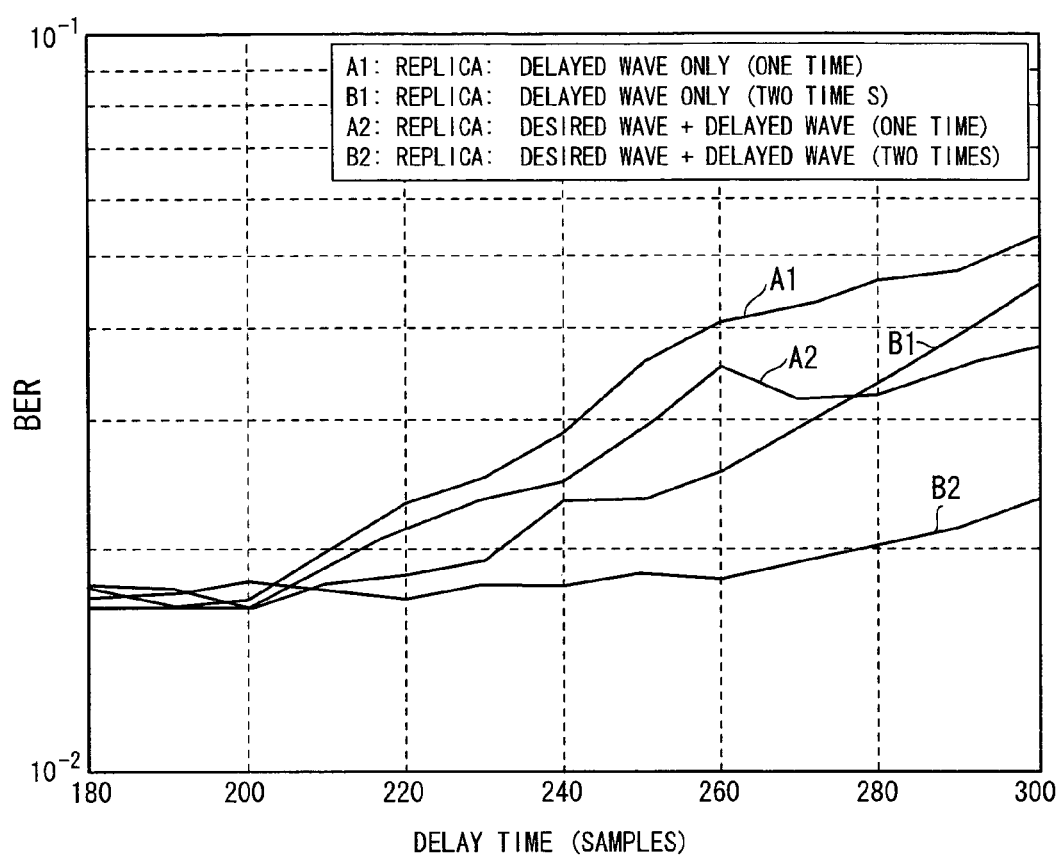
FIG. 15 is a diagram useful in describing the effects of this modification.

FIG. 15 is a diagram useful in describing the effects of this modification. In a delay-time-BER—performance in case of D/U=0 dB, Eb/N0=20 dB, A1, A2 represent the performances of the second embodiment, B1, B2 the performances of the third embodiment, A1, B1 performances when there is a single ICI suppression unit 251 (no iterations) and A2, B2 performances when there are two ICI suppression units 251 (one iteration).

In the second embodiment, the performance improving effect ascribable to iteration is small. In accordance with the present invention, however, it will be understood that a performance substantially equivalent to that within the guard interval (less than 200 samples in the Figure) is obtained by performing iteration only once.

(D) Fourth Embodiment

Figure 16:
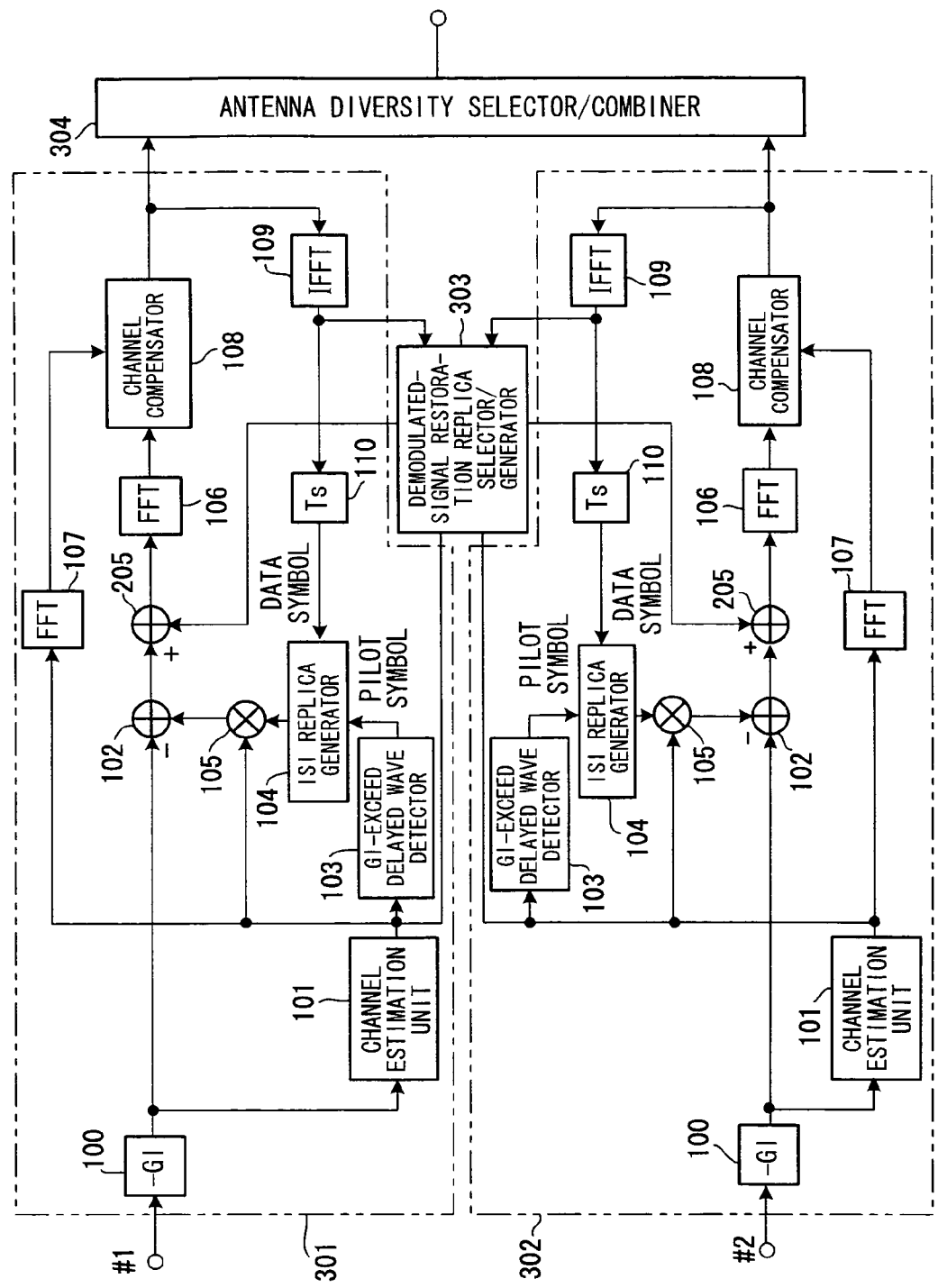
FIG. 16 is a block diagram of a diversity arrangement according to a fourth embodiment of the present invention.

FIG. 16 is a block diagram of a diversity arrangement according to a fourth embodiment of the present invention. Here the arrangement of the second embodiment is provided in two branches, ICI is eliminated in each branch using the demodulated-signal restoration replica of the branch having the larger D/U, and the demodulated signals of both branches are subjected to maximum-ratio combining and the result is output, or the demodulated signal of the branch having the larger D/U is selected and output.

In FIG. 16, receivers 301, 302 in respective ones of the branches have functions identical with those of the second embodiment, and components identical with those of FIG. 9 are designated by like reference characters. This embodiment differs in that the FFT arithmetic units 106, 201 are made a common unit 106, the channel compensators 108, 202 are made a common compensator 108 and the IFFT units 109, 203 are made a common unit 109, and the FFT arithmetic unit 201, channel compensator 202 and IFFT unit 203 are eliminated.

A demodulated-signal restoration replica selector/generator 303 calculates D/U in each branch based upon delay profiles that enter from the channel estimation units 101 in the receivers 301, 302 of the respective branches, selects the signal that enters from the IFFT unit 109 having the larger D/U, creates a demodulated-signal restoration replica (ICI replica) using the selected signal and inputs the created replica to the combiners 205 of the receivers 301, 302 in each of the branches. An antenna diversity selector/combiner 304 subjects the demodulated signals that enter from the receivers 301, 302 of the respective branches to, e.g., maximum-ratio combining and outputs the result. It should be noted that the D in D/U indicates the power of the direct wave (desired wave) that enters from the channel estimation unit 101 and that U indicates the power of the delayed wave (ISI portion), which is the undesired wave. The power of the ISI portion is low if D/U is large and high if D/U is small.

In the fourth embodiment, the ICI replica signal of the branch having the larger D/U is used (shared) as the ICI replica signal of the branch having the smaller D/U by diversity reception, thereby improving the quality of the demodulated signal of each branch. After the quality of the demodulated signal of each branch is improved, antenna diversity selection/combination similar to that of the prior art is carried out, thereby assuring a stable reception performance under stringent conditions. In L (>2) branches, it will suffice to use the ICI replica of the branch having the maximum D/U. The fourth embodiment can be termed a performance improving scheme that employs diversity gain.

Figure 17:
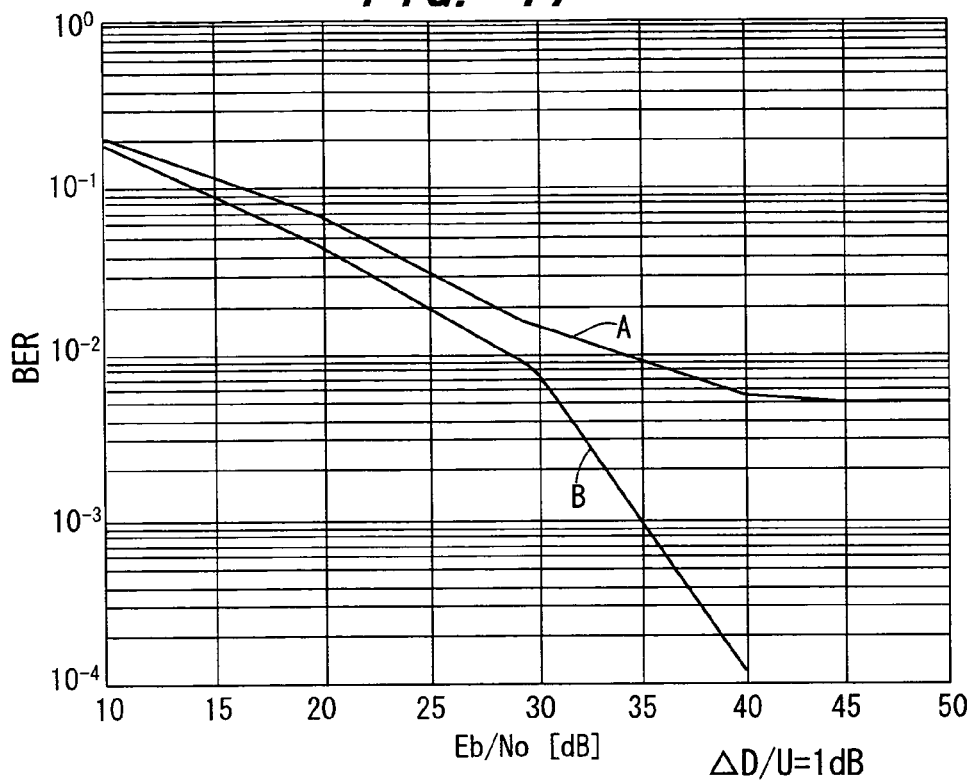
FIG. 17 is a first receive performance diagram for describing the effects of 2-branch diversity reception.
Figure 18:
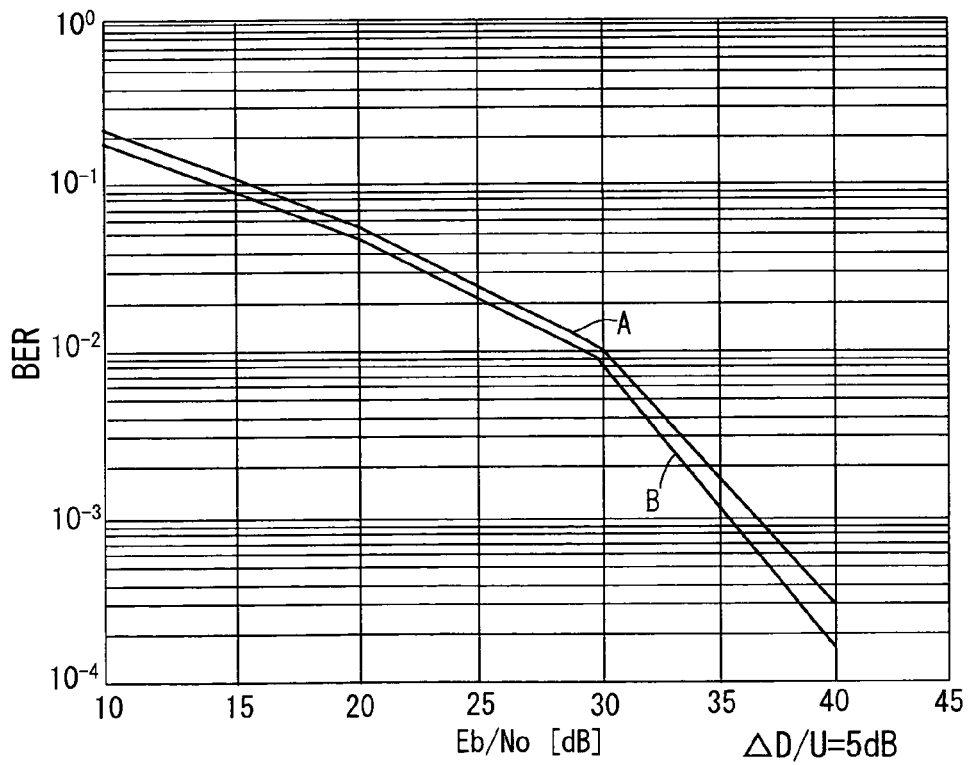
FIG. 18 is a second receive performance diagram for describing the effects of 2-branch diversity reception.

FIGS. 17, 18 are receive performances for describing the effects of 2-branch diversity reception. A D/U difference (=ΔD/U) between a low-D/U branch and a high-D/U branch is adopted as a parameter, a receive performance A of the low-D/U branch is illustrated in each of the diagrams, and a receive performance B in a case where delay time is less than the data-guard interval length $N_{GD}$ (=200 samples) also is indicated in each of the diagrams for comparison purposes. An Eb/No vs. BER performance was simulated with delay time held fixed at 300 samples ($N_{GD}$=200 samples). Furthermore, data is acquired with regard to ΔD/U=1 dB and 5 dB, and the Eb/No vs. BER performance is indicated for each of these.

Since each branch undergoes independent fading, branch correlation is small. This fact is utilized and the high-D/U signal is used to the extent possible to thereby obtain diversity gain.

From FIGS. 17 and 18, a degradation in performances is suppressed considerably for the above reasons even in a case where almost no diversity gain is obtained, i.e., ΔD/U=1 dB. Line quality can be kept high by making concurrent use of error correction. Further, at ΔD/U=5 dB, a performance substantially equivalent to the receive performance B for which the delay time is less than the guard-interval length $N_{GD}$ (=200 samples) of the data is obtained. The effects of the fourth embodiment ascribable to antenna diversity have thus been confirmed. It should be noted that the diversity arrangement is applicable also in the embodiments set forth below.

The implementation of the second embodiment has been described above in regard to a case where k (=2) branches are provided. However, it can be so arranged that the implementation of the third embodiment is provided with k-number of branches.

(E) Fifth Embodiment

Figure 19:
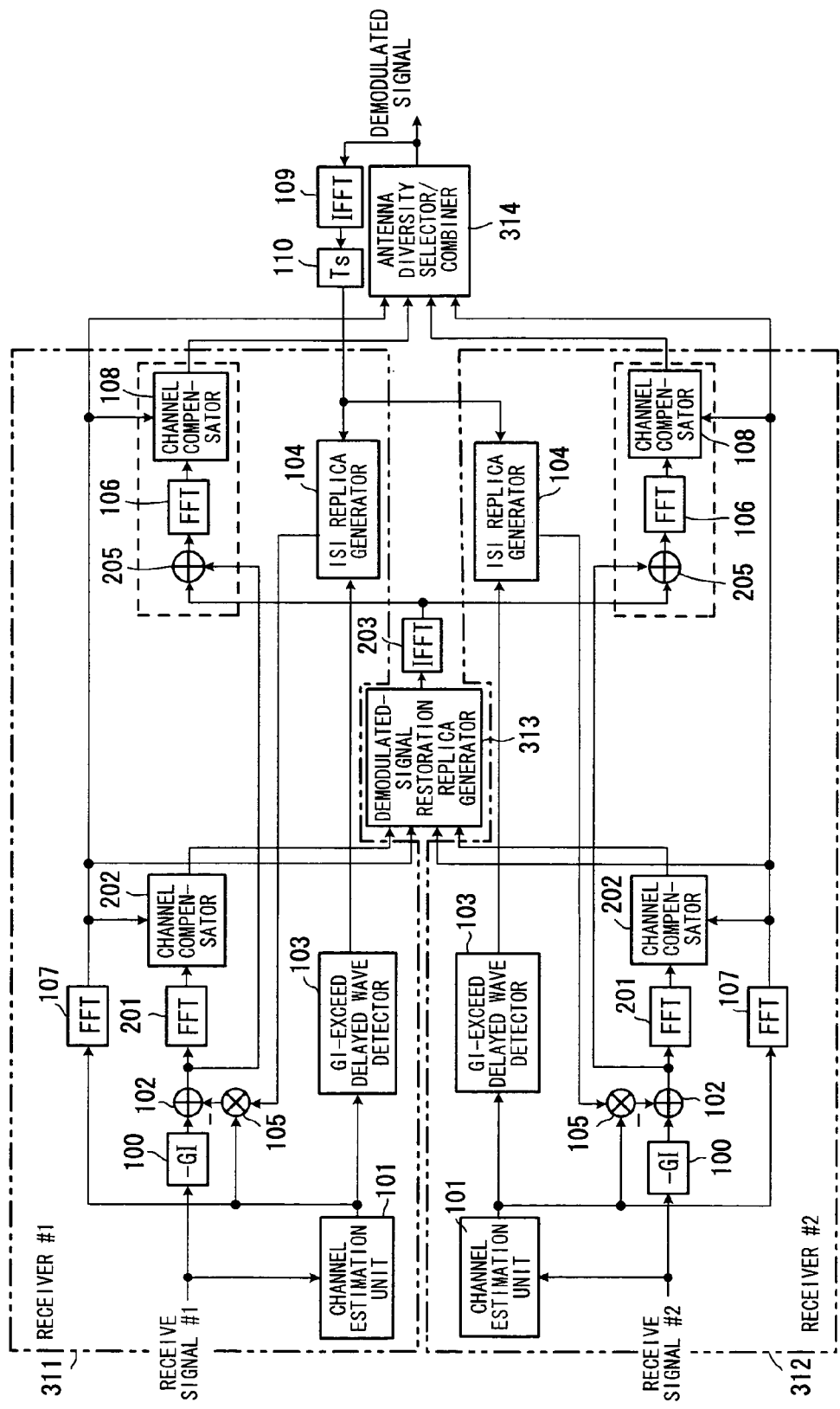
FIG. 19 is a block diagram of a receiver according to a fifth embodiment of a diversity arrangement for performing selection-combining or maximum-ratio combining on a per-subcarrier basis.

FIG. 19 is a block diagram of a receiver according to a fifth embodiment of a diversity arrangement for performing selection-combining or maximum-ratio-combining on a per-subcarrier basis. Here also the arrangement of the second embodiment is provided in two branches. It should be noted that, in general, a k-branch implementation can be adopted.

Receivers 311, 312 in respective ones of the branches have functions identical with those of the second embodiment, and components identical with those of FIG. 9 are designated by like reference characters. This embodiment differs in that ① the IFFT unit 109 and delay circuit 110 of the second embodiment are shared by the receivers 311, 312; ② the IFFT unit 203 is shared by the receivers 311, 312; ③ a demodulated-signal restoration replica generator 313 is shared by the receivers 311, 312 and is provided ahead of the IFFT unit 203, and the input signals of the branches are subjected to selection-combining or maximum-ratio-combining on a per-subcarrier basis; and ④ an antenna diversity selector/combiner 314 is provided, the demodulated signals of the branches are subjected to selection-combining or maximum-ratio-combining and the result is output, and this output signal (demodulated signal) is input to the ISI replica generator 104 via the IFFT unit 109 and delay unit 110.

Figure 20A:
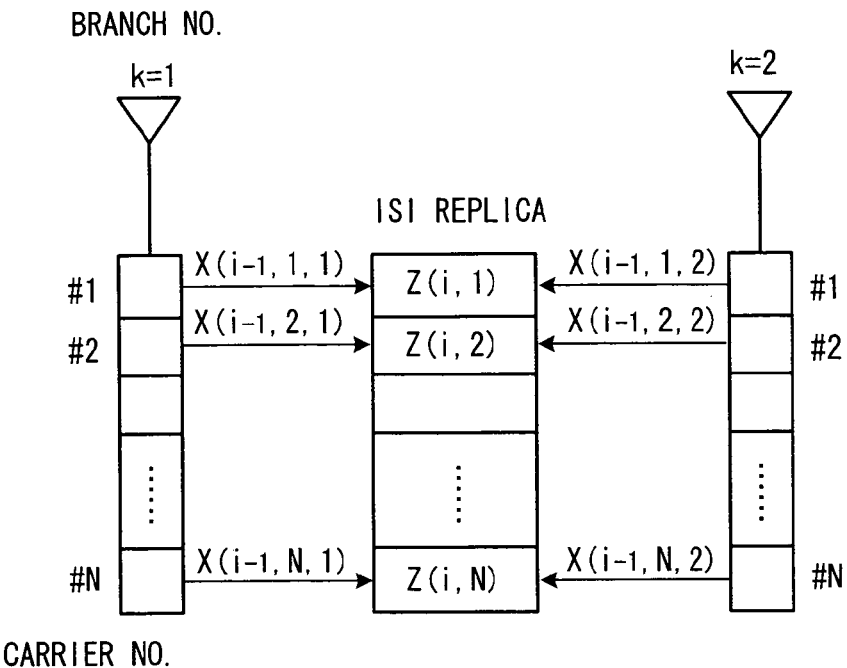
FIGS. 20A and 20B are diagrams useful in describing the principle of generation of an ISI replica and restoration replica in 2-branch diversity reception.
Figure 20B:
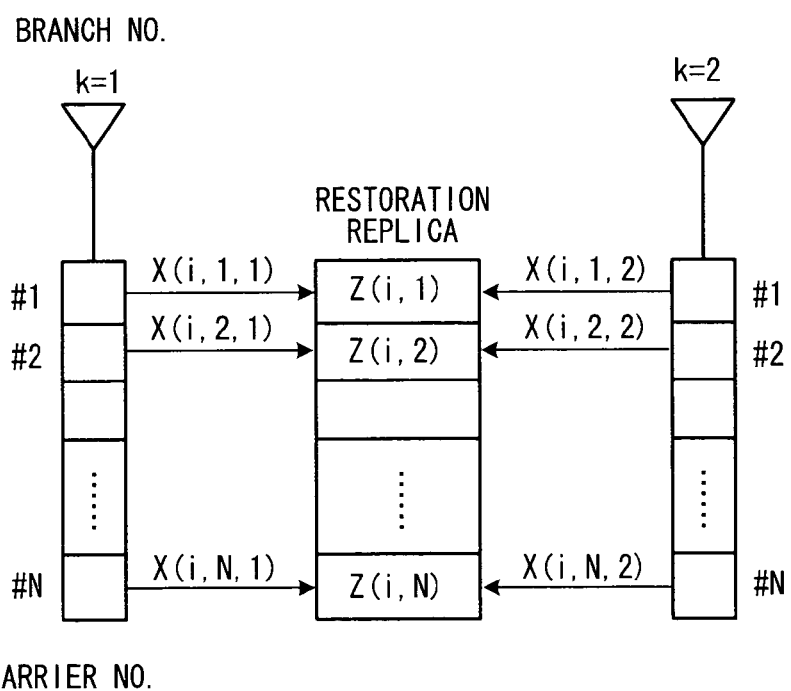

FIGS. 20A and 20B are diagrams useful in describing the principle of generation of an ISI replica and restoration replica in 2-branch diversity reception.

(1) Selection Reception

In Selection Reception (SEL reception), the antenna diversity selector/combiner 314 and demodulated-signal restoration replica generator 313 generate an ISI replica and restoration replica, respectively, at which time the signal in the branch having the larger transmission-path estimate value is selected and output carrier by carrier. As a result, if we let an ith symbol in a kth branch after OFDM demodulation be represented by X(i,j,k), let the transmission-path response value (channel estimation value) be represented by Y(i,j,k) and let the replica symbol after selection be represented by Z(i,j), then the ISI replica Z(i,j) and restoration replica Z(i,j) will be expressed by the equations below, where I represents the symbol number, j the carrier number, k the branch number and K the branch indicating the maximum path-response value.

That is, the ISI replica Z(i,j) is found from the following equation using an (i−1)th symbol X(i−1,j,K), as shown in FIG. 20A:

$$Z(i,j)=X(i-1,j,K), \; Y(i,j,K)=\max\{Y(i,j,k)\} \quad (1)$$

Further, the restoration replica Z(i,j) is found from the following equation using an ith symbol X(i,j,K), as shown in FIG. 20B:

$$Z(i,j)=X(i,j,K), \; Y(i,j,K)=\max\{Y(i,j,k)\} \quad (2)$$

Thus, in a case of diversity selection reception, the demodulated-signal restoration replica generator 313 selects the signal of the branch having the larger transmission-path estimation value carrier by carrier in accordance with Equation (1), and the IFFT unit 203 subjects each selected signal of a subcarrier to IFFT processing to thereby output a restoration replica.

Further, the antenna diversity selector/combiner 314 selects the signal of the branch having the larger transmission-path estimation value in accordance with Equation (2), inputs this signal to a demodulator (not shown) and also to the ISI replica generator 104 via the IFFT unit 109 and delay unit 110.

(2) Maximum-ratio Combining Reception

In maximum-ratio combining reception (MRC reception), the antenna diversity selector/combiner 314 and demodulated-signal restoration replica generator 313 generate an ISI replica and restoration replica, respectively, at which time the signals in the branches are maximum-ratio combined and output using a transmission-path estimation value. That is, when the ISI replica and restoration replica are generated, the receive signals of a plurality of antenna branches are each multiplied by a transmission-path response value, the sum total of the products is normalized by the transmission-path response value and the normalized value is adopted as the replica signal. The replica signal based upon maximum-ratio combining is expressed by the equations below using notation similar to that of selection reception, where i represents the symbol number, j the carrier number and k the branch number. That is, the ISI replica Z(i,j) is found from the following equation using an (i−1)th symbol X(i−1,j,K), as shown in FIG. 20A:

$$Z(i,j) = \frac{\sum_{k=1}^{L} X(i-1,j,k) \cdot Y^*(i,j,k)}{\sum_{k=1}^{L} Y(i,j,k) \cdot Y^*(i,j,k)} \quad (3)$$

Further, the restoration replica Z(i,j) is found from the following equation using an ith symbol X(i,j,K), as shown in FIG. 20B:

$$Z(i,j) = \frac{\sum_{k=1}^{L} X(i,j,k) \cdot Y^*(i,j,k)}{\sum_{k=1}^{L} Y(i,j,k) \cdot Y^*(i,j,k)} \quad (4)$$

Thus, in a case of diversity maximum-ratio combining, the demodulated-signal restoration replica generator 313 outputs a signal obtained by maximum-ratio combining on a per-carrier basis in accordance with Equation (4), and the IFFT unit 203 subjects each output signal of a subcarrier to IFFT processing to thereby output a restoration replica.

Further, the antenna diversity selector/combiner 314 calculates a value normalized by a transmission-path response value in accordance with Equation (3) and inputs the value to a decoder (not shown) and also to the ISI replica generator 104 via the IFFT unit 109 and delay unit 110.

Figure 21:
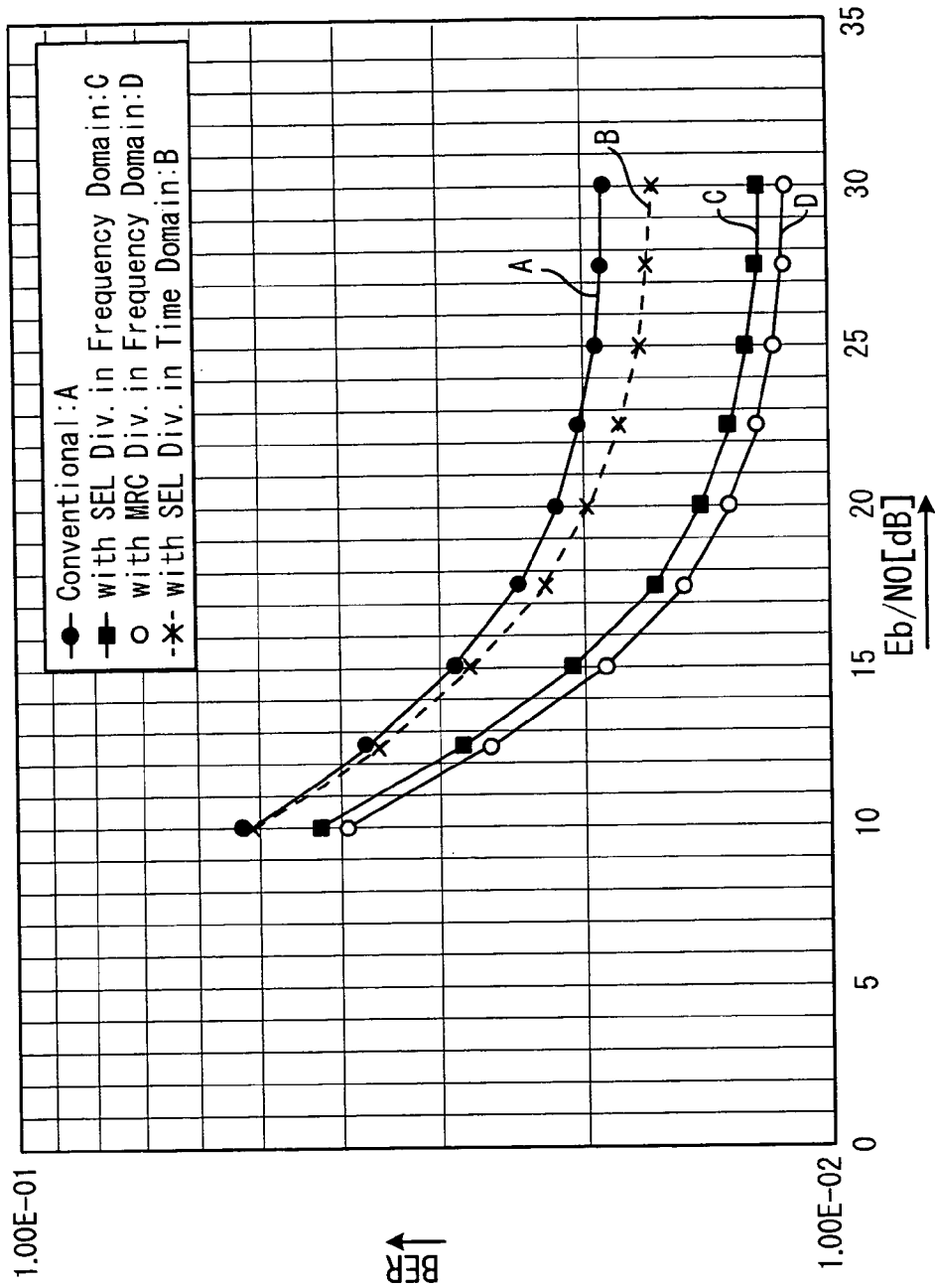
FIG. 21 is a simulation performance diagram for describing the effects of the fifth embodiment.

FIG. 21 is a simulation performance diagram for describing the effects of the fifth embodiment. Here Eb/N0 is plotted along the horizontal axis and BER along the vertical axis. Further, A (=Conventional) represents the performance in a case (second embodiment shown in FIG. 9) where replica generation has been performed independently in each branch without implementing diversity in replica generation, B (=with SEL Div. in Time Domain) represents the performance of the fourth embodiment shown in FIG. 16, C (=with SEL Div. in Frequency Domain) represents the performance of the fifth embodiment in the case of selection reception, and D (=with MRC Div. in Frequency Domain) represents the performance of the fifth embodiment in the case of maximum-ratio combining. In accordance with the fifth embodiment, results better than those of the fourth embodiment are obtained. FIG. 21 illustrates the performances in a high-speed mobile environment (V=207 Km/h, carrier frequency fc=5 GHz) where fading frequency fd=960 Hz holds. Excellent effects are obtained even in a very exacting environment.

(F) Sixth Embodiment

With the fourth and fifth embodiments, an improvement in performances ascribable to diversity gain is possible even under stringent conditions of low D/U, i.e., high ISI power. However, an improvement in performances branch by branch promises an even greater improvement in performances.

Figure 22:
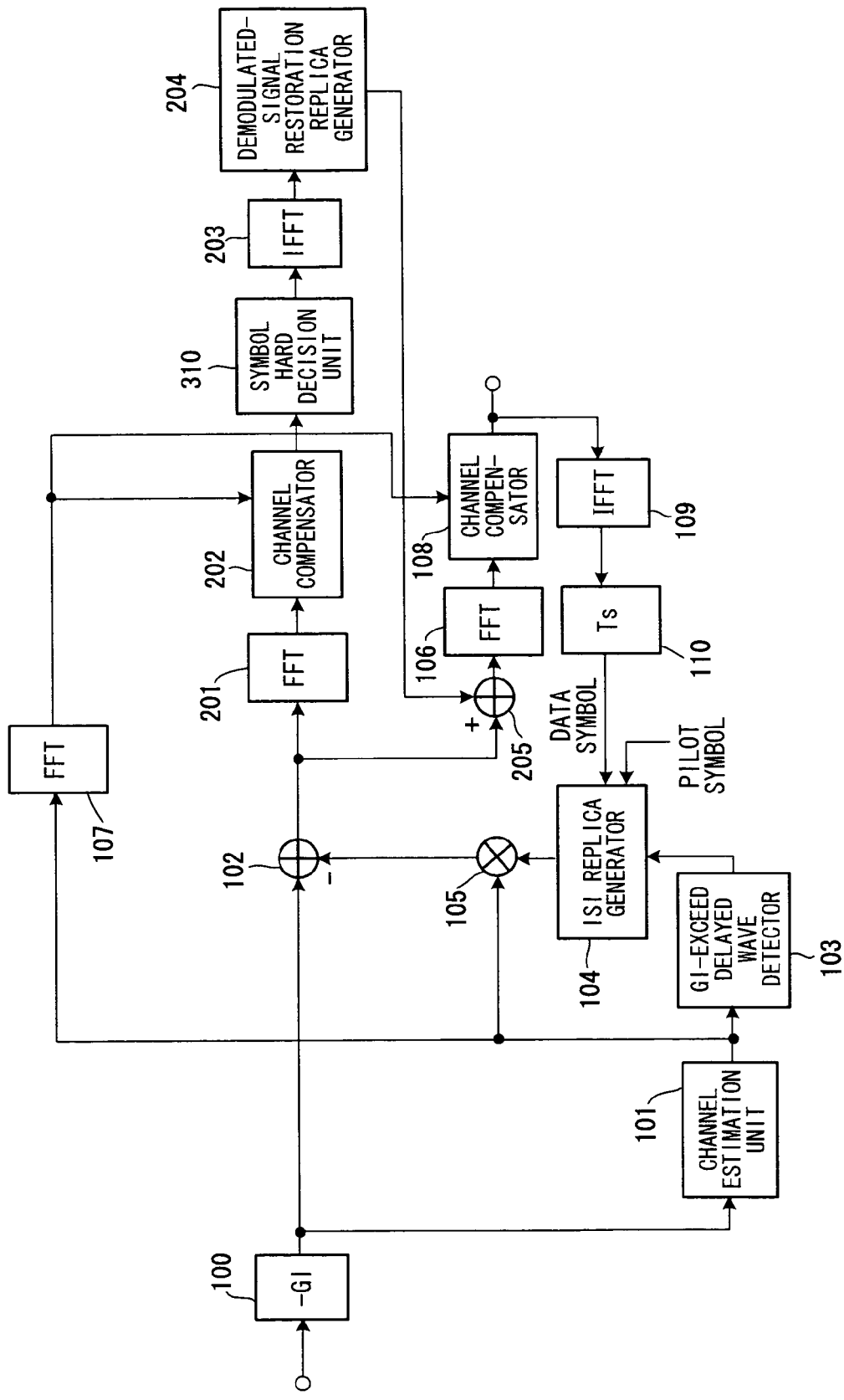
FIG. 22 is a block diagram illustrating a receiving apparatus according to a sixth embodiment of the present invention.

FIG. 22 is a block diagram illustrating a receiving apparatus according to a sixth embodiment of the present invention. Components identical with those of the second embodiment in FIG. 9 are designated by like reference characters. This embodiment differs in that a symbol hard decision unit 310 is provided between the channel compensator 202 and IFFT unit 203.

Figure 23:
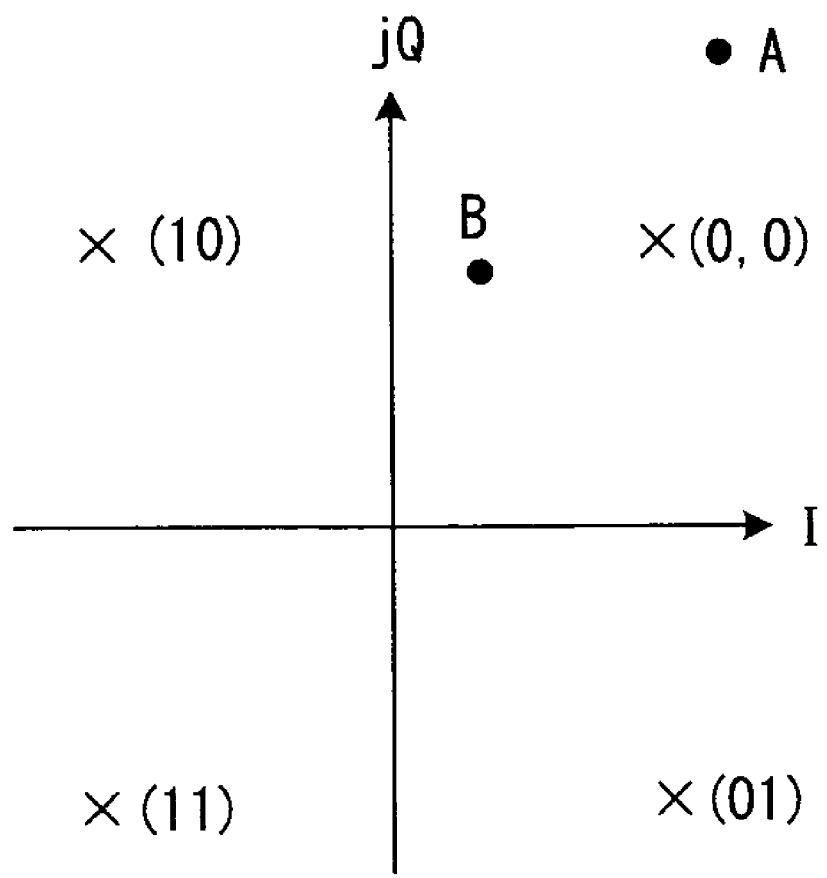
FIG. 23 is a diagram useful in describing a constellation illustrating the necessity of a hard decision in the sixth embodiment.

The sixth embodiment is such that in order to suppress distortion due to ICI when an ICI replica is generated, each subcarrier signal subjected to channel compensation after FFT processing undergoes a symbol hard decision in the symbol hard decision unit 310, and IFFT processing is applied to the result of the hard decision to thereby generate the ICI replica. If this expedient is adopted, distortion of the demodulated signal that has sustained ICI distortion can be corrected. FIG. 23 is a diagram useful in describing a constellation illustrating the necessity of a hard decision in the sixth embodiment. It is assumed that the data in each subcarrier has undergone QPSK modulation. If distortion does not occur, signal points will exist at the × marks in each quadrant of FIG. 23 in accordance with (00), (01), (10), (11). If distortion occurs, however, the positions of the signal points shift. For example, the signal point in the first quadrant shifts from the position of the A point to the position of the B point. If an ICI replica is generated under these conditions, a continuous periodic waveform (see FIG. 10F) will not be obtained and the demodulated signal will contain distortion. Accordingly, signal points A, B are subjected to a hard decision and are regarded as being at the × position in the first quadrant. When IFFT processing is subsequently applied to generate the ICI replica, a continuous periodic waveform (see FIG. 10F) is obtained and the performance is improved.

In accordance with the sixth embodiment, the improvement in performances in the exacting environment of D/U=0 dB and 1 dB is pronounced, as indicated by the performance D shown in FIGS. 5 to 7, and a major improvement in performances is achieved in comparison with the conventional OFDM communication system.

(G) Seventh Embodiment

Figure 24:
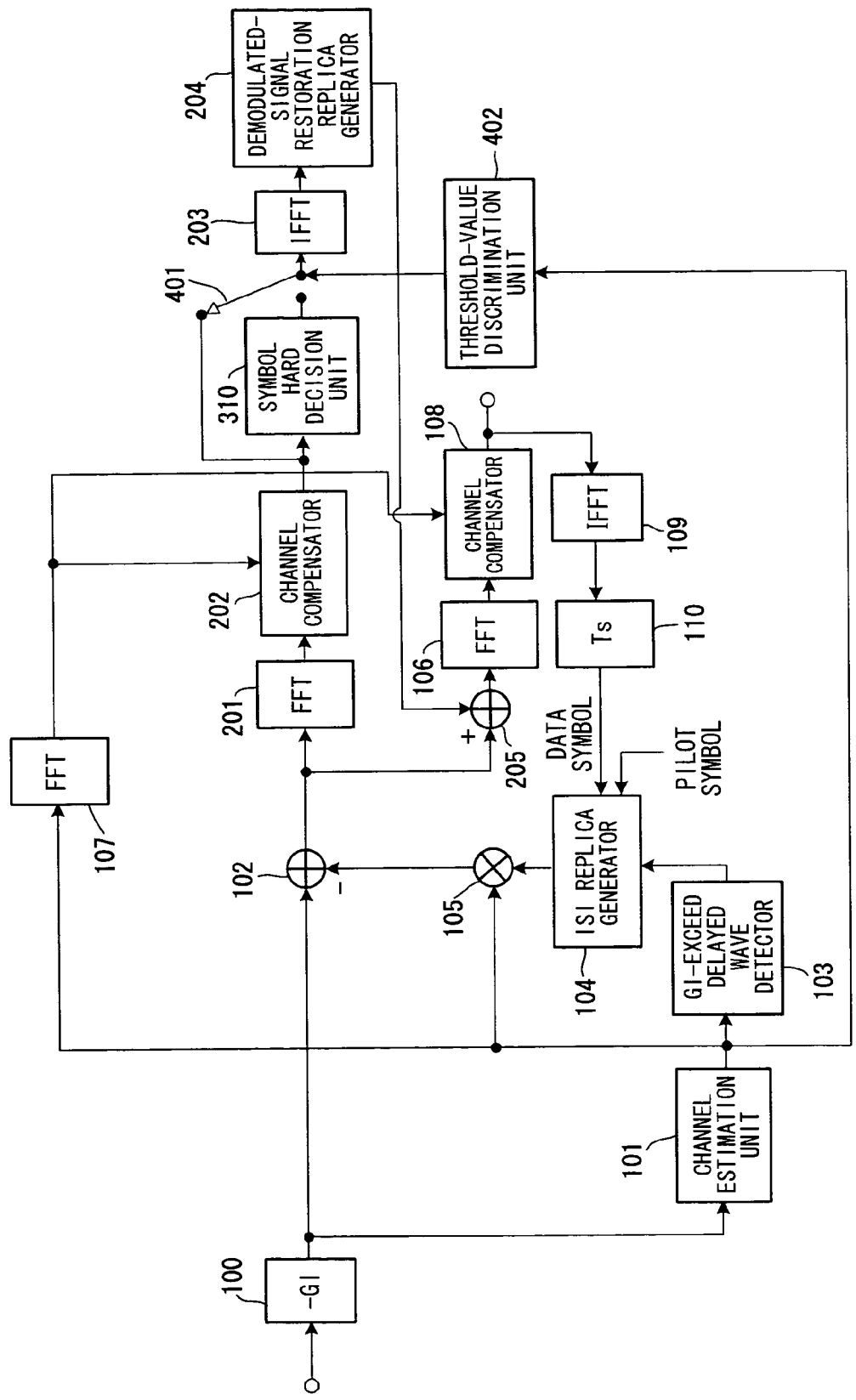
FIG. 24 is a block diagram illustrating a receiving apparatus according to a seventh embodiment of the present invention.

FIG. 24 is a block diagram illustrating a receiving apparatus according to a seventh embodiment of the present invention. This embodiment differs from the sixth embodiment of FIG. 22 in that a switch 401 and threshold-value discrimination unit 402 are provided and in that, depending upon the value of D/U, control is performed adaptively to ① create an ICI replica using the result of the symbol hard decision or ② create an IC replica using the result of channel compensation without a hard decision.

As shown in FIGS. 5 to 7, when delayed-wave power increases and D/U falls below 1 dB, the performance D of the sixth embodiment (FIG. 22) in which the hard decision is rendered is superior to the performance C of the second embodiment (FIG. 9) in which there is no hard decision. Conversely, however, when D/U becomes 1 dB or greater, the performance D of the sixth embodiment (FIG. 22) in which the hard decision is rendered is inferior to the performance C of the second embodiment (FIG. 9) in which there is no hard decision. Accordingly, the threshold-value discrimination unit 402 calculates D/U from the powers D, U of the direct and delayed waves, respectively, of the delay profile that enters from the channel estimation unit 101, determines whether the threshold value is equal to or less than or greater than 1 dB. If the threshold value is equal to or less than 1 dB, the result of the hard decision rendered by the symbol hard decision unit 310 is selected by the switch 401 and input to the IFFT unit 203, whereby the ICI replica is generated. On the other hand, if D/U is greater than 1 dB, the result of compensation by the channel compensator 202 is selected by the switch 401 and input to the IFFT unit 203, whereby the ICI replica is generated.

(H) Eighth Embodiment

Figure 25:
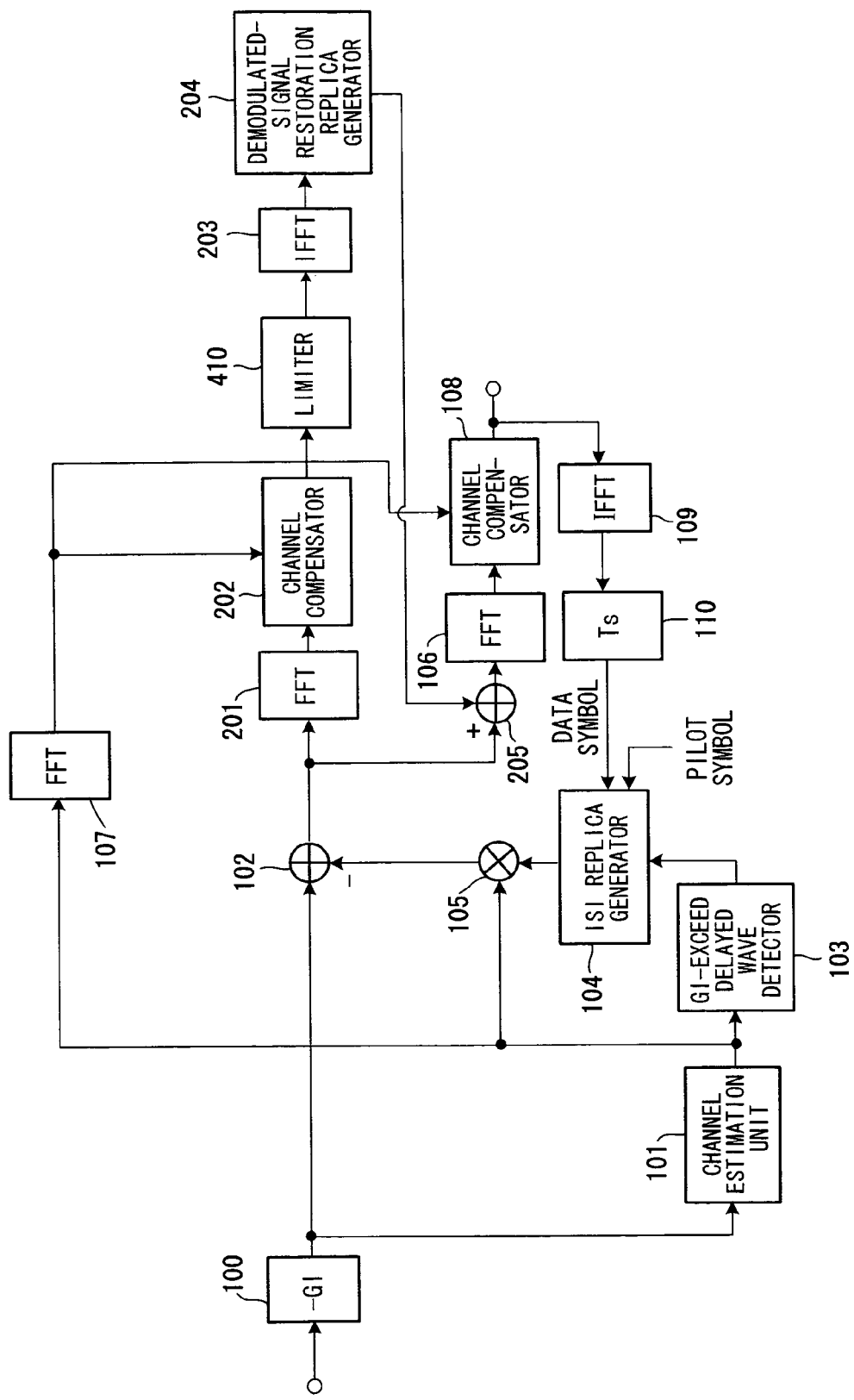
FIG. 25 is a block diagram illustrating a receiving apparatus according to an eighth embodiment of the present invention.
Figure 26:
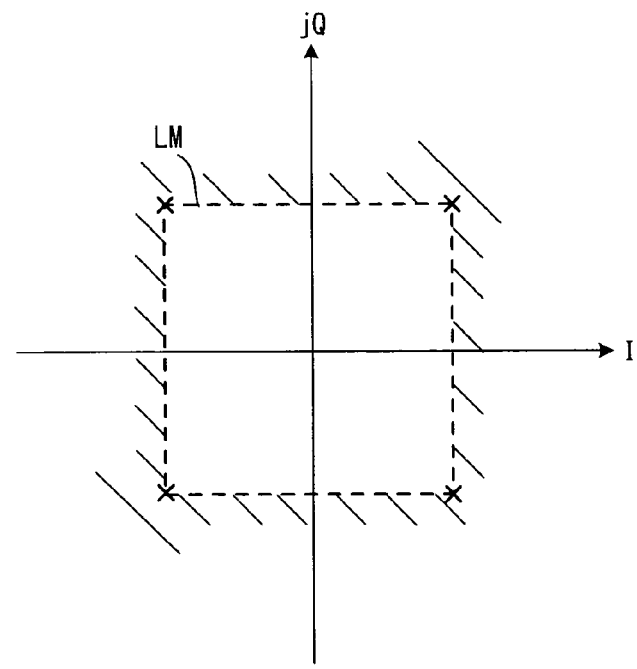
FIG. 26 is a diagram useful in describing a limit range.

FIG. 25 is a block diagram illustrating a receiving apparatus according to an eighth embodiment of the present invention. Components identical with those of the second embodiment in FIG. 9 are designated by like reference characters. This embodiment differs in that a limiter 410 is provided between the channel compensator 202 and IFFT unit 203, a limit LM is set at the position indicated by the dashed line in FIG. 26, and signal points present in the area indicated by hatching are limited to signal points on the dashed line. If this arrangement is adopted, an equivalent performance is obtained without performing threshold-value discrimination as in FIG. 24.

Figure 27:
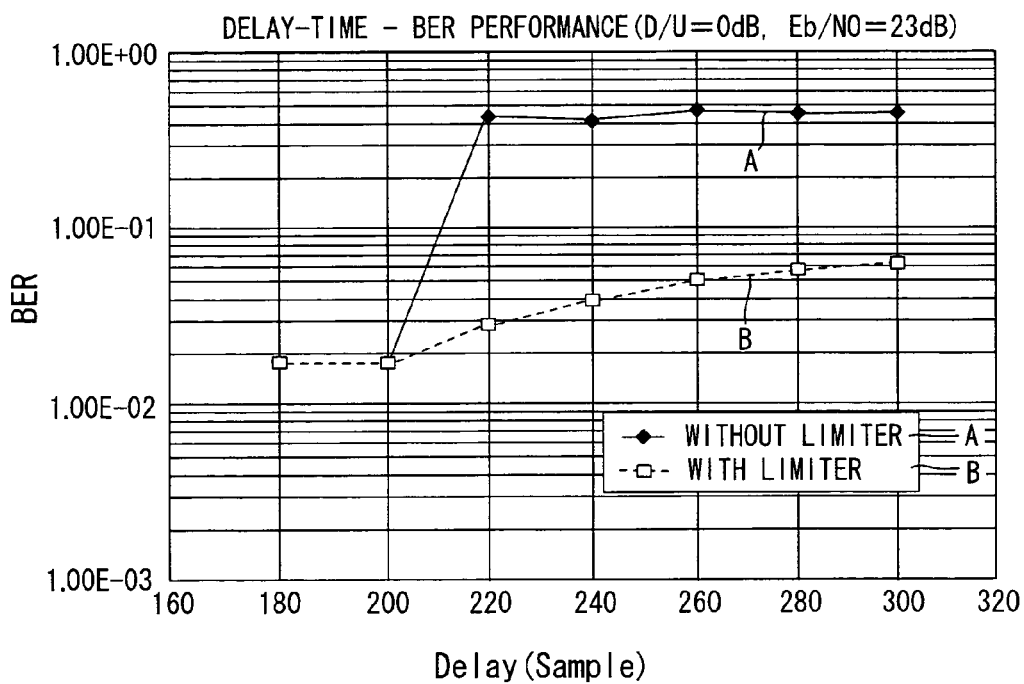
FIG. 27 is a first BER—delay-time performance according to the eighth embodiment.
Figure 28:
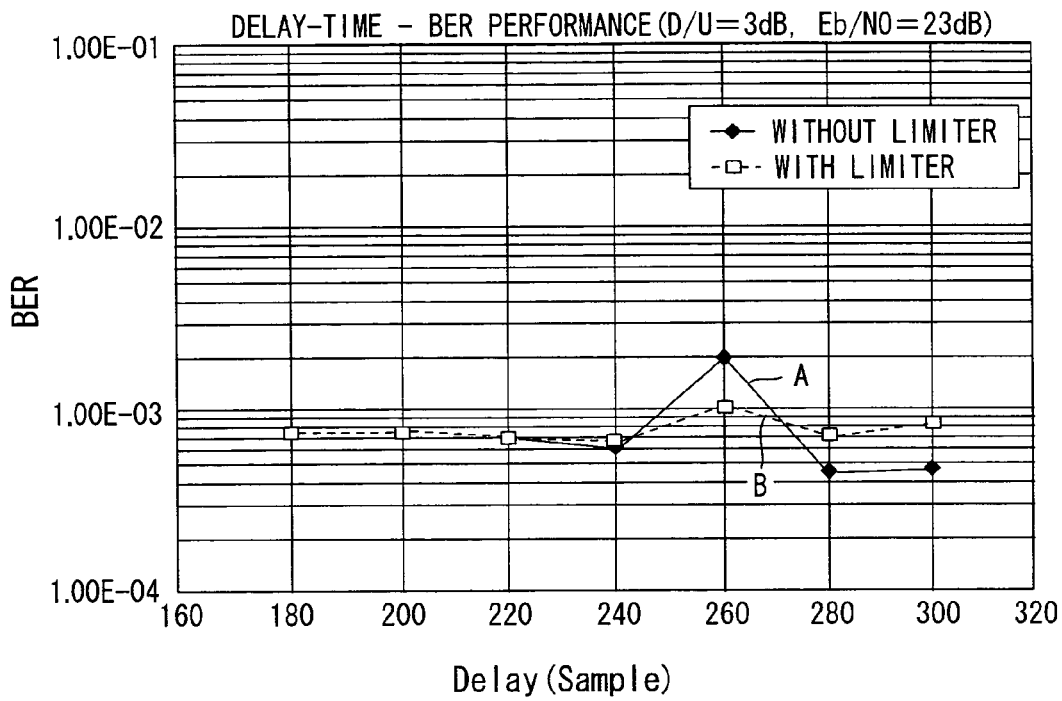
FIG. 28 is a second BER—delay-time performance according to the eighth embodiment.
Figure 29:
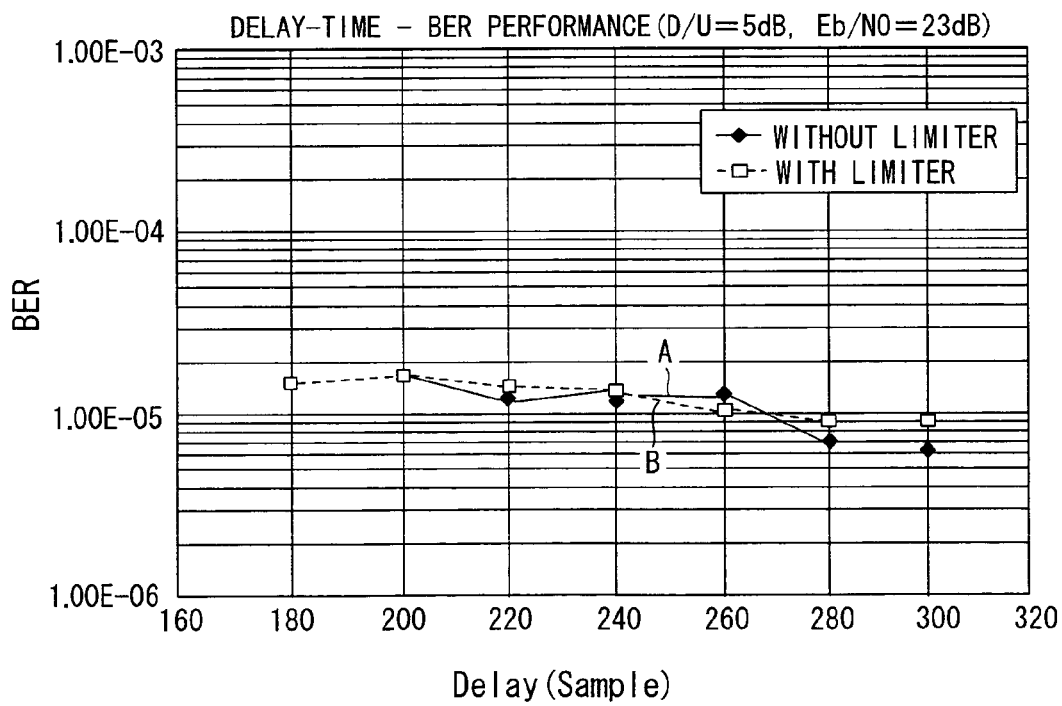
FIG. 29 is a third BER—delay-time performance according to the eighth embodiment.

FIGS. 27 to 29 are BER—delay-time performances in cases where D/U is 0, 3 and 5 dB, respectively. Here A is a BER performance of the second embodiment in which there is no limiter, and B is a BER performance of the eighth embodiment. When D/U=0 dB holds, the performance of the eighth embodiment is superior to the performance of the second embodiment by one order of magnitude. When the D/U is greater than 3 dB, a performance equivalent to the BER performance of the second embodiment is obtained.

(I) Modification of Channel Estimation Unit

Figure 30:
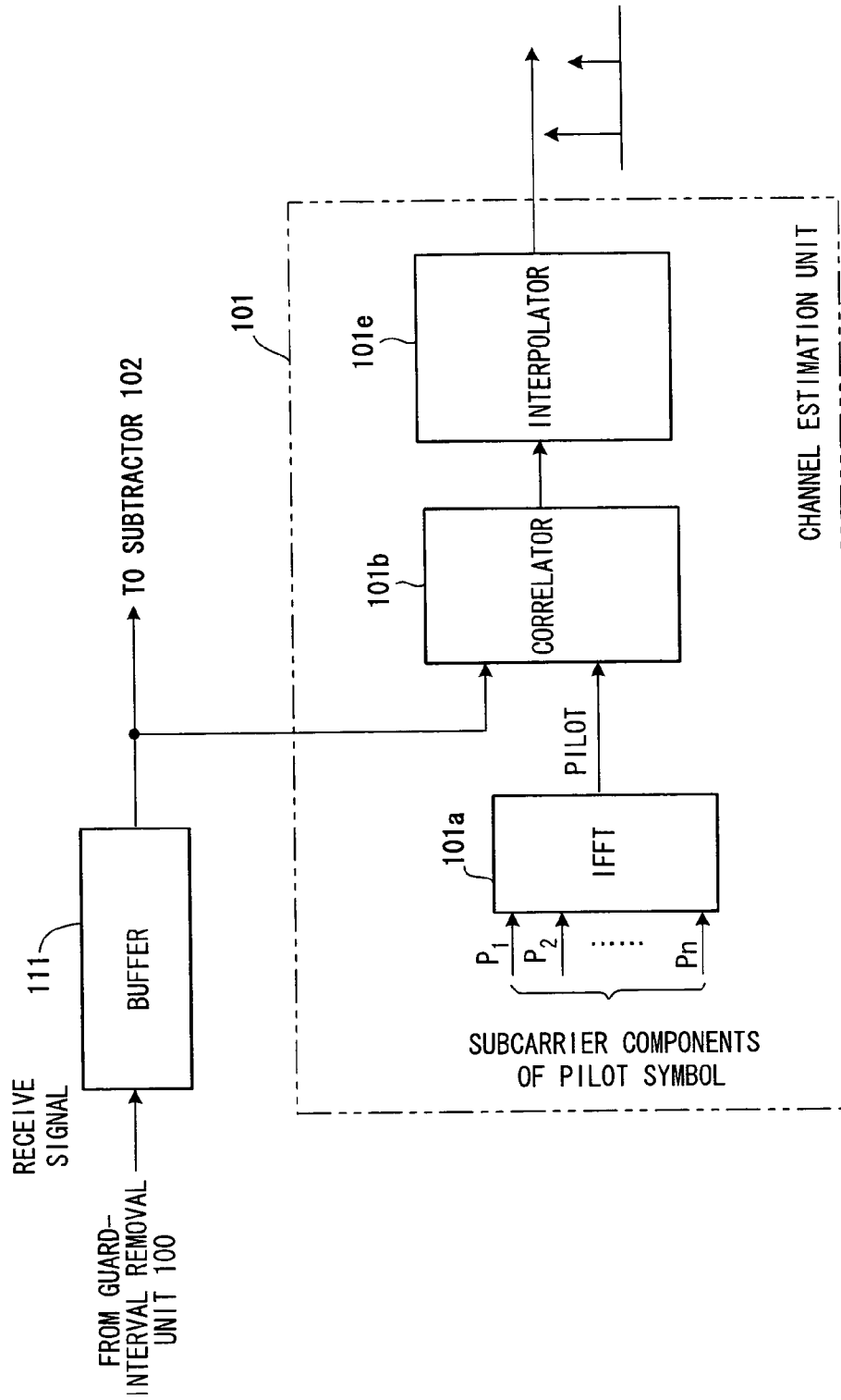
FIG. 30 is a block diagram of an arrangement for interpolating a channel estimation value.

In the first to eighth embodiments, the channel estimation unit 101 executes channel estimation at the pilot-symbol period and uses the found channel estimation value and delay profile until channel estimation is performed anew. However, the channel estimation value and delay profile fluctuate in dependence upon the magnitude of fading. Accordingly, in this embodiment, use is made of two channel estimation values, which have been obtained employing neighboring pilot symbols, to perform interpolation between them. To accomplish this, a buffer 111 is provided downstream of the guard-interval removal unit 100 and an interpolator 101e is provided within the channel estimation unit 101, as shown in FIG. 30. The correlator 101b of the channel estimation unit 101 calculates first and second channel estimation values at two neighboring pilot-symbol positions and inputs the values to the interpolator 101e. The latter linearly interpolates a channel estimation value (which includes the delay time of the delay profile) between the neighboring symbols and outputs the interpolated value at the symbol period. Though the buffer 111 is necessary if this arrangement is adopted, trackability with respect to high-speed fading can be improved.

(J) Ninth Embodiment

Figure 31:
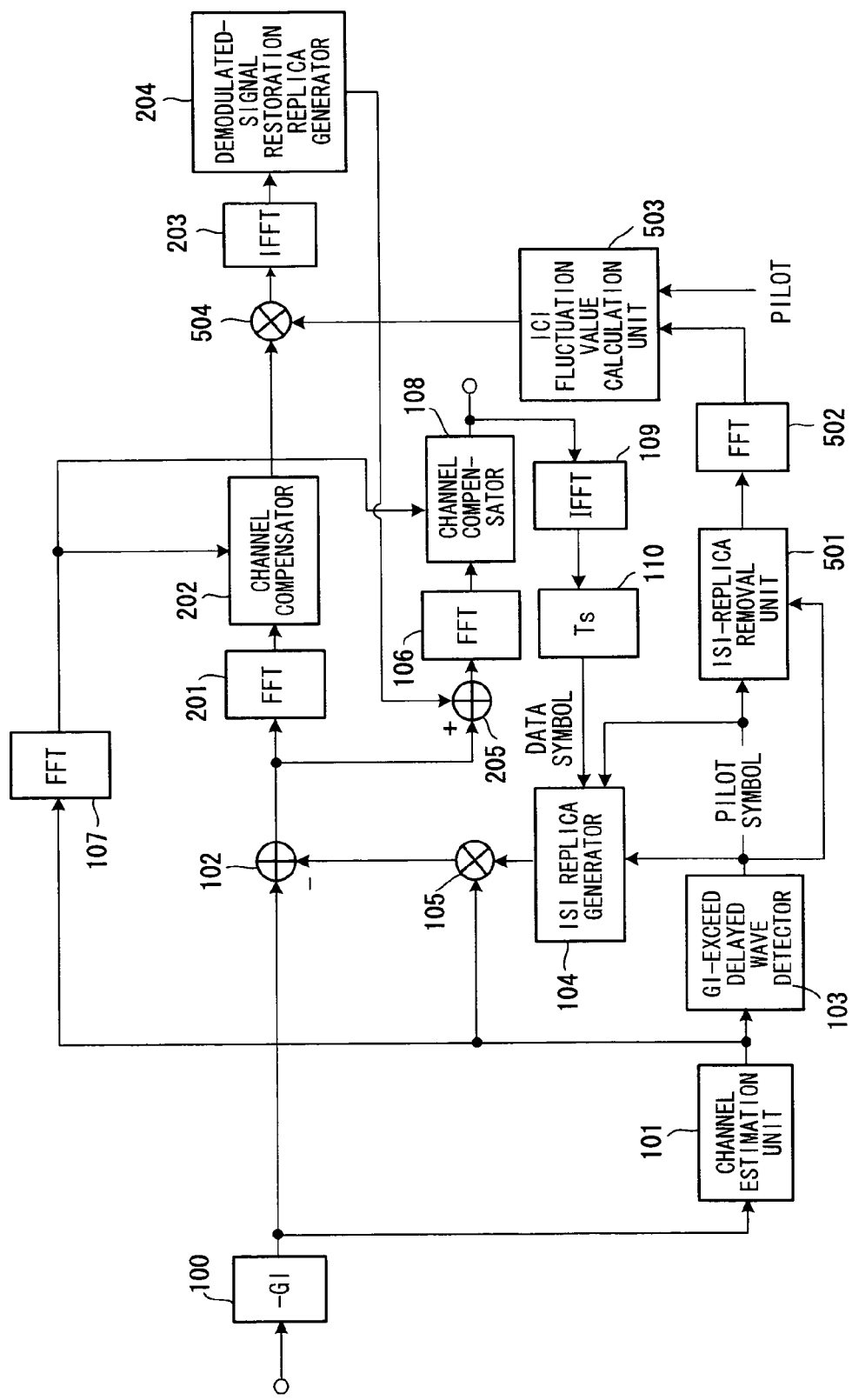
FIG. 31 is a block diagram illustrating a receiving apparatus according to a ninth embodiment.

FIG. 31 is a block diagram illustrating a receiving apparatus according to a ninth embodiment of the present invention, in which components identical with those of the second embodiment of FIG. 9 are designated by like reference characters. This embodiment differs in that it is provided with an ISI-replica removal unit 501 for removing an ISI-replica portion from the time-waveform signal of a pilot symbol, an FFT arithmetic unit 502, an ICI fluctuation value calculation unit 503 and a multiplier 504 for compensating for ICI fluctuation.

In the second embodiment, the waveform signal of the data symbol shown in FIG. 10B from which the ISI segment y has been removed is subjected to FFT processing. As a consequence, even though an ICI replica is generated and inserted into the ISI segment y of the waveform shown in FIG. 10B, a periodic continuous waveform of the kind shown in FIG. 10F is not obtained accurately and distortion occurs.

Accordingly, in the ninth embodiment, the effect of subjecting the data symbol waveform of FIG. 10B to FFT processing is computed and control is exercised so as to eliminate this effect. More specifically, the ISI-replica removal unit 501 removes the ISI segment y from the time-waveform signal of a known pilot symbol, the FFT arithmetic unit 502 applies FFT processing to the output signal of the ISI-replica removal unit 501, and the ICI fluctuation value calculation unit 503 calculates the difference between the FFT output and known pilot symbol subcarrier by subcarrier and calculates an ICI fluctuation value Aexp(jφ). The multiplier 504 multiplies the output signal of the channel compensator 202 by the inverse performance exp(–jφ)/A of the ICI fluctuation value subcarrier by subcarrier and inputs the product to the IFFT unit 203, which is the next stage. As a result of multiplication by the inverse performance, it is possible to compensate for the effect of removing the ISI segment y by the subtractor 102, an accurate ICI replica can be generated by the demodulated-signal restoration replica generator 204 and a periodic continuous waveform of the kind shown in FIG. 10F is obtained. If the ICI fluctuation value also is linearly interpolated between pilot signals, the tracking performance with respect to high-speed fading is improved.

(K) Tenth Embodiment

Figure 32:
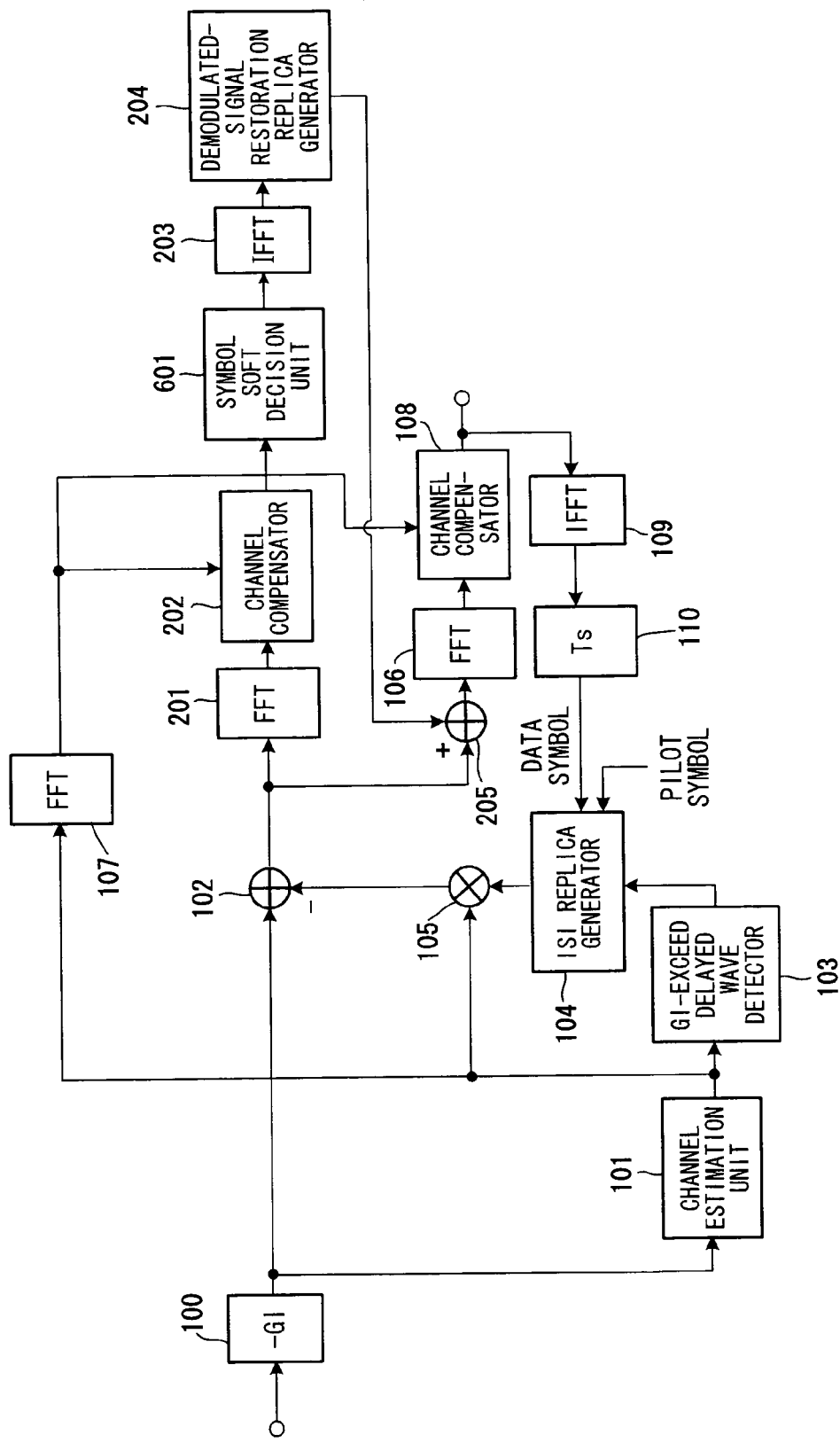
FIG. 32 is a block diagram illustrating a receiving apparatus according to a tenth embodiment.

FIG. 32 is a block diagram illustrating a receiving apparatus according to a tenth embodiment of the present invention, in which components identical with those of the sixth embodiment of FIG. 22 are designated by like reference characters. This embodiment differs in that the symbol hard decision unit 310 provided between the channel compensator 202 and IFFT unit 203 is replaced with a symbol soft decision unit 601.

Figure 33:
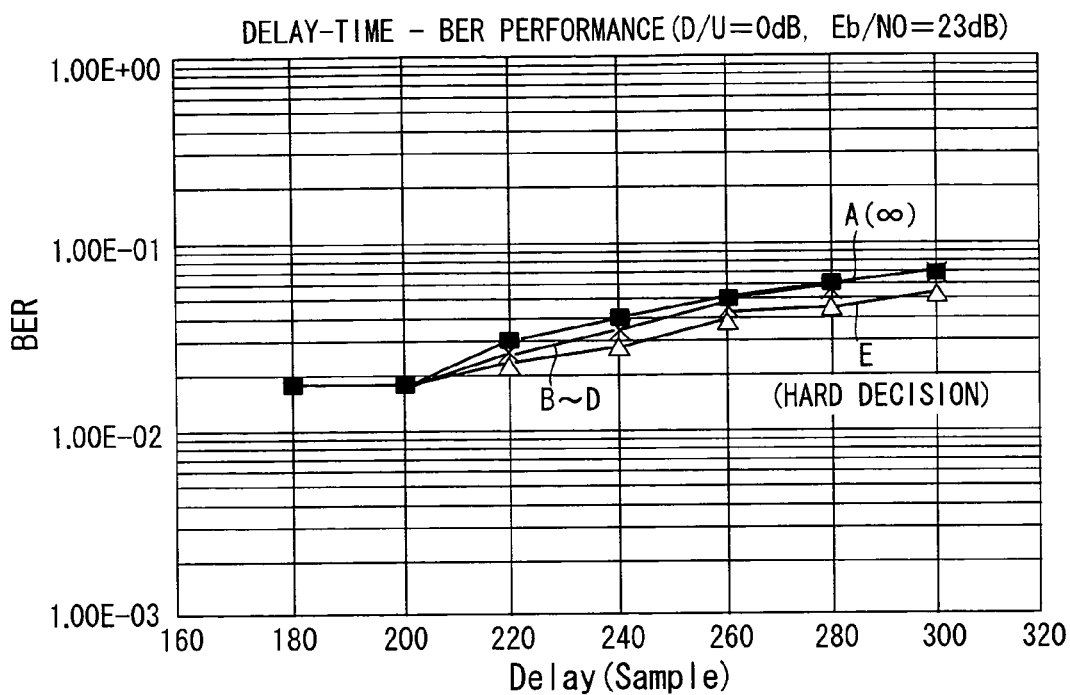
FIG. 33 is a first BER—delay-time performance for a case where quantization bit length of a symbol soft decision has been varied.
Figure 34:
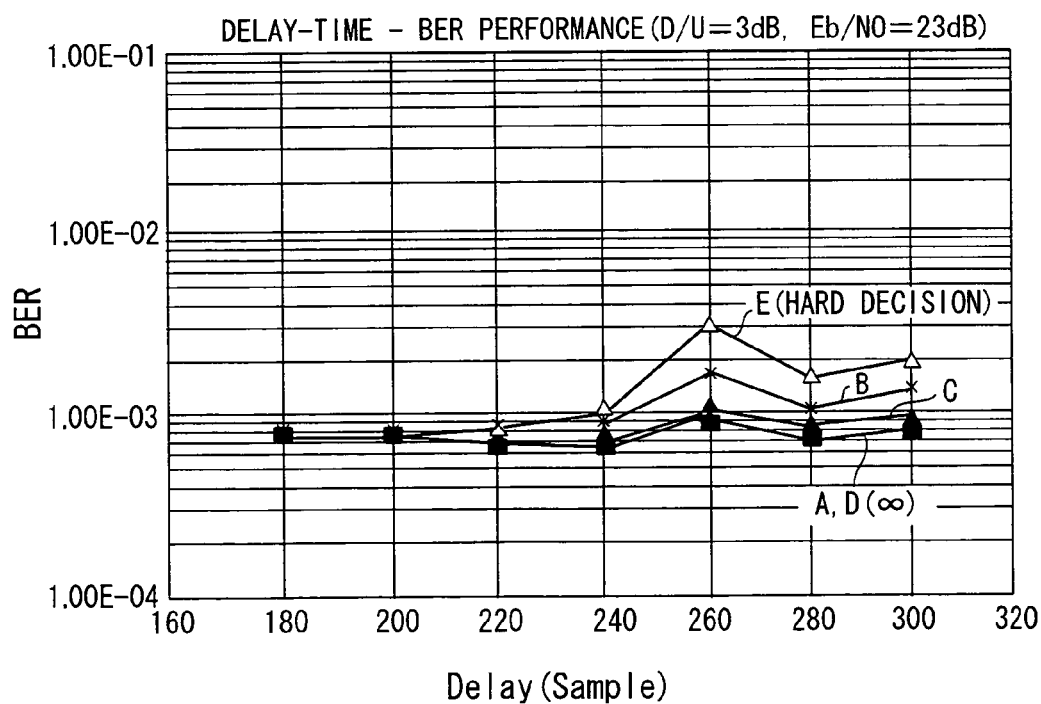
FIG. 34 is a second BER—delay-time performance for a case where quantization bit length of a symbol soft decision has been varied.
Figure 35:
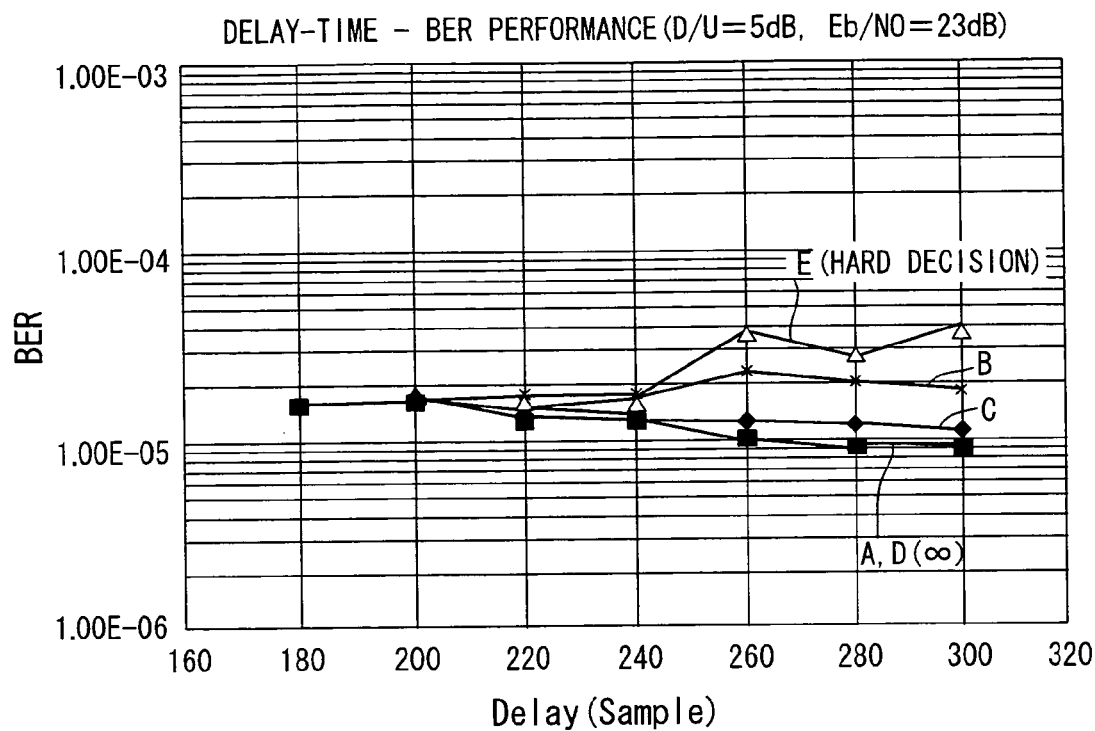
FIG. 35 is a third BER—delay-time performance for a case where quantization bit length of a symbol soft decision has been varied.

In the case of the symbol hard decision, it is necessary to switch between rendering or not rendering a symbol hard decision in dependence upon the value of D/U, as shown in FIG. 24, in order to obtain a good BER—delay-time performance. The tenth embodiment is so adapted that it is unnecessary to perform such switching. In FIGS. 5 to 7, C represents a performance (a performance of the second embodiment) based upon a symbol soft decision in which the quantization bits are infinite, and D represents a performance (a performance of the sixth embodiment) based upon a symbol hard decision. On the basis of these performances, a performance intermediate C and D is obtained if the quantization bit length of a symbol soft decision is made finite. FIGS. 33 to 35 are BER-delay-time performance for a case where quantization bit length of a symbol soft decision has been made two, three and five bits, respectively. Here A is a performance of the eighth embodiment (see FIG. 25) in which quantization bits with a limiter are infinite, B, C and D are performances of the tenth embodiment when quantization bit length of a symbol soft decision has been made two, three and five, respectively, and E is a hard decision performance.

On the basis of FIGS. 33 to 35, it can be said that quantization bit number=3 (i.e., soft-decision bit number=2) is ideal from the standpoint of both degree of complexity and performances. Quantization bits=∞ can be realized by floating-point arithmetic such as DSP (digital signal processor), though problems arise with regard to high-speed operation, etc.

(L) 11$^{th}$ Embodiment

The first to tenth embodiments described above are so adapted that guard-interval length $N_{GP}$ of a pilot symbol is made greater than guard-interval length $N_{GD}$ of a data symbol, whereby ISI and ICI are reduced and excellent performances are obtained even if a delayed wave that exceeds the guard-interval length $N_{GD}$ of the data symbol is produced.

Figure 36:
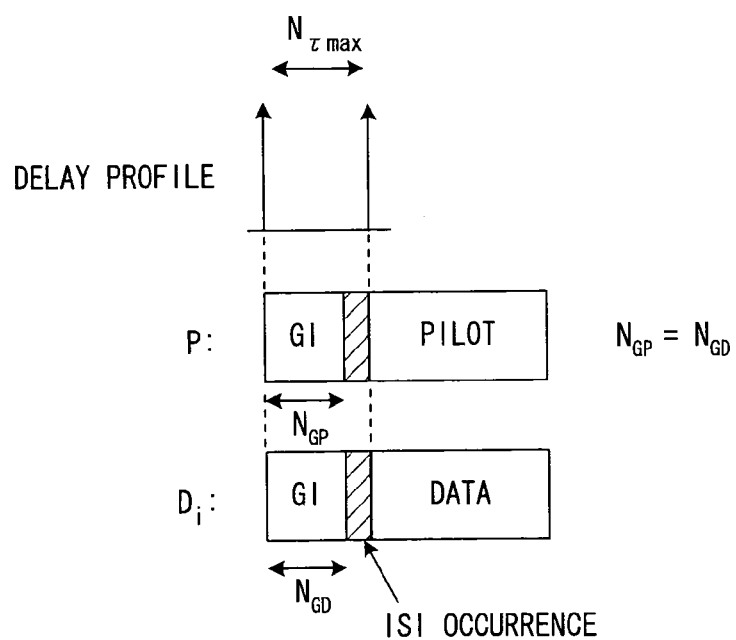
FIG. 36 is a diagram useful in describing a pilot symbol and data symbol according to an $11^{th}$ embodiment.

As shown in FIG. 36, the 11$^{th}$ embodiment is such that in a case where the guard-interval length $N_{GP}$ of a pilot symbol P and the guard-interval length $N_{GD}$ of a data symbol $D_i$ are equal, an ISI replica is excluded from the receive signal to reduce ISI and an ICI replica is inserted into the excluded portion to reduce ICI, even if a delayed wave having a delay $N\tau_{max}$ greater than the length of the guard interval occurs.

Figure 37:
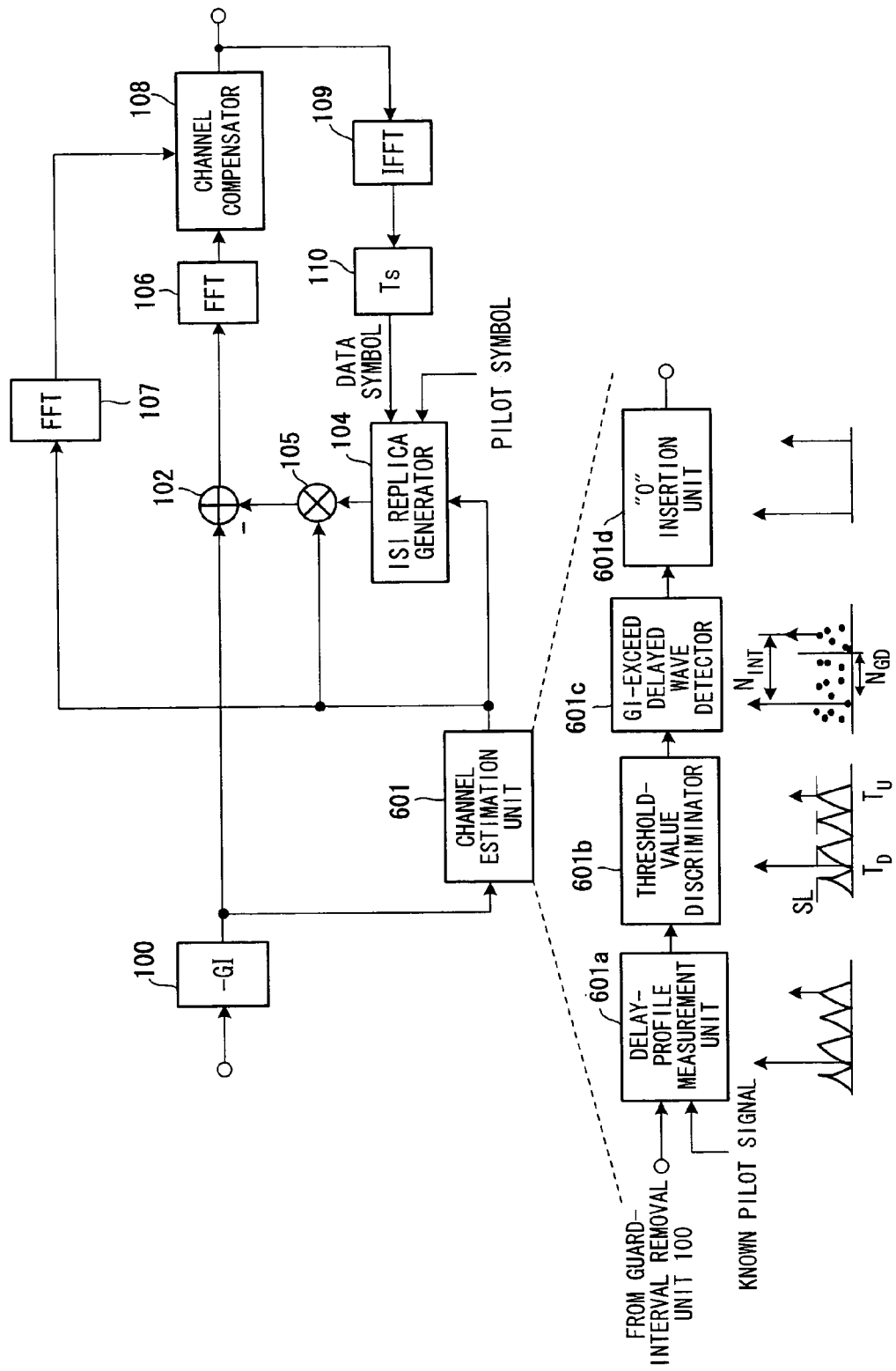
FIG. 37 is a block diagram of a first receiving apparatus according to the $11^{th}$ embodiment.

FIG. 37 is a block diagram illustrating a first receiving apparatus according to the 11th embodiment of the present invention, in which components identical with those of the first embodiment of FIG. 3 are designated by like reference characters. Structurally, the 11$^{th}$ embodiment differs from the first embodiment in that ① the channel estimation unit 101 of the first embodiment is replaced with channel estimation unit 601; ② the GI-exceed delayed wave detector 103 of the first embodiment is deleted; and ③ the channel estimation unit 601 is connected directly to the ISI replica generator 104.

The channel estimation unit 601 includes a delay-profile measurement unit 601a for creating a delay profile by calculating correlation between the time-waveform signal of a known pilot symbol and the receive signal; a threshold-value discriminator 601b for detecting time positions (direct-wave position $T_D$ and delayed-wave position $T_U$) at peak points greater than a fixed level upon taking noise into consideration; a GI-exceed delayed wave detector 601c for determining whether a peak interval $N_{INT}$ is greater than the guard-interval length $N_{GD}$ and, if the peak interval $N_{INT}$ is greater, for determining whether a delayed wave that exceeds the guard interval has occurred; and a "0" insertion unit 601d which, if a delayed wave greater than the guard-interval length $N_{GD}$ has been produced, makes "0" a correlation value below the threshold value and outputs the delay profile.

The ISI replica generator 104 detects the delay-time portion that is greater than the guard interval from the delay profile as an ISI portion and generates a time-waveform portion of a known symbol conforming to the ISI portion or a time-waveform portion of the preceding symbol as an ISI replica. Control identical with that of the first embodiment is thenceforth carried out.

Figure 38:
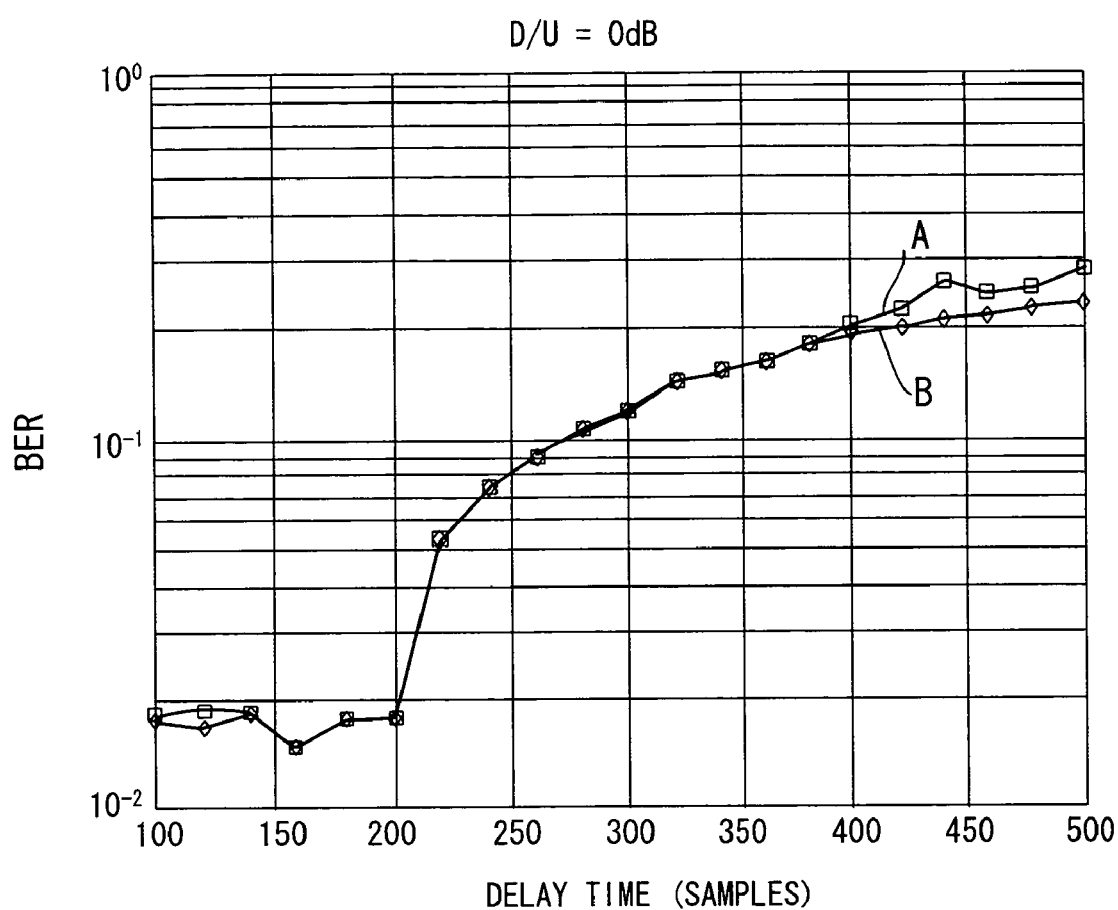
FIG. 38 is a first BER—delay-time performance according to the $11^{th}$ embodiment.
Figure 39:
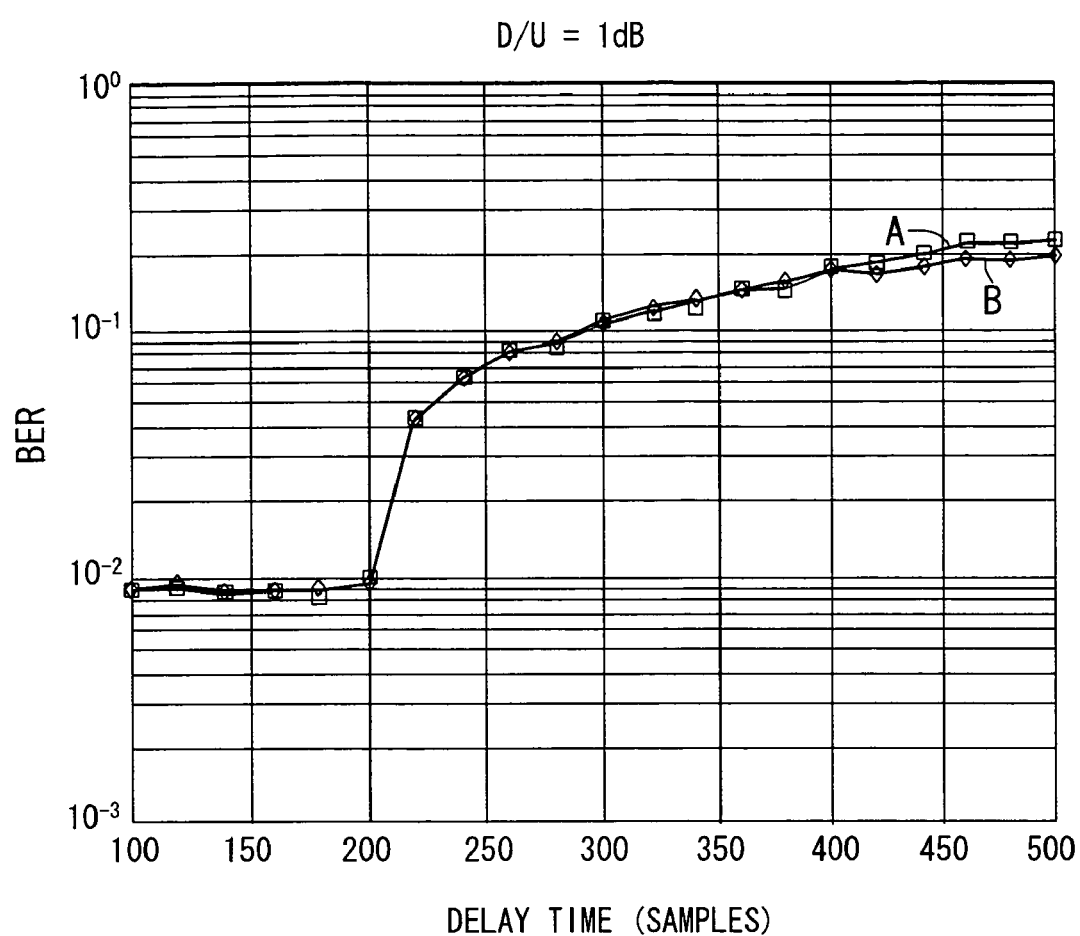
FIG. 39 is a second BER—delay-time performance according to the $11^{th}$ embodiment.
Figure 40:
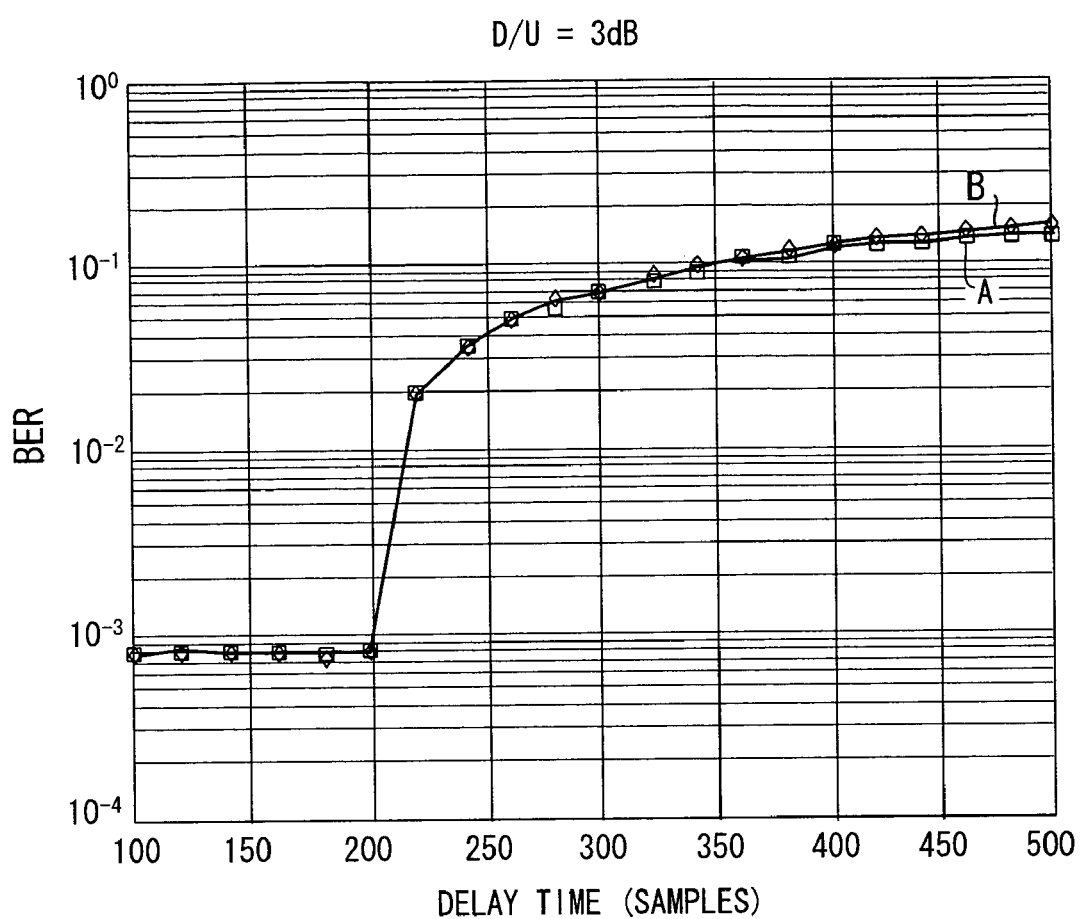
FIG. 40 is a third BER—delay-time performance according to the $11^{th}$ embodiment.

FIGS. 38 to 40 are BER—delay-time performances of the 11$^{th}$ embodiment in cases where $N_{GD}$=200 samples holds and D/U is 0, 1 and 3 dB, respectively. The performance of the first embodiment also is illustrated for the sake of comparison. Here A is the performance of the 11$^{th}$ embodiment and B the performance of the first embodiment. In comparison with the first embodiment, almost no degradation in performance is observed even under stringent conditions such as D/U=0 dB.

Figure 41:
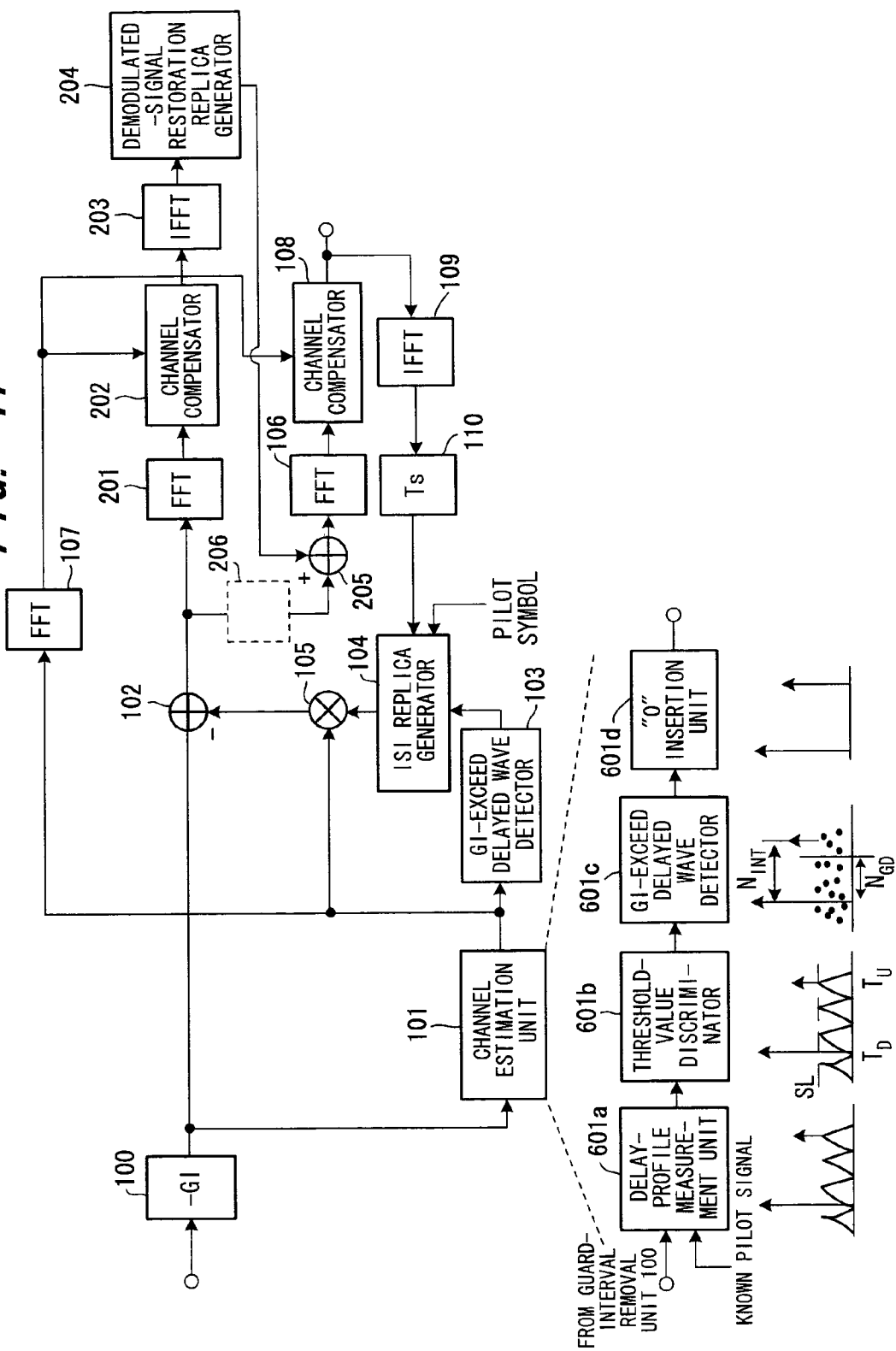
FIG. 41 is a block diagram of a second receiving apparatus according to the $11^{th}$ embodiment.

FIG. 41 is a block diagram of a second receiving apparatus according to the 11$^{th}$ embodiment. Here the 11$^{th}$ embodiment is provided with an ICI replica generator and the ICI replica is added on in the ISI interval.

Though not illustrated, it can be so arranged that effects equivalent to these will be obtained by expanding the 11$^{th}$ embodiment to have a structure equivalent to that of the third to tenth embodiments. For example, a further improvement in performances can be achieved by adopting a 2-branch diversity arrangement. Further, in view of a tradeoff between ICI distortion and symbol discrimination error, it can be so arranged that control is changed over adaptively in accordance with ISI power (namely D/U).

(M) 12th Embodiment

The 1st to 11th embodiments set forth above generate an ISI replica and subtract the ISI replica from a receive signal to diminish ISI. Hardware is necessary to generate the ISI replica.

Figure 42:
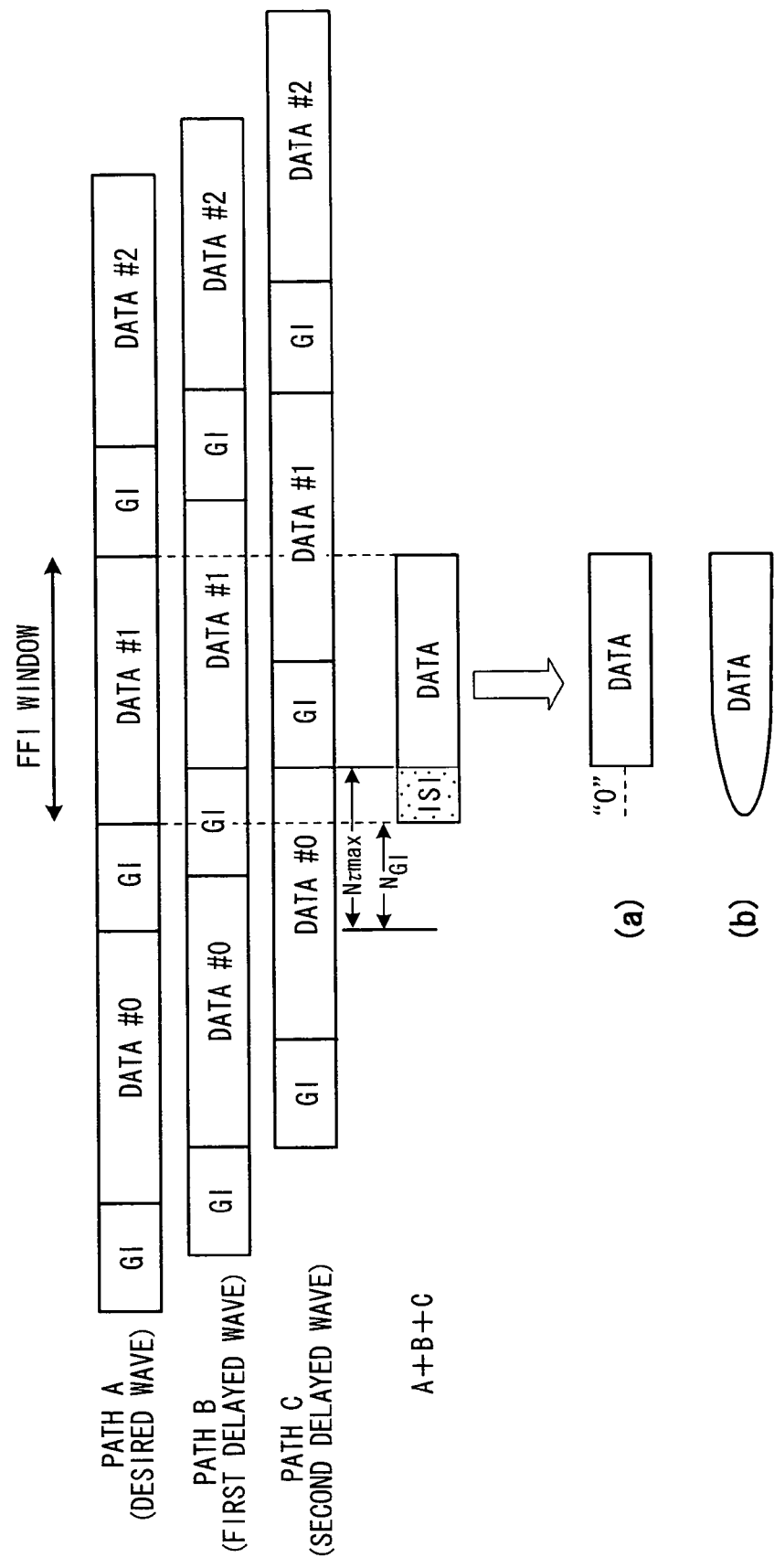
FIG. 42 is a diagram useful in describing a $12^{th}$ embodiment of the invention.

In a 12th embodiment, the receive signal is replaced by "0" up to the most delayed path, as indicated at (a) in FIG. 42, in a case where a delayed wave greater than a guard interval $N_{GI}$ has occurred, as illustrated in FIG. 42. That is, since a delay (=$N\tau_{max}-N_{GI}$) greater than the guard interval $N_{GI}$ is produced from ISI, the receive signal (desired wave and delayed wave) over this period of time is replaced by "0" to generate a restoration replica, and the restoration replica is added to the receive signal to generate the demodulated signal. If this arrangement is adopted, it is no longer necessary to generate an ISI replica but the longer the delay time, the more the performance degrades. However, the occurrence of a delayed wave greater than the guard interval guard interval $N_{GI}$ is rare.

Though the arrangement for replacement with "0" as indicated at (a) in FIG. 42 is simple, discontinuity of the waveform is pronounced and distortion is produced. Accordingly, a window function is generated, as indicated at (b) in FIG. 42, and the ISI portion is multiplied by the window function to thereby maintain continuity and suppress the occurrence of distortion.

Figure 43:
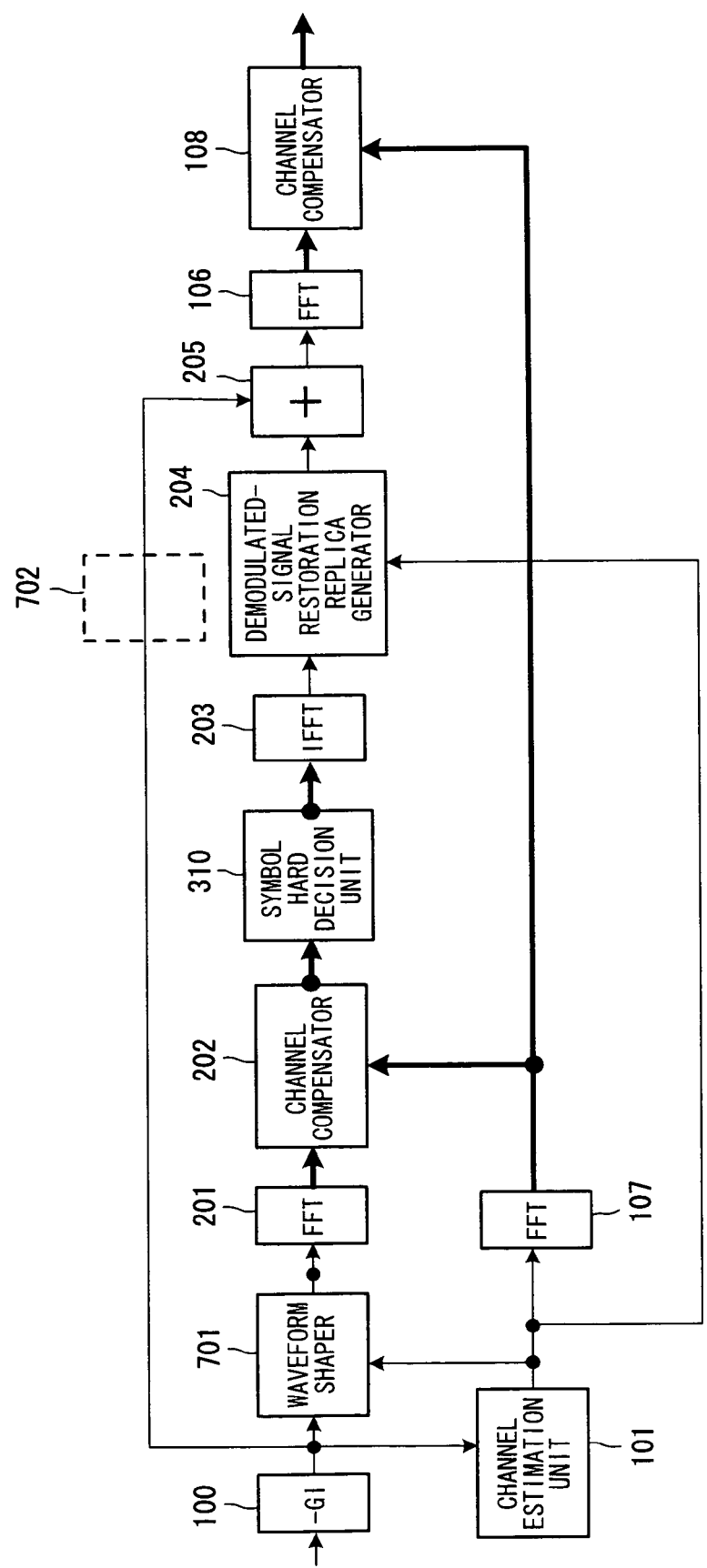
FIG. 43 is a block diagram illustrating a receiving apparatus according to the $12^{th}$ embodiment of the present invention.

FIG. 43 is a block diagram illustrating a receiver according to the 12th embodiment of the present invention, in which components identical with those of the sixth embodiment of FIG. 22 are designated by like reference characters. This embodiment differs from the sixth embodiment in that the components 102 to 105 and 109, 110 for generating an ISI replica and subtracting it from the receive signal are deleted and replaced by a waveform shaper 701.

Figure 44:
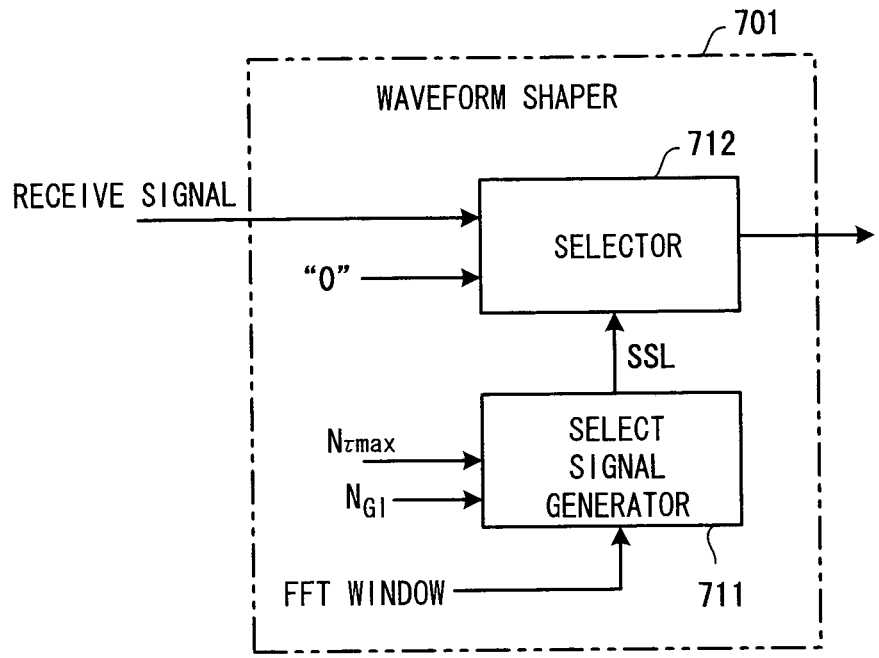
FIG. 44 is a first embodiment of a waveform shaper.

FIG. 44 is a first embodiment of the waveform shaper 701, which is provided with a select signal generator 711 and selector 712. The select signal generator 711 performs monitoring to determine whether a delayed wave greater than the guard interval $N_{GI}$ exists. If such a delayed wave exists and the delay time of the maximum delayed wave is $N\tau_{max}$, the select signal generator 711 outputs a select signal that attains the high level for the duration of the front part ($N\tau_{max}-N_{GI}$) of an FFT window. The selector 712 selects and outputs "0" during the time that the select signal SLL is at the high level, i.e., for the duration of ($N\tau_{max}-N_{GI}$), and outputs the receive signal at other times.

The receive signal in which the ISI segment has been made zero (i.e., the signal from which ISI has been cut) by the waveform shaper 701 is processed by the FFT 201, channel compensator 202, symbol hard decision unit 310 and IFFT unit 203, and the restoration replica is generated by the demodulated-signal restoration replica generator 204. The adder 205 inserts the restoration replica in the ISI portion of the receive signal (though insertion in the "0" portion of the signal from which ISI has been cut is also permissible). The FFT 106 and channel compensator 108 thenceforth apply FFT processing and channel compensation processing and output the demodulated signal.

Figure 45:
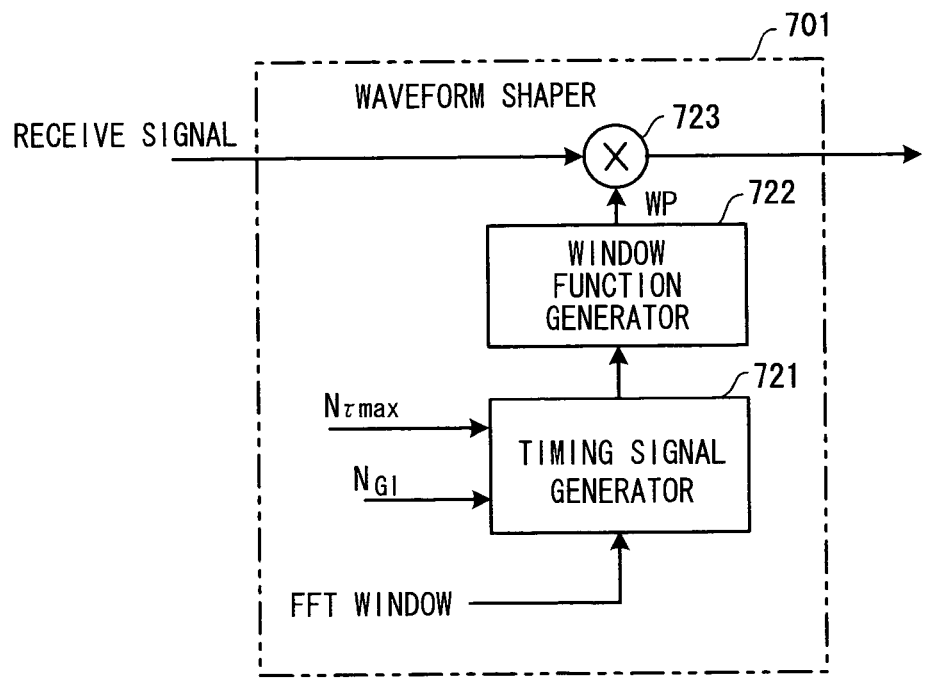
FIG. 45 is a second embodiment of a waveform shaper.
Figure 46:
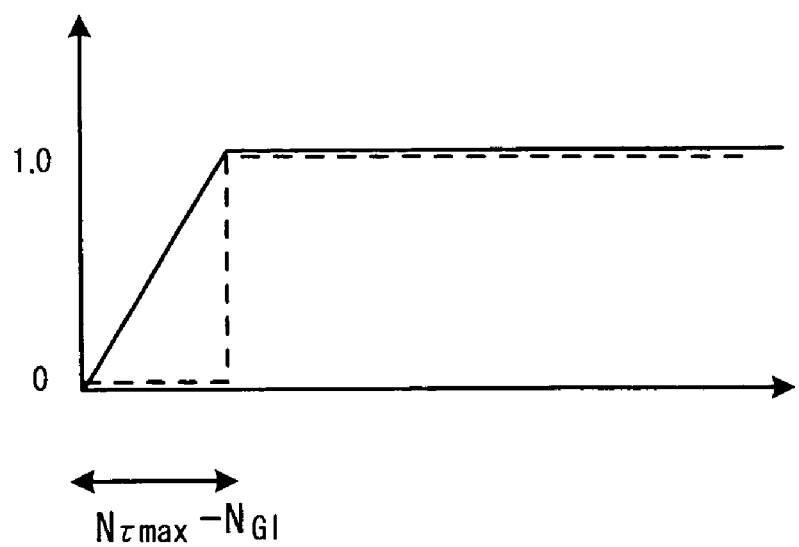
FIG. 46 is a first example of a window function.
Figure 47:
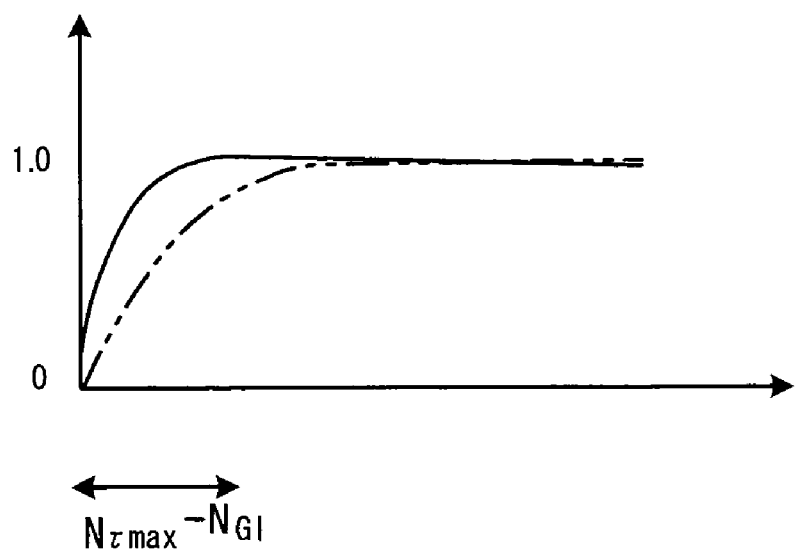
FIG. 47 is a second example of a window function.
Figure 48A:
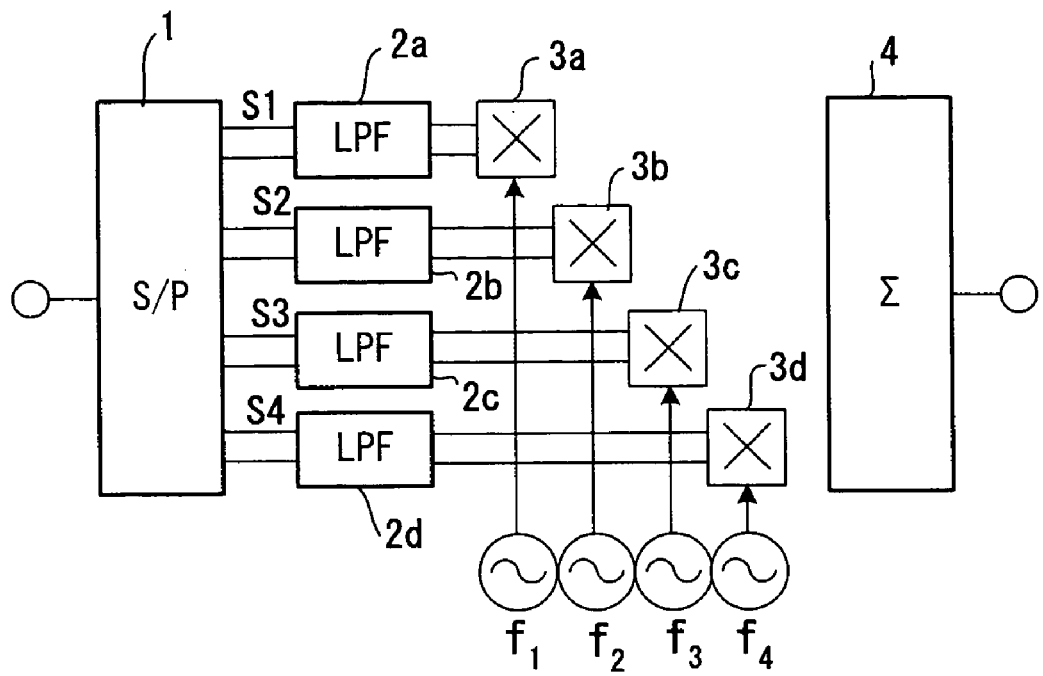
FIGS. 48A and 48B are diagrams useful in describing a receiving apparatus in a multicarrier transmission system.
Figure 48B:
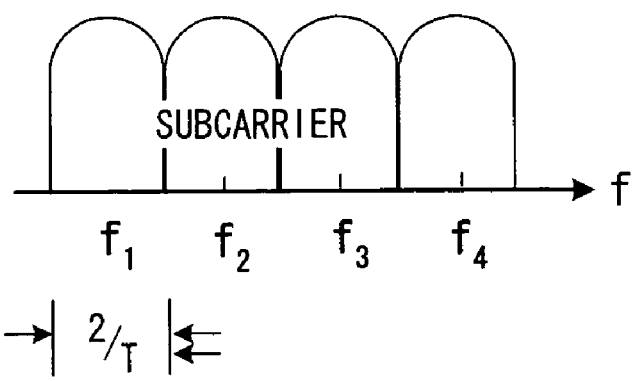
Figure 49A:
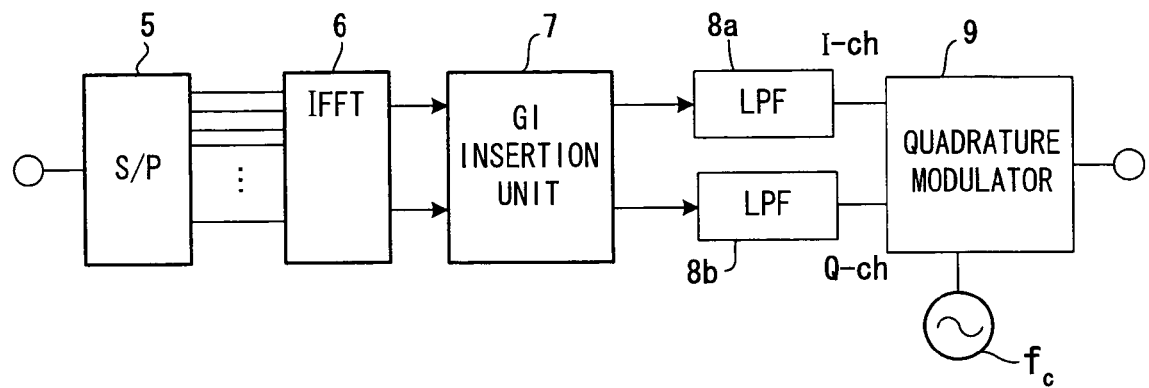
FIGS. 49A and 49B are diagrams useful in describing a transmitting apparatus in an OFDM transmission system.
Figure 49B:
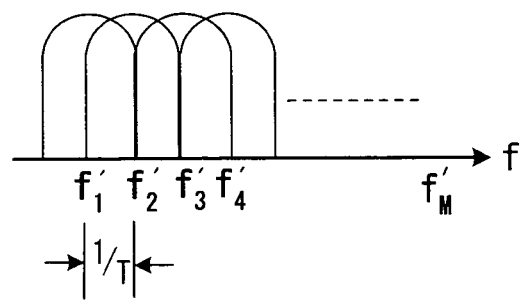
Figure 50:
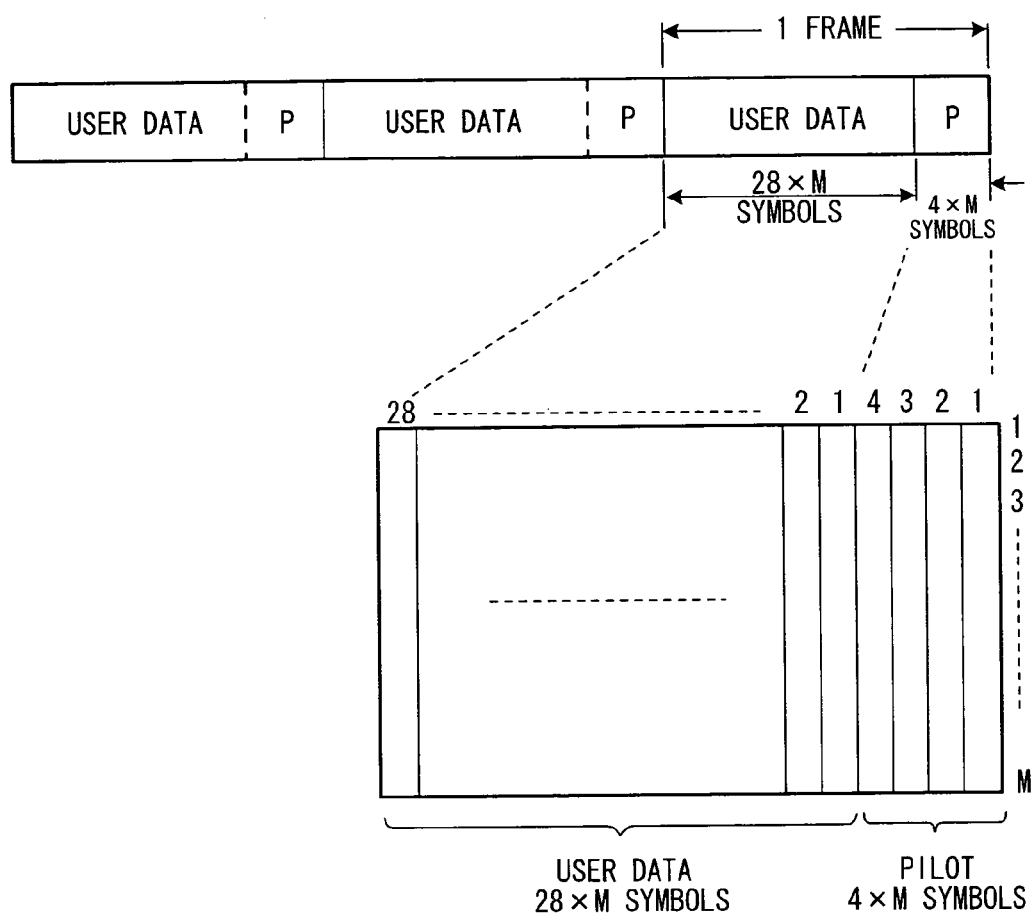
FIG. 50 is a diagram useful in describing a serial-to-parallel conversion.
Figure 51:
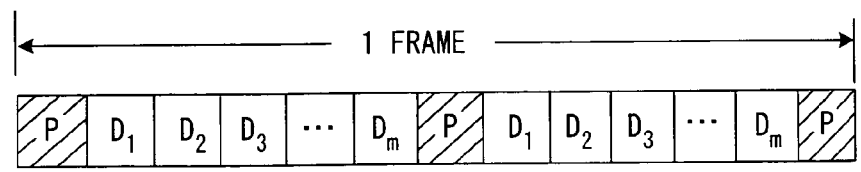
FIG. 51 is a diagram showing a frame structure in a case where a pilot symbol has been dispersed within a frame.
Figure 52:
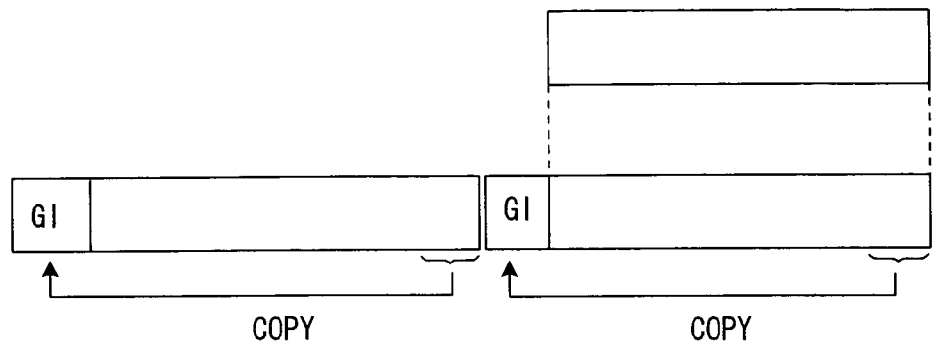
FIG. 52 is a diagram useful in describing insertion of a guard interval.
Figure 53A:
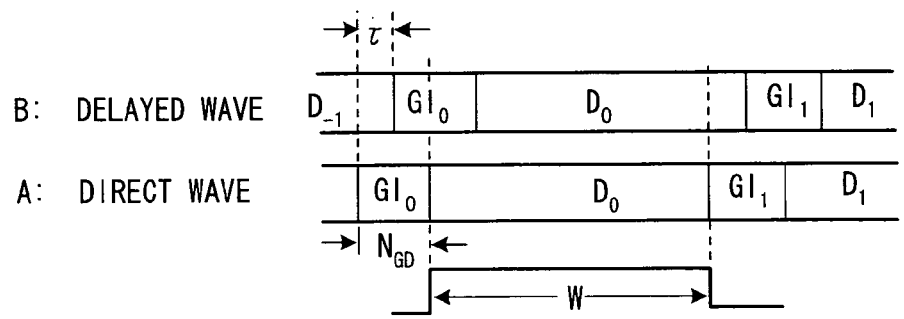
FIGS. 53A and 53B are diagrams useful in describing ICI ascribable to a delayed wave.
Figure 53B:
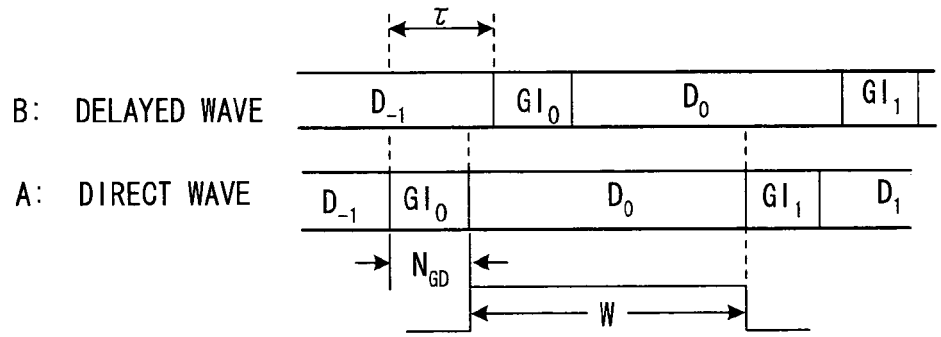

FIG. 45 shows a second embodiment of the waveform shaper 701, which is provided with a timing signal generator 721, window function generator 722 and multiplier 723. The timing signal generator 721 performs monitoring to determine whether a delayed wave greater than the guard interval $N_{GI}$ exists. If such a delayed wave exists and the delay time of the maximum delayed wave is $N\tau_{max}$, the timing signal generator 721 outputs a timing signal that attains the high level for the duration of the front part ($N\tau_{max}-N_{GI}$) of the FFT window. The window function generator 722 generates a window function WF during the time that the timing signal is at the high level. Conceivable examples of the window function are a function that increases linearly up to 1.0 for the duration ($N\tau_{max}-N_{GI}$), as shown in FIG. 46, an exponential function having a time constant ($N\tau_{max}-N_{GI}$), as shown in FIG. 47, or a triangular function, etc. The multiplier 723 multiplies the receive signal by the window function and outputs the result of multiplication.

The receive signal that has been multiplied by the window function in the waveform shaper 701 is subjected to processing by the FFT 201, channel compensator 202, symbol hard decision unit 310 and IFFT unit 203, and a restoration replica is generated by the demodulated-signal restoration replica generator 204. The adder 205 inserts the restoration replica into the ISI portion of the signal that is output from the waveform shaper 701, after which the FFT arithmetic unit 106 and channel compensator 108 apply FFT processing and channel compensation processing and output the demodulated signal. As indicated by the dashed line in FIG. 43, a zero insertion unit 702 is provided for inserting zero into the ISI portion of the signal that is output from the waveform shaper 701, and it can be so arranged that the restoration replica is added to the signal in which zero has been inserted.

It should be noted that the symbol hard decision unit 310 of FIG. 43 need not necessarily be provided. In addition, the symbol hard decision unit 310 can be replaced by the limiter (FIG. 25) or symbol soft decision unit (FIG. 32). Further, the reduction in amount of processing can be assured by setting a fixed interval beforehand and not adaptively controlling the interval ($N\tau_{max}-N_{GI}$) over which processing is performed by the waveform shaper.

In the above embodiments, the present invention is described with regard to a case where there is single delayed wave. However, the present invention naturally is applicable also to a case where there are two or more delayed waves. In such case, a delayed wave that is to undergo elimination of ISI and ICI is decided in accordance with ① through ③ below.

① The amount of calculation is reduced by limiting the number of delayed waves to K in order of decreasing power.

② The amount of calculation is reduced by limiting the number of delayed waves to K in order of decreasing delay time.

③ The amount of calculation is reduced by limiting the number of delayed waves in a descending order that takes into consideration the two parameters (power and delay time) in ① and ② above, namely in order of decreasing results of multiplication.

Thus, in accordance with the present invention, ISI ascribable to a delayed wave that has exceeded the guard interval of data can be reduced by making the guard interval of a known signal longer than the guard interval of a pilot. Even if delay time of the delayed wave exceeds the guard interval of the data, an increase in BER can be suppressed. Further, since ISI is suppressed in the time domain, it is possible to exercise control with a fixed amount of calculation independently of the number of M-ary modulation states of the subcarriers, and the scale of the hardware can be reduced.

In accordance with the present invention, both ISI and ICI can be suppressed in the time domain. Even if the delay time of a delayed wave exceeds the guard interval of data, an increase in BER can be suppressed effectively. Further, since processing is executed to suppress both ISI and ICI in the time domain, it is possible to exercise control with a fixed amount of calculation independently of the number of M-ary modulation states of the subcarriers, and the scale of the hardware can be reduced.

In accordance with the present invention, a symbol hard decision is rendered with regard to result of channel compensation, or a soft decision is rendered by a prescribed quantization bit length, and IFFF processing is applied to the result of the decision to generate a demodulated-signal restoration replica. As a result, a further improvement is made in performances.

In accordance with the present invention, a diversity arrangement is adopted and a data demodulated signal is generated using a branch signal having a superior D/U. This makes it possible to improve data decision accuracy.

In accordance with the present invention, a diversity arrangement is adopted, receive signals on a number of branches are selected and combined or subjected to maximum ratio combining, a restoration replica and an ISI replica are generated using the combined signal and ICI and ISI are suppressed. This makes it possible to improve data decision accuracy.

In accordance with the present invention, correlation between a receive signal and known signal is calculated, whether a delayed wave greater than the length of a guard interval has occurred is detected using a correlation value greater than a threshold value, a restoration replica and ISI replica are generated in a case where a delayed wave greater than the length of the guard interval has occurred, and ICI and ISI are suppressed. Even if the guard-interval length of a known symbol (pilot symbol) and the guard-interval length of a data symbol are the same, it is possible to obtain effects similar to those in a case where the guard interval of the known signal has been made greater than the guard interval of the pilot.

In accordance with the present invention, correlation between a receive signal and known signal is calculated and whether a delayed wave greater than the length of a guard interval has occurred is detected. In a case where a delayed wave greater than the length of the guard interval has occurred, the ISI portion of the receive signal is shaped by multiplication by zero or by a window function, a restoration replica is generated using the shaped receive signal and ICI is suppressed. As a result, data decision accuracy can be improved further through a simple arrangement.

As many apparently widely different embodiments of the present invention can be made without departing from the spirit and scope thereof, it is to be understood that the invention is not limited to the specific embodiments thereof except as defined in the appended claims.

What is claimed is:

1. A receiving apparatus in an Orthogonal Frequency Division Multiplexing (OFDM) transmission system for receiving a transmitted signal that is the result of adding a guard interval onto a signal obtained by inverse fast Fourier transform (IFFT) processing and then transmitting the signal, said apparatus comprising:
    a delay profile measurement unit for measuring a delay profile of a delayed wave having a delay greater than a guard interval of a data symbol;
    an intersymbol interference (ISI) replica generator for detecting a delay-time portion, which is greater than the guard interval, from the delay profile as an ISI portion, and generating an ISI replica conforming to this ISI portion;
    a subtractor for subtracting the ISI replica from a receive signal; and
    a data demodulator for demodulating data by applying FFT processing to the output of the subtractor.

2. The apparatus according to claim 1, wherein said ISI replica generator generates, as the ISI replica, a time-waveform portion of a known symbol conforming to the ISI portion, or a time-waveform portion of the preceding symbol.

3. A receiving apparatus in an Orthogonal Frequency Division Multiplexing (OFDM) transmission system for receiving a transmitted signal that is the result of adding a guard interval onto a signal obtained by inverse fast Fourier transform (IFFT) processing and then transmitting the signal, said apparatus comprising:
    a delay profile measurement unit for measuring a delay profile of a delayed wave having a delay greater than a guard interval of a data symbol;
    an intersymbol interference (ISI) replica generator for detecting a delay-time portion, which is greater than the guard interval, from the delay profile as an ISI portion, and generating an ISI replica conforming to this ISI portion;
    a subtractor for subtracting the ISI replica from a receive signal;
    means for applying FFT processing to the output of said subtractor and applying IFFT processing to result of demodulation after channel compensation, thereby generating a demodulated-signal restoration replica;
    means for inserting the restoration replica into the portion of said subtractor output from which the ISI replica was removed by subtraction; and
    a data demodulator for demodulating data by applying FFT processing to a signal that is the result of insertion of the restoration replica.

4. The apparatus according to claim 3, wherein said ISI replica generator generates, as the ISI replica, a time-waveform portion of a known symbol conforming to the ISI portion, or a time-waveform portion of the preceding symbol.

5. The apparatus according to claim 1, further comprising first and second channel compensators;
    wherein said delay profile measurement unit performs an autocorrelation operation between a time waveform of a receive signal and a time waveform of a known symbol, measures the delay profile and outputs a channel estimation value;
    said first channel compensator applies channel compensation to the ISI replica using the channel estimation value and inputs the result to said subtractor; and
    said second channel compensator converts the channel estimation value to a carrier-by-carrier estimation value and applies channel compensation to the result of FFT processing using this channel estimation value.

6. The apparatus according to claim 1, wherein said delay profile measurement unit generates a time-waveform signal of a receive signal by applying IFFT processing to result of the FFT processing, performs an autocorrelation operation between the time waveform and a time waveform of a known symbol, measures the delay profile and outputs a channel estimation value.

7. The apparatus according to claim 5, further comprising an interpolator for interpolating the delay profile and channel estimation value between known symbols;
    ISI replica generation and channel compensation control being performed using the interpolated delay profile and channel estimation value.

8. The apparatus according to claim 3, further comprising the following when said apparatus has been adapted for antenna diversity:
- means for detecting degree of influence of an ISI portion in each of multiple branches and deciding a branch for which the degree of influence of the ISI portion is small; and
- means for selecting a demodulated-signal restoration replica of the branch for which the degree of influence of the ISI portion is small;
- each branch using the demodulated-signal restoration replica that has been selected.

9. The apparatus according to claim 3, wherein said means for generating the demodulated-signal restoration replica has a hard decision unit for rendering a hard decision of a symbol with respect to result of channel compensation on a per-carrier-frequency basis;
- said means for generating the demodulated-signal restoration replica applying FFT processing to the output of said subtractor, applying channel compensation to result of FFT processing, rendering a hard decision of a symbol with respect to result of channel compensation on a per-carrier-frequency basis, and applying IFFT processing to result of the hard decision on a per-carrier-frequency basis, thereby generating the demodulated-signal restoration replica.

10. The apparatus according to claim 3, wherein said means for generating the demodulated-signal restoration replica has means for performing monitoring to determine whether magnitude of delayed-wave power to be removed satisfies a threshold value;
- said means for generating the demodulated-signal restoration replica selecting result of channel compensation if the threshold value is satisfied, selecting result of hard-decision processing if the threshold value is not satisfied, and applying IFFT processing to the selected result, thereby generating the demodulated-signal restoration replica.

11. The apparatus according to claim 3, wherein said means for generating the demodulated-signal restoration replica has a limiter for applying limiting in such a manner that result of channel compensation subcarrier-by-subcarrier will not exceed a limit value;
- said means for generating the demodulated-signal restoration replica applying FFT processing to the output of said subtractor, applying channel compensation to result of FFT processing, applying limiting in such a manner that result of channel compensation subcarrier-by-subcarrier will not exceed the limit value, and applying IFFT processing to result of limiting, thereby generating the demodulated-signal restoration replica.

12. The apparatus according to claim 3, further comprising:
- a removal unit for removing the ISI portion from a known signal; and
- means for applying FFT processing to an output signal from said removal unit, thereby calculating an ICI fluctuation value on a per-carrier basis, and finding an inverse performance of this ICI fluctuation value on a per-carrier basis;
- said means for generating the demodulated-signal restoration replica applying FFT processing to the output of said subtractor, applying channel compensation to result of FFT processing, multiplying result of channel compensation by the inverse performance of every carrier and applying IFFT processing to result of multiplication for every carrier frequency, thereby generating the demodulated-signal restoration replica.

13. The apparatus according to claim 3, wherein said means for generating the demodulated-signal restoration replica has a soft decision unit for rendering a soft decision of a symbol with respect to result of channel compensation on a per-carrier-frequency basis;
- said means for generating the demodulated-signal restoration replica applying FFT processing to the output of said subtractor, applying channel compensation to result of FFT processing, rendering a soft decision of a symbol with respect to result of channel compensation on a per-carrier-frequency basis, and applying IFFT processing to result of the soft decision on a per-carrier-frequency basis, thereby generating the demodulated-signal restoration replica.

14. A diversity receiving apparatus in an Orthogonal Frequency Division Multiplexing (OFDM) transmission system for receiving a transmitted signal that is the result of adding a guard interval onto a signal obtained by inverse fast Fourier transform (IFFT) processing and then transmitting the signal, said apparatus comprising the following in each of multiple branches:
- a delay profile measurement unit for measuring a delay profile of a delayed wave having a delay greater than a guard interval of a data symbol; and
- an intersymbol interference (ISI) replica generator for detecting a delay-time portion, which is greater than the guard interval, from the delay profile as an ISI portion, and generating a time-waveform portion of a preceding symbol, which conforms to this ISI portion, as an ISI replica;
- a subtractor for subtracting the ISI replica from a receive signal;
- FFT/channel compensation means for applying FFT processing to the output of said subtractor and performing channel compensation;
- means for inserting a demodulated-signal restoration replica, which is output from restoration replica generating means, into the portion of said subtractor output from which the ISI replica was removed by subtraction;
- a data demodulator for demodulating data by applying FFT processing to a signal that is the result of insertion of the restoration replica;
- said restoration replica generating means for maximum-ratio combining or selecting and combining, carrier by carrier, a signal output from said FFT/channel compensation means of each branch, and applying IFFT processing to the combined signal of each branch to thereby generate the restoration replica; and
- a selector/combiner for maximum-ratio combining or selecting and combining, carrier by carrier, a demodulated signal from said data demodulator of each branch, and outputting the combined signal.

15. A receiving apparatus in an Orthogonal Frequency Division Multiplexing (OFDM) transmission system for receiving a transmitted signal that is the result of adding a guard interval onto a signal obtained by inverse fast Fourier transform (IFFT) processing and then transmitting the signal, said apparatus comprising:
- a delay profile measurement unit for measuring a delay profile of a delayed wave having a delay greater than a guard interval of a data symbol;
- an intersymbol interference (ISI) replica generator for detecting a delay-time portion, which is greater than the guard interval, from the delay profile as an ISI portion, and generating an ISI replica conforming to this ISI portion;

a subtractor for subtracting the ISI replica from a receive signal;

zero insertion means for inserting zero into the ISI portion of the output of said subtractor;

means for applying FFT processing to the output of said subtractor and applying IFFT processing to result of demodulation after channel compensation, thereby generating a demodulated-signal restoration replica;

means for adding the restoration replica to the ISI portion of a signal, which is output from said zero insertion means, into which zero was inserted; and a data demodulator for demodulating data by applying FFT processing to a signal that is the result of addition of the restoration replica.

16. The apparatus according to claim 15, wherein said ISI replica generator generates, as the ISI replica, a time-waveform portion of a known symbol conforming to the ISI portion, or a time-waveform portion of the preceding symbol.

17. The apparatus according to claim 15, further comprising, in multiple stages:

means for generating a restoration replica by applying the IFFT processing;

means for adding the restoration replica to the ISI portion into which zero was inserted by said zero insertion means; and means for applying FFT processing to a signal that is the result of addition of the restoration replica.

18. The apparatus according to claim 1, wherein the above-described processing is applied to a signal that has been transmitted upon making the length of a guard interval added onto a known symbol greater than the length of a guard interval added onto a data symbol.

19. A receiving apparatus in an Orthogonal Frequency Division Multiplexing (OFDM) transmission system for receiving and demodulating a transmitted signal that is the result of adding a guard interval of a prescribed length onto a signal obtained by inverse fast Fourier transform (IFFT) processing and then transmitting the signal, said apparatus comprising:

an arithmetic unit for calculating correlation between the received signal and a known signal;

means for detecting, using a correlated value greater than a threshold value, whether a delayed wave greater than the length of the guard interval has occurred;

means for making "0" a correlation value that is equal to or less than the threshold value and outputting a delay profile if a delayed wave greater than the length of the guard interval has occurred;

an ISI replica generator for detecting, from the delay profile, a delay-time portion greater than the length of the guard interval as an intersymbol interference (ISI) portion, and generating an ISI replica conforming to this ISI portion;

a subtractor for subtracting the ISI replica from the received signal; and a data demodulator for demodulating data by applying FFT processing to the output of the subtractor.

20. A receiving apparatus in an Orthogonal Frequency Division Multiplexing (OFDM) transmission system for receiving and demodulating a transmitted signal that is the result of adding a guard interval of a prescribed length onto a signal obtained by inverse fast Fourier transform (IFFT) processing and then transmitting the signal, said apparatus comprising:

an arithmetic unit for calculating correlation between the received signal and a known signal;

means for detecting, using a correlated value greater than a threshold value, whether a delayed wave greater than the length of the guard interval has occurred;

means for making "0" a correlation value that is equal to or less than the threshold value and outputting a delay profile if a delayed wave greater than the length of the guard interval has occurred;

an ISI replica generator for detecting, from the delay profile, a delay-time portion greater than the length of the guard interval as an intersymbol interference (ISI) portion, and generating an ISI replica conforming to this ISI portion;

a subtractor for subtracting the ISI replica from the received signal;

means for applying FFT processing to the output of said subtractor and applying IFFT processing to result of demodulation after the channel compensation, thereby generating a demodulated-signal restoration replica;

means for inserting the restoration replica into the portion of said subtractor output from which the ISI replica was removed by subtraction; and a data demodulator for demodulating data by applying FFT processing to a signal that is the result of insertion of the restoration replica.

21. A receiving apparatus in an Orthogonal Frequency Division Multiplexing (OFDM) transmission system for receiving and demodulating a transmitted signal that is the result of adding a guard interval of a prescribed length onto a signal obtained by inverse fast Fourier transform (IFFT) processing and then transmitting the signal, said apparatus comprising:

means for calculating correlation between the received signal and a known signal and outputting a delay profile;

a waveform shaper for detecting, from the delay profile, a delay-time portion greater than the length of the guard interval as an intersymbol interference (ISI) portion, and shaping the waveform of a portion of the received signal that conforms to the ISI portion;

means for applying FFT processing and channel compensation to the output signal of said waveform shaper and applying IFFT processing to the signal after the channel compensation to thereby generate a demodulated-signal restoration replica;

means for adding the demodulated-signal restoration replica to the received signal; and a data demodulator for demodulating data by applying FFT processing to a signal that is the result of addition of the demodulated-signal restoration replica.

22. The apparatus according to claim 21, wherein said waveform shaper makes zero the portion of the received signal conforming to the ISI portion.

23. The apparatus according to claim 21, wherein said waveform shaper multiplies the portion of the received signal conforming to the ISI portion by a predetermined window function.

* * * * *